(12) United States Patent
Kusashima et al.

(10) Patent No.: US 10,171,220 B2
(45) Date of Patent: Jan. 1, 2019

(54) TERMINAL, BASE STATION, AND COMMUNICATION METHOD

(71) Applicant: Sharp Kabushiki Kaisha, Sakai, Osaka (JP)

(72) Inventors: Naoki Kusashima, Sakai (JP); Kazuyuki Shimezawa, Sakai (JP); Alvaro Ruiz Delgado, Sakai (JP); Kimihiko Imamura, Sakai (JP); Wataru Ouchi, Sakai (JP); Takashi Hayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/517,275

(22) PCT Filed: Oct. 16, 2015

(86) PCT No.: PCT/JP2015/079299
§ 371 (c)(1),
(2) Date: Apr. 6, 2017

(87) PCT Pub. No.: WO2016/060242
PCT Pub. Date: Apr. 21, 2016

(65) Prior Publication Data
US 2017/0310447 A1 Oct. 26, 2017

(30) Foreign Application Priority Data

Oct. 17, 2014 (JP) .................. 2014-212155

(51) Int. Cl.
*H04L 5/00* (2006.01)
*H04J 11/00* (2006.01)
(Continued)

(52) U.S. Cl.
CPC ............ *H04L 5/0055* (2013.01); *H04J 11/00* (2013.01); *H04L 1/1812* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS

2012/0127869 A1* 5/2012 Yin ................... H04L 1/0031
370/252
2013/0114474 A1* 5/2013 Fu ..................... H04L 5/0055
370/280
(Continued)

OTHER PUBLICATIONS

3GPP TS 36.213 v.8.6 (Mar. 2009); (Year: 2009).*
(Continued)

*Primary Examiner* — Benjamin H Elliott, IV
(74) *Attorney, Agent, or Firm* — Keating & Bennett, LLP

(57) ABSTRACT

Provided is a terminal configured to communicate with a base station with an FDD cell and a TDD cell. The terminal includes a reception unit configured to perform reception on a PDCCH transmitted in a DCI format. When a TDD cell is configured as a primary cell for the terminal, a first uplink reference UL-DL configuration used for determination of the interval between the reception of the PDCCH indicating a PUSCH transmission and the PUSCH transmission is configured for the TDD cell, and a second uplink reference UL-DL configuration used for determination of whether to use a DAI included in the DCI format of the PDCCH indicating the PUSCH transmission is configured in the FDD cell.

3 Claims, 16 Drawing Sheets

| SET | (PRIMARY-CELL UL/DL CONFIGURATION, SECONDARY-CELL UL/DL CONFIGURATION) | DOWNLINK REFERENCE UL/DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(0,2),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

(51) Int. Cl.
*H04W 72/04* (2009.01)
*H04W 72/12* (2009.01)
*H04L 1/18* (2006.01)
*H04L 5/14* (2006.01)

(52) U.S. Cl.
CPC .......... *H04L 1/1861* (2013.01); *H04L 5/1469* (2013.01); *H04W 72/04* (2013.01); *H04W 72/044* (2013.01); *H04W 72/0406* (2013.01); *H04W 72/12* (2013.01); *H04W 72/1278* (2013.01)

(58) Field of Classification Search
CPC ..... H04W 84/18; H04W 74/08; H04W 72/04; H04W 76/00; H04W 84/08; H04W 76/02; H04B 7/2123; H04B 7/212
See application file for complete search history.

(56) References Cited

U.S. PATENT DOCUMENTS

2013/0308550 A1* 11/2013 Yin .................... H04L 5/001 370/329
2016/0204924 A1* 7/2016 Li .................... H04L 1/1896 370/280
2017/0135091 A1* 5/2017 Han ................... H04W 72/0413
2017/0280454 A1* 9/2017 Kusashima ....... H04W 72/0453
2017/0310447 A1* 10/2017 Kusashima ........... H04L 5/0055

OTHER PUBLICATIONS

Official Communication issued in International Patent Application No. PCT/JP2015/079299, dated Jan. 12, 2016.

Huawei et al., "Potential solutions of TDD-FDD joint operation", 3GPP TSG-RAN WG1 Meeting #74, R1-132886, Aug. 19-23, 2013, 6 pages.

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.8.0, Sep. 2009, pp. 1-83.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300 V10.10.0, Jun. 2013, pp. 1-194.

Nokia Corporation, "On the NAICS UE testability framework", 3GPP TSG-RAN WG4 Meeting #72bis, R4-146455, Oct. 6-10, 2014, 8 pages.

Sharp, "Issues on FDD-TDD HARQ-ACK reporting procedure for TDD PCell", 3GPP TSG-RAN WG1 Meeting #78bis, R1-144117, Oct. 6-10, 2014, 19 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

S Special subframe  u Uplink subframe  D Downlink subframe

FIG. 3

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | | | 4 |
| 1 | | | 7, 6 | 4 | | | | 6 | 4 | |
| 2 | | | 8, 7, 4, 6 | | | | | 7, 6 | | |
| 3 | | | 7, 6, 11 | 6, 5 | 5, 4 | | | 8, 7, 4, 6 | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 6

| | |
|---|---|
| PDCCH | $n^{(1)}_{PUCCH,i} = (M-i-1) \cdot N_c + i \cdot N_{c+1} + n_{CCE,i} + N^{(1)}_{PUCCH}$ ···EQUATION (a) |
| EPDCCH | FOR DISTRIBUTED TRANSMISSION<br>$n^{(1)}_{PUCCH,i} = n_{ECCE,q} + \sum_{i1=0}^{i-1} N_{ECCE,q,n-k_{i1}} + \Delta_{ARO} + N^{(e1)}_{PUCCH,q}$ ···EQUATION (b-1)<br><br>FOR LOCALIZED TRANSMISSION<br>$n^{(1)}_{PUCCH,i} = \left\lfloor \frac{n_{ECCE,q}}{N^{ECCE,q}_{RB}} \right\rfloor \cdot N^{ECCE,q}_{RB} + \sum_{i1=0}^{i-1} N_{ECCE,q,n-k_{i1}} + n' + \Delta_{ARO} + N^{(e1)}_{PUCCH,q}$ ···EQUATION (b-2) |

WHERE C IS SELECTED FROM {0, 1, 2, 3} SO AS TO SATISFY $N_c \leq n_{CCE,i} < N_{c+1}$, $N_c = \max\left\{0, \left\lfloor [N^{DL}_{RB} \cdot (N^{RB}_{sc} \cdot c - 4)]/36 \right\rfloor \right\}$.

FIG. 7

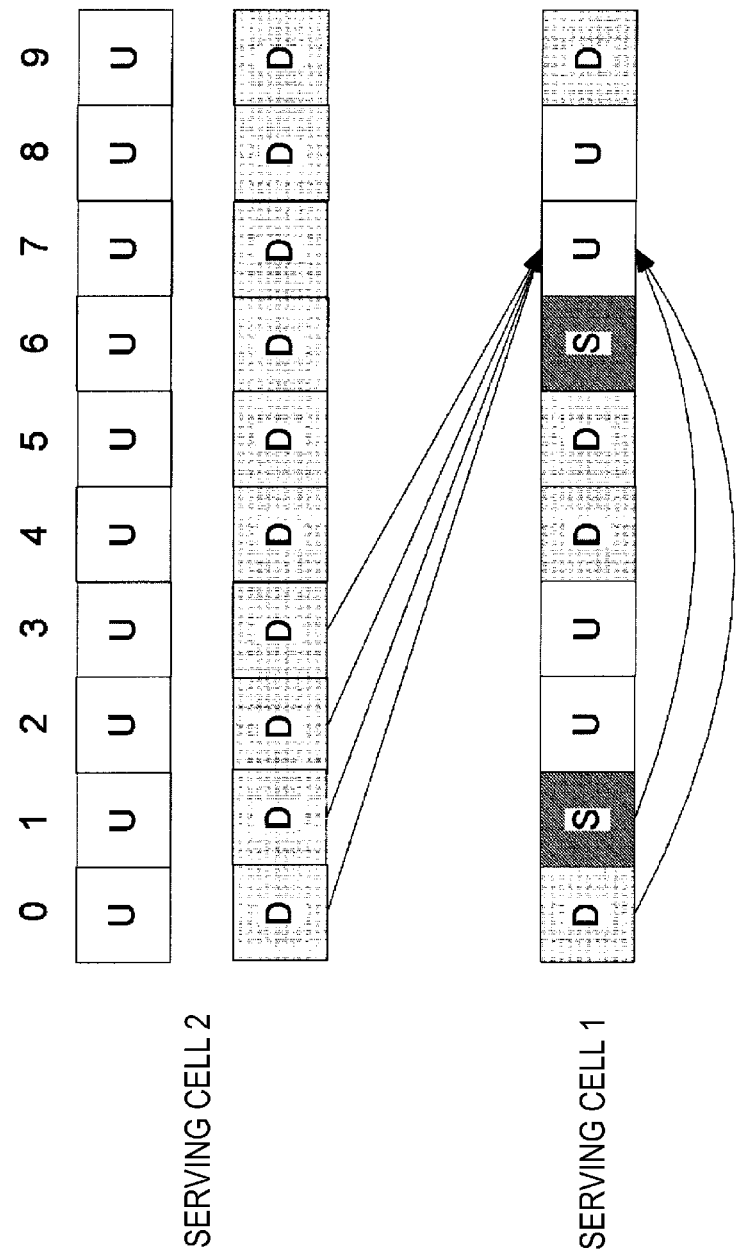

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5 | 5, 4 | 4 | | | 6, 5 | 5, 4 | 4 |
| 1 | | | 7, 6 | 6, 5, 4 | | | | 7, 6 | 6, 5, 4 | |
| 2 | | | 8, 7, 6, 5, 4 | | | | | 8, 7, 6, 5, 4 | | |
| 3 | | | 11, 10, 9, 8, 7, 6 | 6, 5 | 5, 4 | | | | | |
| 4 | | | 12, 11, 10, 9, 8, 7 | 7, 6, 5, 4 | | | | | | |
| 5 | | | 13, 12, 11, 10, 9, 8, 7, 6, 5, 4 | | | | | | | |
| 6 | | | 8, 7 | 7, 6 | 6, 5 | | | 7 | 7, 6, 5 | |

FIG. 9

| SET | (PRIMARY-CELL UL/DL CONFIGURATION, SECONDARY-CELL UL/DL CONFIGURATION) | DOWNLINK REFERENCE UL/DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(0,2),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 10

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5, 4 | | 4, 5 | | | 6, 5, 4 | | 4, 5 |
| 1 | | | 7, 6, 5, 4 | 4 | | | | 7, 6, 5, 4 | 4 | |
| 2 | | | 8, 7, 4, 6, 5 | | | | | 8, 7, 4, 6, 5 | | |
| 3 | | | 7, 6, 11, 10, 9, 8 | 6, 5 | 5, 4 | | | | | |
| 4 | | | 12, 11, 8, 7, 10, 9 | 7, 6, 5, 4 | | | | | | |
| 5 | | | 13, 12, 9, 8, 7, 5, 4, 11, 6 | | | | | | | |
| 6 | | | 10, 9, 8, 7 | 7 | 5 | | | 10, 9, 7 | 7 | |

FIG. 11

| DAI MSB, LSB | $V_{DAI}^{UL}$ or $V_{DAI}^{DL}$ | Number of subframes with PDSCH transmission and with PDCCH/EPDCCH indicating DL SPS release |
|---|---|---|
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 |

FIG. 12

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

FIG. 13

$$B_c^{DL} = M \quad \cdots \text{EQUATION (a-1)}$$

$$B_c^{DL} = W_{DAI}^{UL} \quad \cdots \text{EQUATION (a-2)}$$

$$B_c^{DL} = W_{DAI}^{UL} + 4\lceil (U - W_{DAI}^{UL})/4 \rceil \quad \cdots \text{EQUATION (a-3)}$$

$$B_c^{DL} = M_c \quad \cdots \text{EQUATION (b-1)}$$

$$B_c^{DL} = \min(W_{DAI}^{UL}, M_c) \quad \cdots \text{EQUATION (b-2)}$$

$$B_c^{DL} = \min(W_{DAI}^{UL} + 4\lceil (U - W_{DAI}^{UL})/4 \rceil, M_c) \quad \cdots \text{EQUATION (b-3)}$$

$$B_c^{DL} = 1 \quad \cdots \text{EQUATION (b-4)}$$

FIG. 14

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5 | 5, 4 | 4 | | | 6, 5 | 5, 4 | 4 |
| 1 | | | 7, 6, 5 | 4, 5 | | | | 7, 6, 5 | 4, 5 | |
| 2 | | | 8, 7, 4, 6, 5 | | | | | 8, 7, 4, 6, 5 | | |
| 3 | | | 7, 6, 11, 10 | 6, 5, 10 | 5, 4, 10 | | | | | |
| 4 | | | 12, 11, 8, 7, 10 | 7, 6, 5, 4, 10 | | | | | | |
| 5 | | | 13, 12, 9, 8, 7, 5, 4, 11, 6, 10 | | | | | | | |
| 6 | | | 7, 8 | 7, 6 | 5, 6 | | | 7, 5 | 7, 5 | |

FIG. 15

$$n_{HARQ} = \sum_{c=0}^{N_{cells}^{DL}-1} \sum_{k \in K} N_{k,c}^{received} \quad \cdots \text{EQUATION (1)}$$

$$n_{HARQ} = \sum_{c=0}^{N_{cells}^{DL}-1} \left( \left( \left( V_{DAI,c}^{DL} - U_{DAI,c} \right) \bmod 4 \right) r_c^{ACK} + \sum_{k \in K} N_{k,c}^{received} \right) \quad \cdots \text{EQUATION (2)}$$

FIG. 16

TERMINAL, BASE STATION, AND COMMUNICATION METHOD

TECHNICAL FIELD

The present invention relates to a terminal, a base station, and a communication method.

The present application claims priority based on Japanese Patent Application No. 2014-212155 filed on Oct. 17, 2014, the contents of which are incorporated herein by reference.

BACKGROUND ART

A base station device (base station, cell, first communication device (communication device different from a terminal device), eNodeB) and a terminal device (terminal, mobile terminal, mobile station device, second communication device (communication device different from the base station device), user equipment (UE), user device) included in a communication system such as Wideband Code Division Multiple Access (WCDMA) (registered trademark), Long Term Evolution (LTE), and LTE-Advanced (LTE-A) based on the Third Generation Partnership Project (3GPP) (registered trademark), and a wireless local area network (wireless LAN: WLAN), and Worldwide Interoperability for Microwave Access (WiMAX) (registered trademark) based on The Institute of Electrical and Electronics engineers (IEEE) (registered trademark) each include a plurality of transmit and receive antennas and spatial-multiplex data signals with a multi input multi output (MIMO) technology so as to achieve high-speed data communication.

Furthermore, in order to achieve high-speed data communication between a base station device and a terminal device, the 3GPP has adopted carrier aggregation (CA) that enables simultaneous communication with a plurality of component carriers (NPL 1).

The 3GPP has adopted a frequency division duplex (FDD) and a time division duplex (TDD) as the frame structure type of a bidirectional communication scheme (duplex scheme). Furthermore, in the FDD, a full duplex scheme that enables simultaneous bidirectional communication, and a half duplex scheme by which bidirectional communication is achieved by switching unidirectional communication have been adopted (NPL 2). It should be noted that LTE that employs the TDD is sometimes referred to as TD-LTE or LTE TDD.

Furthermore, the 3GPP is considering TDD-FDD carrier aggregation (TDD-FDD CA) in which communication is performed with component carriers that support the TDD (TDD carriers) and component carriers that support the FDD (FDD carriers) put together (NPL 3).

CITATION LIST

Non Patent Literature

NPL 1: 3rd Generation Partnership Project Technical Specification Group Radio Access Network; Evolved Universal Terrestrial Radio Access (E-UTRA) and Evolved Universal Terrestrial Radio Access Network (E-UTRAN); Overall description; Stage 2 (Release 10), TS36.300 v10.10.0 (2013-06).

NPL 2: 3rd Generation Partnership Project Technical Specification Group Radio Access Network; Evolved Universal Terrestrial Radio Access (E-UTRA); Physical Channels and Modulation (Release 8), TS36.211 v8.8.0 (2009-09).

NPL 3: "Potential solutions of TDD-FDD joint operation", R1-132886, 3GPP TSG-RAN WG1 Meeting #74, Barcelona, Spain, Aug. 19-23, 2013.

SUMMARY OF INVENTION

Technical Problem

Carrier aggregation with a TDD cell and an FDD cell has no mechanism for transmitting/receiving HARQ-ACK information corresponding to a PDCCH/EPDCCH indicating a PDSCH of a cell with a certain frame structure type or a PDCCH/EPDCCH indicating SPS release in a cell with a frame structure type that is different from that of the cell described earlier, which is a problem in that appropriate communication cannot be performed.

In light of the foregoing, an object of the present invention is to provide a terminal device that enables appropriate communication.

Solution to Problem (1) A terminal according to one aspect of the present invention is a terminal configured to communicate with a base station by using an FDD cell and a TDD cell and includes a reception unit configured to perform reception on a PDCCH transmitted in a DCI format. When the TDD cell is configured as a primary cell for the terminal, a first uplink reference UL-DL configuration used for determination of the interval between the PDCCH reception, the PDCCH indicating PUSCH transmission, and the PUSCH transmission is configured for the TDD cell, and a second uplink reference UL-DL configuration used for determination of whether to use a DAI included in the DCI format of the PDCCH indicating the PUSCH transmission is configured for the FDD cell.

(2) A terminal according to one aspect of the present invention is a terminal configured to communicate with a base station by using an FDD cell and a TDD cell, and includes a reception unit configured to perform reception on a PDCCH transmitted in a DCI format. When the TDD cell is configured as a primary cell for the terminal, a first downlink reference UL-DL configuration used for determining the interval between PDSCH reception and HARQ-ACK transmission corresponding to the PDSCH is configured for the TDD cell and the FDD cell, and when the FDD cell is configured as a primary cell for the terminal, a second uplink reference UL-DL configuration used for determination of a downlink subframe or a special subframe is configured for the TDD cell.

(3) A base station according to one aspect of the present invention is a base station configured to communicate with a terminal by using an FDD cell and a TDD cell and includes a transmission unit configured to transmit, to the terminal, a PDCCH transmitted in a DCI format. When the TDD cell is configured as a primary cell for the terminal, a first uplink reference UL-DL configuration used for determining the interval between the PDCCH transmission, the PDCCH indicating PUSCH transmission, and PUSCH reception is configured for the TDD cell, and a second uplink reference UL-DL configuration used for determining whether to use a DAI included in the DCI format of the PDCCH indicating PUSCH transmission is configured for the FDD cell.

(4) A base station according to one aspect of the present invention is a base station configured to communicate with a terminal by using an FDD cell and a TDD cell and includes a transmission unit configured to transmit a PDCCH transmitted in a DCI format, to the terminal. When the TDD cell is configured as a primary cell for the terminal, a first downlink reference UL-DL configuration used for determining the interval between PDSCH transmission and HARQ-ACK reception corresponding to the PDSCH is configured for the TDD cell and the FDD cell, and when the FDD cell is configured as a primary cell for the terminal, a second uplink reference UL-DL configuration used for determining a downlink subframe or a special subframe is configured for the TDD cell.

(5) A communication method according to one aspect of the present invention is a communication method used in a terminal configured to communicate with a base station by using an FDD cell and a TDD cell. The method includes the steps of: performing reception on a PDCCH transmitted in a DCI format; configuring a first uplink reference UL-DL configuration used for determining the interval between the PDCCH reception, the PDCCH indicating PUSCH transmission, and the PUSCH transmission for the TDD cell when the TDD cell is configured as a primary cell for the terminal; and configuring a second uplink reference UL-DL configuration used for determining whether to use a DAI included in the DCI format of the PDCCH indicating the PUSCH transmission for the FDD cell.

Advantageous Effects of Invention

According to the present invention, in a communication system in which a base station device and a terminal device communicate with each other, the terminal device performs appropriate transmission control and reception control, which enables communication efficiency to be improved.

BRIEF DESCRIPTION OF DRAWINGS

FIG. 3 is a table showing a configuration of a subframe pattern in TDD UL/DL configuration.

FIG. 6 is a table showing a correspondence between a subframe in which a PDCCH/EPDCCH is transmitted, and a subframe in which HARQ-ACK information transmits according to the first embodiment of the present invention.

FIG. 7 is a table showing arithmetic equations of a PUCCH resource in which the HARQ-ACK information in TDD is included according to the first embodiment of the present invention.

FIG. 8 is a diagram illustrating an example of transmission timing of HARQ-ACK information in carrier aggregation of TDD and FDD according to the first embodiment of the present invention.

FIG. 9 is a table showing an example of a correspondence between a subframe in which a PDCCH/EPDCCH is transmitted, and a subframe in which HARQ-ACK information transmits in carrier aggregation of TDD and FDD according to the first embodiment of the present invention.

FIG. 10 is a table showing a correspondence between a combination of UL-DL configurations and downlink reference UL-DL configurations according to the first embodiment of the present invention.

FIG. 11 is a table showing an example of a correspondence between a subframe in which a PDCCH/EPDCCH is transmitted, and a subframe in which HARQ-ACK information transmits in carrier aggregation of TDD and FDD according to the first embodiment of the present invention.

FIG. 12 is a table showing a correspondence between a value of a DAI, and the number of subframes of the PDCCH/EPDCCH indicating PDSCH transmission or release of downlink SPS according to the first embodiment of the present invention.

FIG. 13 is a table showing an uplink-related index according to the first embodiment of the present invention.

FIG. 14 is a table showing arithmetic equations of the number of downlink subframes necessary for the feedback of an HARQ-ACK information bit to the first embodiment of the present invention.

FIG. 15 a table showing an example of a correspondence between a subframe in which a PDCCH/EPDCCH is transmitted, and a subframe in which HARQ-ACK information transmits in carrier aggregation of TDD and FDD according to the first embodiment of the present invention.

FIG. 16 is a drawing showing examples of an arithmetic equation of $n_{HARQ}$ according to the first embodiment of the present invention.

DESCRIPTION OF EMBODIMENT

Figure 1:
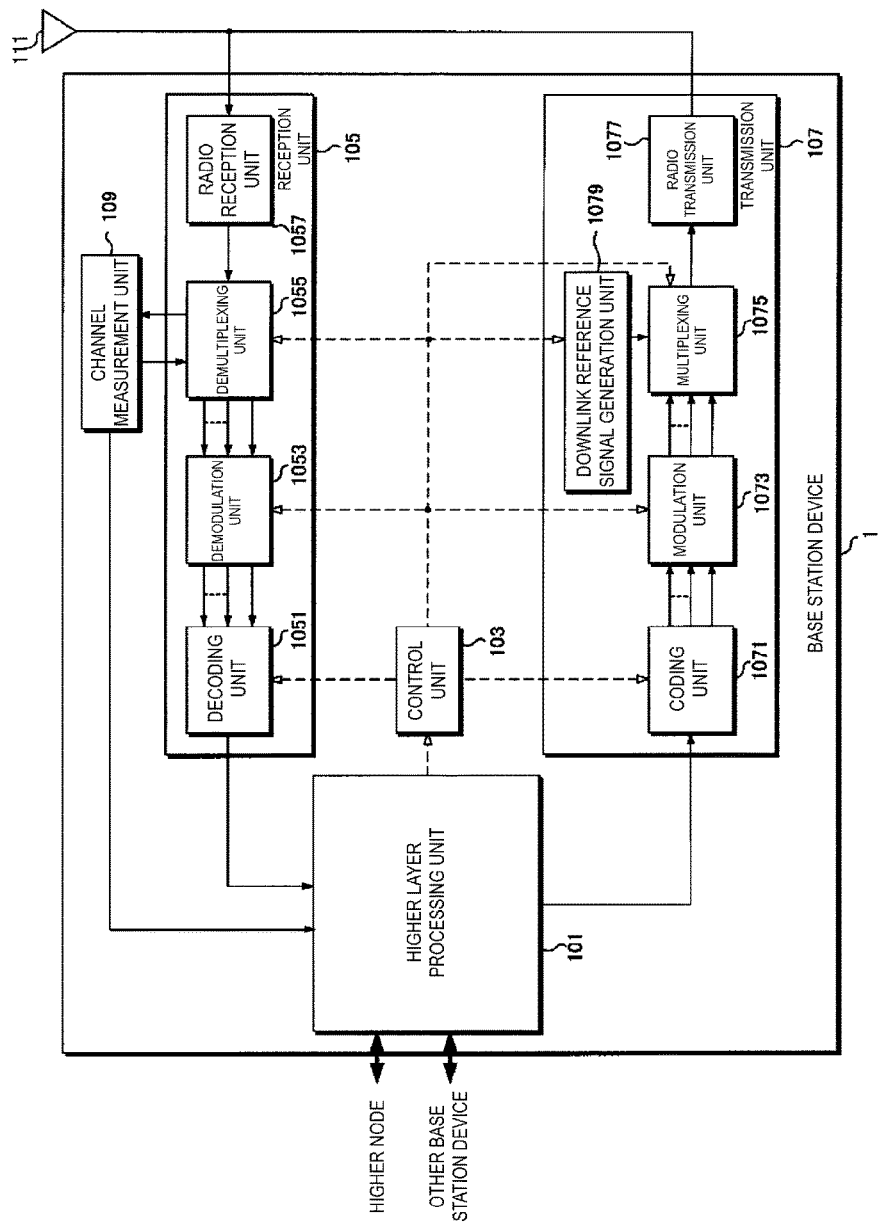
FIG. 1 is a schematic block diagram illustrating a configuration of a base station device 1 according to a first embodiment of the present invention.

Carrier aggregation is applied to the communication system according to the present embodiment. In carrier aggregation, communication is performed with a plurality of component carriers put together (integrated and aggregated). A cell can be configured by using a component carrier, which allows carrier aggregation to be referred to as cell aggregation. In other words, in the communication system according to the present embodiment, communication can be performed with a plurality of cells put together. Furthermore, in the cell aggregation of the communication system according to the present embodiment, communication is performed with cells of the plurality of cells to which the TDD scheme is applied (TDD cell, TDD serving cell, TDD carrier, TDD component carrier, or TDD operation) and the other cells to which the FDD scheme is applied (FDD cell, FDD serving cell, FDD carrier, FDD component carrier, or FDD operation) put together. That is, to the communication system according to the present embodiment, cell aggregation in a plurality of cells for which different frame structure types are configured is applied. It should be noted that the frame structure type may also be referred to as a duplex mode. In LTE and LTE-A, the frame structure type 1 is defined as FDD, and the frame structure type 2 is defined as TDD.

Cell aggregation refers to a configuration in which communication is performed with one primary cell and one or more secondary cells put together. Furthermore, while a primary cell is configured by using an uplink component carrier and a downlink component carrier, a secondary cell may be configured by using only a downlink component carrier.

The configured plurality of serving cells (plurality of cells) include one primary cell and one or more secondary cells. The primary cell is a serving cell in which an initial connection establishment procedure has been performed, a serving cell in which a connection re-establishment procedure has been started, or a cell indicated as a primary cell during a handover procedure. At the point of time when an RRC connection is established, or later, a secondary cell may be configured. It should be noted that a plurality of serving cells may be configured by one base station device 1, or a plurality of serving cells may be configured by a plurality of base station devices 1.

Furthermore, an uplink and downlink frequency band (UL/DL operating band) and a duplex mode (TDD or FDD) are associated with one index. Furthermore, the uplink and downlink frequency band (operating band) and the duplex mode are managed in one table. The index is also referred to as an E-UTRA operating band, an E-UTRA band, or a band. For example, index 1 is also referred to as band 1, index 2 as band 2, and index n as band n. For example, band 1 has an uplink operating band from 1920 MHz to 1980 MHz, a downlink operating band from 2110 MHz and 2170 MHz, and FDD as its duplex mode. Furthermore, band 33 has uplink and downlink operating bands from 1900 MHz to 1920 MHz, and TDD as its duplex mode.

Furthermore, a combination of the bands (E-UTRA CA Band) to which carrier aggregation is applicable may also be configured. For example, it may be indicated that carrier aggregation is possible with the component carriers in band 1 and band 5. That is, the feasibility of carrier aggregation with component carriers in different bands may be indicated.

The bands supported by the terminal device 2 and the combination of the bands to which carrier aggregation is applicable are configured in capability information on the terminal device 2 (UE capability, UE-EUTRA-Capability). Upon the capability information being transmitted from the terminal device 2, the base station device 1 can grasp the capabilities of the terminal device 2.

The present invention may be applied to some of the configured plurality of cells. The cell configured for the terminal device 2 is also referred to as a serving cell.

TDD is a technology for time-division multiplexing an uplink signal and a downlink signal to enable uplink and downlink communication in a single frequency band (carrier frequency, component carrier). In LTE, making a configuration beforehand enables the downlink and the uplink to be switched on a subframe-by-subframe basis. It should be noted that in TDD, a subframe with which downlink transmission is possible (a downlink subframe, or a subframe reserved for downlink transmission), a subframe with which uplink transmission is possible (an uplink subframe, or a subframe reserved for uplink transmission), and a guard period (GP) are provided, which defines a subframe (a special subframe) that enables switching of downlink transmission and uplink transmission in time domain (symbol domain). It should be noted that in the special subframe, a time domain (a symbol corresponding to the time domain) in which downlink transmission is possible is referred to as a downlink pilot time slot (DwPTS), and a time domain (a symbol corresponding to the time domain) in which uplink transmission is possible is referred to as an uplink pilot time slot (UpPTS). For example, if a subframe i is a downlink subframe, the terminal device 2 can receive a downlink signal transmitted from the base station device 1, and if a subframe j that is different from the subframe i is an uplink subframe, the terminal device 2 can transmit an uplink signal to the base station device 1. Furthermore, when subframe k that is different from subframe i and subframe j is a special subframe, the terminal device 2 can receive a downlink signal in the DwPTS in the downlink time-domain, and can transmit an uplink signal in the UpPTS in the uplink time-domain.

Furthermore, in LTE and LTE-A, to perform communication in the TDD scheme, specific information elements (TDD UL/DL (UL-DL) configuration (TDD UL/DL configuration(s), TDD uplink-downlink configuration(s)), TDD configuration (TDD configuration(s), tdd-Config, TDD config), UL/DL (UL-DL) configuration (uplink-downlink configuration(s))) are announced. The terminal device 2 can perform transmission/reception process by regarding a certain subframe as any one of an uplink subframe, a downlink subframe or a special subframe in accordance with the announced information.

Furthermore, for a special subframe configuration (lengths of the DwPTS, the UpPTS, and the GP in the special subframe), a plurality of patterns are defined and managed in a table. The patterns are each associated with the corresponding value (index), and upon the value being announced, the terminal device performs the processing on the special subframe in accordance with the pattern associated with the announced value. That is, the information on the special subframe configuration can also be announced from the base station device 1 to the terminal device 2.

Furthermore, a traffic adaptive control technology by which the ratio between the uplink resource and the downlink resource is changed depending on the uplink traffic and the downlink traffic (amount of information, amount of data, and amount of communication) may be applied to TDD. For example, the ratio between the downlink subframe and the uplink subframe can be changed dynamically. The downlink subframe and the uplink subframe can be switched adaptively for a certain subframe. Such a subframe is referred to as a flexible subframe. The base station device 1 can receive an uplink signal or transmit a downlink signal depending on conditions (states), in the flexible subframe. Furthermore, unless the base station device 1 instructs the terminal device 2 to transmit an uplink signal in the flexible subframe, the terminal device 2 can perform the reception process on the flexible subframe as a downlink subframe. Furthermore, such a TDD that dynamically changes the ratio between the downlink subframe and the uplink subframe, uplink and downlink subframes, and TDD UL/DL (re)configurations is sometimes referred to as a dynamic TDD (DTDD) or eIMTA (enhanced Interference Mitigation and Traffic Adaptation). For example, the TDD UL/DL configuration information may be transmitted by L1 signalling.

On the other hand, FDD is a technology that enables downlink communication and uplink communication in different frequency bands (carrier frequency, component carriers).

A cellular communication system in which a plurality of areas covered by the base station device 1 are arranged in a cellular pattern may be applied to such a communication system. Furthermore, a single base station device 1 may manage a plurality of cells. Furthermore, a single base station device 1 may manage a plurality of remote radio heads (RRHs). Furthermore, a single base station device 1 may manage a plurality of local areas. Furthermore, a single base station device 1 may manage a plurality of heterogeneous networks (HetNets). Furthermore, a single base station device 1 may manage a plurality of low power base station devices (low power nodes (LPNs)).

In such a communication system, the terminal device 2 measures the reference signal received power (RSRP) on the basis of a cell-specific reference signal (CRS).

In such a communication system, communication may be performed with carriers (component carriers) on which some of the physical channels or signals defined in LTE are not placed. Here, such a carrier is referred to as a new carrier type (NCT). For example, a cell-specific reference signal, a physical downlink control channel, and a synchronization signal (primary synchronization signal, secondary synchronization signal) does not have to be placed on the new carrier type. Furthermore, the introduction of a physical channel (physical discovery channel: PDCH, new discovery signal(s): NDS, discovery reference signal: DRS, discovery signal: DS) for performing mobility measurement and time/frequency synchronization detection is being considered for a cell in which the new carrier type has been configured. It should be noted that the new carrier type is sometimes referred to as an additional carrier type (ACT). Furthermore, in contrast to NCT, an existing carrier type may be referred to as a legacy carrier type (LCT).

According to the present embodiment, "X/Y" includes the meaning of "X or Y." According to the present embodiment, "X/Y" includes the meaning of "X and Y." According to the present embodiment, "X/Y" includes the meaning of "X and/or Y."

Physical Channel

Next, main physical channels (or physical signals) used in LTE and LTE-A will be described. A channel means a medium used in transmission of a signal. A physical channel means a physical medium used in transmission of a signal. Another physical channel may be added, the structure or format of the physical channels may be changed, or another structure or format may be added for LTE and LTE-A or later standard releases, however, there is no effect on the descriptions given of each embodiment of the present invention even in such a case.

In LTE and LTE-A, scheduling of physical channels is managed by using radio frames. One radio frame is 10 ms in length, and is constituted of 10 subframes. In addition, one subframe is constituted of two slots (that is, one slot is 0.5 ms in length). Furthermore, management is performed by using a resource block as the minimum unit of the scheduling on which a physical channel is allocated. A resource block is defined as a domain that is constituted of a fixed frequency domain constituted of a set of a plurality of subcarriers (for example, 12 subcarriers) on a frequency axis; and a domain constituted of fixed transmission time intervals (for example, one slot, seven symbols).

In order to improve communication accuracy, a cyclic prefix (CP) corresponding to a redundant portion of a physical channel is added to the physical channel for transmission. The number of symbols placed in one slot changes depending on the length of the CP. For example, for a normal CP, seven symbols can be placed in one slot. For an extended CP, six symbols can be placed in one slot.

Furthermore, narrowing the interval between subcarriers allows 24 subcarriers to be placed in one resource block. This can also be applied to a specific physical channel.

The physical channel corresponds to a set of resource elements that carries the information output from a higher layer. The physical signal is used in a physical layer and does not carry the information output from a higher layer. In other words, control information from a higher layer, such as a radio resource control (RRC) message and system information (SI), is carried by a physical channel.

The downlink physical channel includes a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). Furthermore, the downlink physical signal includes various types of reference signals and various types of synchronization signals. The downlink reference signal (DL-RS) includes a cell-specific reference signal (CRS), a UE-specific reference signal (UERS), and a channel state information reference signal (CSI-RS). The synchronization signal includes a primary synchronization signal (PSS) and a secondary synchronization signal (SSS).

The uplink physical channel includes a physical uplink shared channel (PUSCH), a physical uplink control channel (PUCCH), and a physical random access channel (PRACH). Furthermore, the uplink physical signal includes various types of reference signals. The uplink reference signal includes a demodulation reference signal (DMRS) and a sounding reference signal (SRS).

The synchronization signal is constituted of three types of PSS and an SSS constituted of 31 types of codes interleaved in the frequency domain. Depending on the combination of the PSS and SSS, physical layer cell identifies of 504 types (physical cell identities, physical cell identifiers (PCIs)) for identifying the base station device 1 and a frame timing for radio synchronization are indicated. The terminal device 2 identifies the cell identifier of the synchronization signal received by cell search. It should be noted that the cell identifier is sometimes referred to as a cell ID. The physical layer cell identifier is sometimes referred to as a physical layer cell ID.

The physical broadcast channel (PBCH) is transmitted to announce control parameters (broadcast information and system information) to be used in common among the terminal devices 2 in a cell. Furthermore, broadcast information (for example, SIB1 or portion of system information) that is not announced on the PBCH, is transmitted on the PDSCH via the DL-SCH. Examples of the broadcast information include a cell global identifier (CGI) indicating a cell-specific identifier, a tracking area identifier (TAI) for managing a waiting area based on paging, random access configuration information (such as a transmission timing timer), and common radio resource configuration information (shared radio resource configuration information).

The downlink reference signals are classified into a plurality of types depending on their use. For example, the cell-specific reference signal (CRS) is a pilot signal that is transmitted by a prescribed power for each cell as well as being a downlink reference signal that is cyclically repeated in the frequency domain and time domain in accordance with prescribed regulations. The terminal device 2 measures the cell-specific reference signal received quality for each cell. Furthermore, the terminal device 2 uses the cell-specific reference signal as a reference signal for demodulation of a physical downlink control channel or a physical downlink shared channel transmitted on an antenna port on which the cell-specific reference signal is also transmitted. As for a sequence used in the cell-specific reference signal, a sequence that can be identified for each cell is used. The CRS may be transmitted in all downlink subframes by the base station device 1, but the terminal device 2 may receive the CRS only in the specified downlink subframes.

Furthermore, the downlink reference signal is also used for estimating downlink channel variation. The downlink reference signal used for estimating channel fluctuation may also be referred to as a channel state information reference signal (CSI-RS) or a CSI reference signal. Furthermore, the CSI reference signal that is not transmitted in actuality, or that is transmitted by zero power may also be referred to as a zero power channel state information reference signal (ZP CSI-RS), or a zero power CSI reference signal. Furthermore, the CSI reference signal that is transmitted in actuality may also be referred to as a non-zero power channel state information reference signal (NZP CSI-RS), or a non-zero power CSI reference signal.

Furthermore, the downlink resource that is used for measurement of an interference component may also be referred to as a channel state information interference measurement resource (CSI-IMR) or a CSI-IM resource. With the zero power CSI reference signal included in the CSI-IM resource, the terminal device 2 may measure the interference signal for calculating the value of CQI. Further, the downlink reference signal that is configured for each terminal device 2 is referred to as a UE-specific reference signal (UERS) or a dedicated reference signal, a downlink demodulation reference signal (DLDMRS), or the like, and is used for demodulation of a physical downlink control channel or a physical downlink shared channel.

It should be noted that a sequence of these downlink reference signals may be generated on the basis of a pseudo-random sequence. Furthermore, the sequence of these downlink reference signals may be generated on the basis of a Zadoff-Chu sequence. Furthermore, the sequence of these downlink reference signals may be generated on the basis of a Gold sequence. Furthermore, the sequence of these downlink reference signals may be a variant or modification of the pseudo-random sequence, Zadoff-Chu sequence, or Gold sequence.

The physical downlink shared channel (PDSCH) is used for transmission of downlink data (DL-SCH). Furthermore, the PDSCH is also used when system information is transmitted on a DL-SCH. The radio resource allocation information of the physical downlink shared channel is indicated by the physical downlink control channel. Furthermore, the PDSCH is also used for announcement of parameters related to downlink and uplink (information elements, RRC messages).

The physical downlink control channel (PDCCH) is transmitted in several OFDM symbols from the beginning of each subframe, and is used to inform the terminal device 2 of the resource allocation information in accordance with the scheduling of the base station device 1, and the amount of adjustment of the fluctuation in the transmit power. Before transmitting/receiving a layer 3 message (such as paging, a handover command, and an RRC message), the terminal device 2 needs monitor a self-addressed physical downlink control channel, and acquire resource allocation information called uplink grant for transmission and downlink grant (also referred to as downlink assignment) for reception, from the self-addressed physical downlink control channel. It should be noted that in addition to being transmitted by the OFDM symbols described above, the physical downlink control channel can also be configured to be transmitted in a resource block region specifically allocated by the base station device 1 to the terminal device 2. The physical downlink control channel that is transmitted in the resource block region specifically allocated by the base station device 1 to the terminal device 2 is sometimes referred to as an enhanced physical downlink control channel (EPDCCH: Enhanced PDCCH). Furthermore, the PDCCH transmitted in the OFDM symbols described above is sometimes referred to as a first control channel. Furthermore, the EPDCCH is sometimes referred to as a second control channel. Furthermore, the resource region allocatable to the PDCCH is sometimes referred to as a first control channel region, and the resource region allocatable to the EPDCCH is sometimes referred to as a second control channel region. It should be noted that the PDCCH described hereinafter basically includes the EPDCCH.

The base station device 1 may transmit the PCFICH, the PHICH, the PDCCH, the EPDCCH, the PDSCH, the synchronization signal (PSS/SSS), and the downlink reference signal, in the DwPTS of the special subframe. Furthermore, the base station device 1 does not have to transmit the PBCH in the DwPTS of the special subframe.

Furthermore, the terminal device 2 may transmit the PRACH and the SRS in the UpPTS of the special subframe. Furthermore, the terminal device 2 does not have to transmit the PUCCH, the PUSCH, and the DMRS in the UpPTS of the special subframe.

When the special subframe is only constituted of the GP and the UpPTS, the terminal device 2 may transmit the PUCCH and/or the PUSCH and/or the DMRS in the UpPTS of the special subframe.

Here, the terminal device 2 monitors a set of PDCCH candidates and/or EPDCCH candidates. Hereinafter, in order to simplify the description, the PDCCH may include the EPDCCH. The PDCCH candidate indicates a candidate that the PDCCH may be mapped to and transmitted in by the base station device 1. Furthermore, the PDCCH candidate is constituted of one or more control channel elements (CCEs). Furthermore, monitoring may include an attempt, by the terminal device 2, to decode each PDCCH in the set of PDCCH candidates in accordance with all DCI formats to be monitored.

Here, the set of PDCCH candidates to be monitored by the terminal device 2 is also referred to as a search space. The search space is a set of resources that may be used in transmission of the PDCCH by the base station device 1. A common search space (CSS) and a terminal device specific search space (UE-specific search space (USS)) are formed (defined, configured) in the PDCCH region.

The CSS is used for transmission of downlink control information to a plurality of terminal devices 2. That is, the CSS is defined by common resources among a plurality of terminal devices 2. Furthermore, the USS is used for transmission of downlink control information to a specific terminal device 2. That is, the USS is configured in a dedicated manner for a specific terminal device 2. Furthermore, the USS may be configured in duplication for a plurality of terminal devices 2.

The downlink control information (DCI) is transmitted from the base station device 1 to the terminal device 2 in a specific format (configuration, scheme). This format may also be referred to as a DCI format. It should be noted that transmitting a DCI format includes transmitting DCI in a specific format. The DCI format can be called a format for transmitting DCI. A plurality of formats are provided for the DCI format to be transmitted from the base station device 1 to the terminal device 2 (for example, DCI format 0/1/1A/1B/1C/1D/2/2A/2B/2C/2D/3/3A/4). Fields (bit fields) corresponding to various types of the downlink control information are set in the DCI format.

In order to transmit common DCI (single DCI) in a DCI format to a plurality of terminal devices 2, the base station device 1 transmits the DCI in the PDCCH (or EPDCCH) CSS, and when individually transmitting DCI to the terminal devices 2 in a certain DCI format, the base station device 1 transmits the DCI in the PDCCH (or EPDCCH) USS.

Examples of the DCI to be transmitted in the DCI format include PUSCH or PDSCH resource allocation, a modulation and coding scheme, a sounding reference signal request (SRS request), a channel state information request (CSI request), an instruction for an initial transmission or retransmission of a single transport block, a transmit power control command for the PUSCH, a transmit power control command for the PUCCH, a cyclic shift of the UL DMRS, and an orthogonal code cover (OCC) index. In addition, various types of DCIs are defined in the specifications.

The format used for uplink transmission control (such as scheduling of the PUSCH) may be referred to as an uplink DCI format (for example, DCI format 0/4), or DCI associated with the uplink. The uplink transmission control is also referred to as uplink grant. The format used for downlink reception control (such as scheduling of the PDSCH) may be referred to as a downlink DCI format (for example, DCI format 1/1A/1B/1C/1D/2/2A/2B/2C/2D), or DCI associated with the downlink. The downlink reception control is also referred to as downlink grant, downlink assignment, or downlink allocation. The format used for adjusting the transmit power of each of the plurality of terminal devices 2 may also be referred to as a group triggering DCI format (for example, the DCI format 3/3A).

For example, the DCI format 0 is used for transmitting information on resource allocation of the PUSCH that is necessary for scheduling of one PUSCH in one serving cell and information on a modulation scheme thereof, information on a transmit power control (TPC) command for the PUSCH, and the like. Furthermore, such DCI is transmitted in the PDCCH/EPDCCH. It can be said that the DCI format includes at least one DCI.

The terminal device 2 monitors the PDCCH in the CSS and/or the USS of the PDCCH region, and detects a self-addressed PDCCH.

Furthermore, an RNTI assigned by the base station device 1 to the terminal device 2 is used for transmission (transmission in the PDCCH) of the downlink control information. Specifically, cyclic redundancy check (CRC) parity bits are added to the DCI format (which may be the downlink control information) and scrambled with the RNTI.

The terminal device 2 attempts to decode the DCI format to which the CRC parity bits scrambled with the RNTI have been added, to detect a DCI format that has succeeded in the CRC as a self-addressed DCI format (which is also referred to as blind decoding). That is, the terminal device 2 attempts to decode the PDCCH including the CRC scrambled with the RNTI to detect a PDCCH that has succeeded in the CRC as a self-addressed PDCCH.

Here, a cell-radio network temporary identifier (C-RNTI) is included in the RNTI. The C-RNTI is a unique identifier that is used for identification of RRC connection and scheduling. The C-RNTI is used for unicast transmission that is dynamically scheduled.

Furthermore, a temporary C-RNTI is included in the RNTI. The temporary C-RNTI is an identifier that is used for a random access procedure. For example, the terminal device 2 may decode, only in the CSS, a DCI format (for example, the DCI format 0) which is associated with the uplink and to which CRC scrambled with the temporary C-RNTI have been added. Furthermore, the terminal device 2 may attempt to decode, in the CSS and the USS, a DCI format (for example, the DCI format 1A) which is associated with the downlink and to which CRC scrambled with the temporary C-RNTI have been added.

Furthermore, when transmitting DCI in the CSS, the base station device 1 may add CRC parity bits that have been scrambled with the temporary C-RNTI or the C-RNTI to the DCI (DCI format), and when transmitting DCI in the USS, the base station device 1 may add CRC that has been scrambled with the C-RNTI to the DCI (DCI format).

The physical uplink shared channel (PUSCH) is mainly used for transmission of uplink data and uplink control information (UCI). The UCI transmitted on the PUSCH includes channel state information (CSI) and/or ACK/NACK. Furthermore, the CSI transmitted on the PUSCH includes aperiodic CSI (A-CSI) and periodic CSI (P-CSI). Furthermore, as in the downlink, resource allocation information for the physical uplink shared channel is indicated by the physical downlink control channel. Furthermore, a PUSCH that is scheduled by dynamic scheduling grant carries uplink data. Furthermore, a PUSCH that is scheduled by random access response grant transmits information on the local station (for example, identification information identifying the terminal device 2, and a message 3) associated with the random access. Furthermore, a parameter used for setting the transmit power for the transmission on the PUSCH may differ depending on the type of the detected grant. It should be noted that the control data is transmitted in the form of channel quality information (CQI and/or PMI), HARQ-ACK information (HARQ-ACK, HARQ-ACK response), and RI. In other words, the control data is transmitted in the form of the uplink control information.

The physical uplink control channel (PUCCH) is used for acknowledgement/negative acknowledgement (ACK/NACK) of the downlink data transmitted on the physical downlink shared channel, announcement of downlink channel information (channel state information), and a scheduling request (SR) that is an uplink resource allocation request (radio resource request). The channel state information (CSI) includes a channel quality indicator (CQI), a precoding matrix indicator (PMI), a precoding type indicator (PTI), and a rank indicator (RI). Each indicator is sometimes described as an indication, but its use and meaning are the same. Furthermore, the format of the PUCCH may be switched depending on the UCI to be transmitted. For example, when the UCI is constituted of HARQ-ACK information and/or an SR, the UCI may be transmitted on a PUCCH having the format 1/1a/1b/3 (PUCCH format 1/1a/1b/3). Furthermore, when the UCI is constituted of CSI, the UCI may be transmitted on a PUCCH having the format 2/2a/2b (PUCCH format 2/2a/2b). Furthermore, in order to prevent conflict with an SRS, the PUCCH format 1/1a/1b has a shortened format in which one symbol is punctured, and a normal format in which no symbol is punctured. For example, when the simultaneous transmission of the PUCCH and the SRS is enabled in the same subframe, the PUCCH format 1/1a/1b is transmitted in a shortened format in the SRS subframe. When the simultaneous transmission of the PUCCH and the SRS is not enabled in the same subframe, the PUCCH format 1/1a/1b is transmitted in the normal format in the SRS subframe. At this time, the SRS does not have to be transmitted even when the SRS transmission occurs.

A CSI report includes a periodic CSI report in which the channel state information is reported either periodically or when an event condition for triggering the CSI report is satisfied, and an aperiodic CSI report in which the channel state information is reported when the CSI report is requested by a CSI request included in the DCI format. The periodic CSI report is performed either on the PUCCH or the PUSCH, and the aperiodic CSI report is performed on the PUSCH. When being instructed on the basis of the information included in the DCI format (the CSI request), the terminal device 2 can also transmit CSI without uplink data on the PUSCH.

The uplink reference signal (UL-RS) includes a demodulation reference signal (DMRS) that the base station device 1 uses for demodulation of the physical uplink control channel PUCCH and/or the physical uplink shared channel PUSCH, and a sounding reference signal (SRS) that the base station device 1 uses mainly for estimation of the uplink channel state. Furthermore, the sounding reference signal includes a periodic sounding reference signal (Periodic SRS (P-SRS)) that is configured to be transmitted periodically by a higher layer, and an aperiodic sounding reference signal (Aperiodic SRS (A-SRS)) of which transmission is requested by an SRS request included in a downlink control information format. The uplink reference signal is sometimes referred to as an uplink pilot signal or an uplink pilot channel.

It should be noted that a sequence of these uplink reference signals may be generated on the basis of a pseudo-random sequence. Furthermore, the sequence of these uplink reference signals may be generated on the basis of a Zadoff-Chu sequence. Furthermore, the sequence of these uplink reference signals may be generated on the basis of a Gold sequence. Furthermore, the sequence of these uplink reference signals may be a variant or modification of the pseudo-random sequence, Zadoff-Chu sequence, or Gold sequence.

Furthermore, the periodic sounding reference signal is sometimes referred to as a periodic sounding reference signal, or a trigger type 0 sounding reference signal (Trigger Type 0 SRS). Furthermore, the aperiodic sounding reference signal is sometimes referred to as an aperiodic sounding reference signal, or a trigger type 1 sounding reference signal (Trigger Type 1 SRS).

In addition, the A-SRS may be divided into a signal specialized in uplink channel estimation (for example, it is sometimes referred to as trigger type 1a SRS), and a signal used for causing the base station device 1 to measure the channel state (CSI, CQI, PMI, RI) by using channel reciprocity in the TDD (for example, it is sometimes referred to as trigger type 1b SRS), in coordinated communication. It should be noted that the DMRS is configured for both the PUSCH and the PUCCH. Furthermore, the DMRS is time-multiplexed with the PUSCH or the PUCCH in the same subframe.

Furthermore, the time multiplexing method for the DMRS may differ between when the DMRS corresponds to the PUSCH and when the DMRS corresponds to the PUCCH. For example, the DMRS for the PUSCH is mapped to only one of seven symbols in one slot, whereas the DMRS for the PUCCH is mapped to three of seven symbols in one slot.

Furthermore, the SRS is announced for various types of parameters (such as bandwidth, cyclic shift, and transmission subframe) by higher layer signalling. Furthermore, the subframe in which the SRS is transmitted is determined in accordance with the information on the transmission subframe included in the configuration of the SRS announced with the higher layer signalling. The information on the transmission subframe includes information that is configured specifically for a cell (shared information) and information that is configured specifically for a terminal device (dedicated information or individual information). The information configured specifically for a cell includes information indicating the subframe in which an SRS shared by all the terminal devices 2 in the cell is transmitted. Furthermore, the information configured specifically for a terminal device includes information indicating a subframe offset that is a subset of the subframe configured specifically for a cell, and the periodicity. On the basis of such information, the terminal device 2 can determine the subframe in which the SRS can be transmitted (sometimes referred to as an SRS subframe or an SRS transmission subframe). Furthermore, in the subframe in which the SRS configured specifically for the cell is transmitted, when transmitting the PUSCH, the terminal device 2 can puncture only as many time resources of the PUSCH as the number of symbols in which the SRS is transmitted, and transmit the PUSCH in the punctured time resources. As a result, conflict between the transmission of the PUSCH and the transmission of the SRS among the terminal devices 2 can be avoided. This configuration makes it possible to prevent degradation in performance for the terminal device 2 that transmits the PUSCH. Furthermore, it is possible to secure channel estimation accuracy for the terminal device 2 that transmits the SRS. Here, the information configured specifically for a terminal device may be configured independently in the P-SRS and the A-SRS.

For example, when various types of parameters are configured by higher level signalling, the first uplink reference signal is transmitted periodically in the configured transmission subframes. Furthermore, the second uplink reference signal is transmitted aperiodically when a transmission request is indicated by a field (SRS request) related to the transmission request of the second uplink reference signal included in the downlink control information format. When an SRS request included in a certain downlink control information format indicates a positive index (value) or an index (value) equivalent to positive, the terminal device 2 transmits an A-SRS in a prescribed transmission subframe. Furthermore, when the detected SRS request indicates a negative index (value) or an index (value) equivalent to negative, the terminal device 2 does not transmit an A-SRS in a prescribed subframe. It should be noted that the information configured specifically for a cell (shared parameters, shared information) is announced with the system information or the dedicated control channel. Furthermore, the information configured specifically for a terminal device (dedicated parameter, individual parameter, dedicated information, individual information) is announced on a common control channel (CCH). Such information may be announced with an RRC message. The RRC message may be announced by a higher layer.

The physical random access channel (PRACH) is a channel used for announcement of a preamble sequence, and has a guard time. The preamble sequence is configured to express six-bit information by preparing 64 types of sequences. The physical random access channel is used for accessing the base station device 1 of the terminal device 2. The terminal device 2 uses the physical random access channel for requesting the base station device 1 to perform a radio resource request in response to a scheduling request (SR) when the physical uplink control channel has not been configured, and transmission timing alignment information (also referred to as timing advance (TA)) is necessary for matching an uplink transmission timing with a reception timing window of the base station device.

Specifically, the terminal device 2 transmits the preamble sequence with the radio sequence for the physical random access channel that is configured by the base station device 1. The terminal device 2 that receives the transmission timing alignment information configures a transmission timing timer for measuring the available time of the transmission timing alignment information configured commonly by broadcast information (or configured individually in the layer 3 message), and manages the state of the uplink as a transmission timing adjusted state during the available time of the transmission timing timer (when the timer is in operation), and as a transmission timing non-adjusted state (transmission timing unadjusted state) outside the available period (when the time is not in operation). The layer 3 message is a control plane (C-plane) that is exchanged between the terminal device 2 and the radio resource control (RRC) layer of the base station device 1. The layer 3 message is used with the same meaning as RRC signalling or an RRC message. Furthermore, the RRC signalling is sometimes referred to as higher layer signalling or dedicated signalling.

The random access procedure includes two random access procedures: a contention based random access procedure and a non-contention based random access procedure. The contention based random access procedure is a random access in which a collision may occur among a plurality of terminal devices 2.

Furthermore, the non-contention based random access procedure is a random access in which a collision does not occur among a plurality of terminal devices 2.

The non-contention based random access procedure includes three steps, and the base station device 1 announces random access preamble assignment to the terminal device 2 with downlink dedicated signalling. At that time, the random access preamble assignment is performed when the base station device 1 assigns the random access preamble for non-contention to the terminal device 2, which is transmitted by a source base station (Source eNB) for handover, and is signaled by a handover command generated by a target base station device (Target eNB), or the PDCCH in the case of downlink data arrival.

The terminal device 2 that has received the random access preamble assignment transmits the random access preamble (message 1) on the RACH in the uplink. At that time, the terminal device 2 transmits the assigned random access preamble for non-contention.

The base station device 1 that has received the random access preamble transmits a random access response to the terminal device 2 on the downlink data (Downlink Shared Channel (DL-SCH)). Furthermore, the information transmitted by the random access response includes the initial uplink grant (random access response grant) and the timing alignment information for the handover, the timing alignment information for the downlink data arrival, and a random access preamble identifier. The downlink data is sometimes referred to as the downlink shared channel data (DL-SCH data).

Here, the non-contention based random access procedure is applied to the handover downlink data arrival and positioning. The contention based random access procedure is applied to the initial access from RRC_IDLE, RRC connection re-establishment, handover, downlink data arrival, and uplink data arrival.

The random access procedure according to the present embodiment is a contention based random access procedure. An example of the contention based random access procedure will be described.

The terminal device 2 acquires a system information block type 2 (SIB 2) transmitted by the base station device 1. The SIB 2 is a common configuration (common information) for all terminal devices 2 (or a plurality of terminal devices 2) in a cell. For example, the common configuration includes the configuration of the PRACH.

The terminal device 2 randomly selects the number of the random access preamble. Furthermore, the terminal device 2 transmits the random access preamble of the selected number (message 1) to the base station device 1 on the PRACH. The base station device 1 uses the random access preamble to estimate the transmission timing in the uplink.

The base station device 1 transmits the random access response (message 2) on the PDSCH. A plurality of pieces of information on the random access preamble detected by the base station device 1 is included in the random access response. For example, the plurality of pieces of information includes the number of the random access preamble, the temporary C-RNTI, the timing advance command (TA command), and the random access response grant.

The terminal device 2 transmits (initially transmits) the uplink data (message 3) on the PUSCH scheduled by using the random access response grant. The uplink data includes an identifier (information indicating the Initial UE-Identity or the C-RNTI) for identifying the terminal device 2.

Upon failing to decode the uplink data, the base station device 1 instructs retransmission of the uplink data by using a DCI format to which CRC parity bits scrambled with a temporary C-RNTI have been added. Upon being instructed to retransmit the uplink data by the DCI format, the terminal device 2 retransmits the same uplink data on the PUSCH scheduled by using the DCI format to which the CRC parity bits scrambled with the temporary C-RNTI have been added.

Furthermore, upon failing to decode the uplink data, the base station device 1 can instruct retransmission of the uplink data on the PHICH (NACK). Upon being instructed to retransmit the uplink data by the NACK, the terminal device 2 retransmits the same uplink data on the PUSCH.

Upon successfully decoding the uplink data to acquire the uplink data, the base station device 1 can determine whether the terminal device 2 has transmitted the random access preamble and the uplink data. That is, before successfully decoding the uplink data, the base station device 1 cannot determine whether the terminal device 2 has transmitted the random access preamble and the uplink data.

Upon receiving the message 3 including the Initial UE-Identity, the base station device 1 transmits a contention resolution identity (message 4) generated on the basis of the received Initial UE-Identity to the terminal device 2 on the PDSCH. Upon the received contention resolution identity matching the transmitted Initial UE-Identity, the terminal device 2 considers the contention resolution of the random access preamble as successful (1); sets the value of the Temporary C-RNTI to C-RNTI (2); discards the Temporary C-RNTI (3); and considers that the random access procedure has been completed with a successful result (4).

Furthermore, upon receiving the message 3 including information indicating the C-RNTI, the base station device 1 transmits, to the terminal device 2, a DCI format (message 4) to which CRC parity bits scrambled with the received C-RNTI have been added. Upon decoding the DCI format to which the CRC parity bits scrambled with the C-RNTI have been added, the terminal device 2 considers that contention resolution of the random access preamble is successful (1); discards the Temporary C-RNTI (2); and considers that the random access procedure has been completed with a successful result (3).

That is, as part of a contention based random access procedure, the base station device 1 schedules the PUSCH by using the random access response grant.

The terminal device 2 transmits the uplink data (message 3) on the PUSCH scheduled by using the random access response grant. That is, as part of the contention based random access procedure, the terminal device 2 performs transmission on the PUSCH corresponding to the random access response grant.

Furthermore, as part of the contention based random access procedure, the base station device 1 schedules the PUSCH by using a DCI format to which CRC scrambled with the Temporary C-RNTI have been added. Furthermore, as part of the contention based random access procedure, the base station device 1 schedules/instructs transmission on the PUSCH by using the PHICH (NACK).

The terminal device 2 transmits (retransmits) the uplink data (message 3) on the PUSCH scheduled by using the DCI format to which the CRC scrambled with the Temporary C-RNTI have been added. Furthermore, in response to the reception of the PHICH, the terminal device 2 transmits (retransmits) the uplink data (message 3) on the scheduled PUSCH. That is, as part of the contention based random access procedure, the terminal device 2 performs transmission on the PUSCH corresponding to the retransmission of the same uplink data (transport block).

Hereinafter, a logical channel will be described. The logical channel is used for transmission of an RRC message and an information element. Furthermore, the logical channel is transmitted on a physical channel via a transport channel.

A broadcast control channel (BCCH) is a logical channel used for broadcast of system control information. For example, system information and information necessary for initial access is transmitted on this channel. A master information block (MIB) and a system information block type 1 (SIB 1) are transmitted on this logical channel.

A common control channel (CCCH) is a logical channel used for transmission of control information between a network and a terminal device that does not have an RRC connection with the network. For example, terminal-specific control information and configuration information is transmitted on this logical channel.

A dedicated control channel (DCCH) is a logical channel used for transmission of dedicated control information (individual control information) bidirectionally between the network and the terminal device 2 that has an RRC connection. For example, cell-specific reconfiguration information is transmitted on this logical channel.

Signalling using the CCCH and the DCCH is sometimes collectively referred to as RRC signalling.

Information on uplink power control includes information announced as broadcast information, information announced as information shared among the terminal devices 2 in the same cell (shared information), and information announced as terminal device-specific dedicated information. The terminal device 2 sets the transmit power on the basis of the information announced as broadcast information, or both of the information announced as broadcast information/shared information and the information announced as dedicated information.

Radio resource control configuration shared information may be announced as broadcast information (or system information). Also, the radio resource control configuration shared information may be announced as dedicated information (mobility control information).

The radio resource configuration includes a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration related to uplink power control, and a configuration related to an uplink cyclic prefix length. In other words, the radio resource configuration is configured to announce a parameter used for generating a physical channel/physical signal. The announced parameter (information element) may differ between the case of being announced as broadcast information and the case of being announced as reconfiguration information.

Information elements necessary for configuring parameters related to various types of physical channels/physical signals (PRACH, PUCCH, PUSCH, SRS, UL DMRS, CRS, CSI-RS, PDCCH, PDSCH, PSS/SSS, UERS, PBCH, PMCH, and the like) include shared configuration information shared among the terminal devices 2 in the same cell, and dedicated configuration information configured for each terminal device 2. The shared configuration information may be transmitted by system information. Furthermore, for reconfiguration, the shared configuration information may be transmitted as dedicated information. These configurations include a configuration of parameters. The configuration of parameters includes a configuration of values of parameters. Furthermore, when the parameters are managed in the form of a table, the configuration of parameters includes a configuration of index values.

The information on the parameters of the above-described physical channels is transmitted to the terminal device 2 by using an RRC message. In other words, the terminal device 2 configures resource allocation and transmit power of each physical channel on the basis of the received RRC message. The RRC message includes a message related to a broadcast channel, a message related to a multicast channel, a message related to a paging channel, a message related to each downlink channel, a message related to each uplink channel, and the like. Each RRC message may include an information element (IE). Furthermore, the information element may include information corresponding to the parameter. It should be noted that the RRC message is sometimes referred to as a message. Furthermore, a message class is a set of one or more messages. The message may include an information element. The information element includes an information element related to radio resource control, an information element related to security control, an information element related to mobility control, an information element related to measurement, an information element related to a multimedia broadcast multicast service (MBMS), and the like. Furthermore, the information element may include a lower information element. The information element may be configured as a parameter. Furthermore, the information element may be defined as control information indicating one or more parameters.

The information element (IE) is used for stipulating (specifying, configuring) parameters for various types of channels/signals/information in system information (SI) or dedicated signaling. Furthermore, some of the information elements include one or more fields. The information element may include one or more information elements. It should be noted that a field included in the information element are sometimes referred to as a parameter. In other words, the information element may include one or more (types of) parameters. Furthermore, the terminal device 2 performs radio resource allocation control, uplink power control, transmission control, and the like on the basis of various types of parameters. Furthermore, the system information may be also defined as an information element.

An Information element may be configured to a field included in an information element. Furthermore, a parameter may be configured to a field included in an information element.

The RRC message includes one or more information elements. Furthermore, the RRC message to which a plurality of RRC messages are set is referred to as a message class.

Parameters related to uplink transmit power control announced to the terminal device 2 by using the system information include the standard power for the PUSCH, the standard power for the PUCCH, a path loss compensation coefficient α, a list of power offsets configured for each PUCCH format, and power offsets of the preamble and message 3. In addition, parameters related to a random access channel announced to the terminal device 2 by using the system information include a parameter related to a preamble, a parameter related to transmit power control of the random access channel, and a parameter related to transmission control of a random access preamble. These parameters are used at an initial access or during a reconnection/re-establishment after the occurrence of a radio link failure (RLF).

Information used for configuration of the transmit power may be announced to the terminal device 2 as broadcast information. Furthermore, information used for configuration of the transmit power may be announced to the terminal device 2 as shared information. Further, information used for configuration of the transmit power may be announced to the terminal device 2 as dedicated information (individual information).

First Embodiment

A first embodiment of the present invention will be described below. A communication system according to the first embodiment includes a primary base station device (also referred to as a macro base station device, a first base station device, a first communication device, a serving base station device, an anchor base station device, a master base station device, a first access point, a first point, a first transmission point, a first reception point, a macro cell, a first cell, a primary cell, a master cell, or a master small cell) as a base station device 1 (also referred to as an access point, a point, a transmission point, a reception point, a cell, a serving cell, a transmission device, a reception device, a transmission station, a reception station, a transmit antenna group, a transmit antenna port group, a receive antenna group, a receive antenna port group, a communication device, a communication terminal, or an eNode B, hereinafter). It should be noted that a primary cell and a master cell (master small cell) may be configured independently. In addition, the communication system according to the first embodiment may include a secondary base station device (also referred to as a remote radio head (RRH), a remote antenna, an overhang antenna, a distributed antenna, a second access point, a second point, a second transmission point, a second reception point, a reference point, a low power base station device (low power node (LPN)), a micro base station device, a pico base station device, a femto base station device, a small base station device, a local area base station device, a phantom base station device, a home (indoor) base station device (Home eNode B, Home Node B, HeNB, HNB), a second base station device, a second communication device, a coordinated base station device group, a coordinated base station device set, a coordinated base station device, a micro cell, a pico cell, a femto cell, a small cell, a phantom cell, a local area, a second cell, or a secondary cell). Furthermore, the communication system according to the first embodiment includes a terminal device 2 (also referred to as a mobile station, a mobile station device, a mobile terminal, a reception device, a transmission device, a reception terminal, a transmission terminal, a third communication device, a receive antenna group, a receive antenna port group, a transmit antenna group, a transmit antenna port group, a user device, or a user terminal (user equipment (UE)), hereinafter). Here, the secondary base station device may be indicated as a plurality of secondary base station devices. For example, the primary base station device and the secondary base station device may communicate with the terminal device by using a heterogeneous network deployment in which all or a part of the coverage of the secondary base station device is included in the coverage of the primary base station device.

Furthermore, the communication system according to the first embodiment includes the base station device 1 and the terminal device 2. A single base station device 1 may manage one or more terminal devices 2. Furthermore, a single base station device 1 may manage one or more cells (serving cells, primary cells, secondary cells, femto cells, pico cells, small cells, or phantom cells). Furthermore, a single base station device 1 may manage one or more frequency bands (component carriers, carrier frequencies). Furthermore, a single base station device 1 may manage one or more low power base station devices (low power nodes (LPNs)). Furthermore, a single base station device 1 may manage one or more home (indoor) base station devices (Home eNodeB (HeNB)). Furthermore, a single base station device 1 may manage one or more access points. The base station devices 1 may be interconnected through either wired communication (an optical fiber, a copper wire, a coaxial cable, or the like) or wireless communication (an X2 interface, an X3 interface, an Xn interface, or the like). In other words, between a plurality of base station devices 1, communication may be performed at a high speed (without delay) with an optical fiber (ideal backhaul), or communication may be performed at a low speed through an X2 interface (non-ideal backhaul). At that time, various types of information on the terminal device 2 (such as the configuration information, the channel state information (CSI), the capability information of the terminal device 2 (UE capability), information for a handover, and the like) may be communicated. Furthermore, a plurality of base station devices 1 may be managed through a network. Furthermore, a single base station device 1 may manage one or more relay stations (Relays).

Furthermore, the communication system according to the first embodiment may realize coordinated communication (Coordination Multiple Points (CoMP)) by a plurality of base station devices, low power base station devices or home base station devices. In other words, the communication system according to the first embodiment may perform dynamic point selection (DPS) by which a point where communication is performed with the terminal device 2 (a transmission point and/or a reception point) is switched dynamically. Furthermore, the communication system according to the first embodiment may perform coordinated scheduling (CS) and coordinated beamforming (CB). Furthermore, the communication system according to the first embodiment may perform joint transmission (JT) and joint reception (JR).

Furthermore, a plurality of low power base station devices or small cells deployed closely may be clustered (or grouped). The plurality of low power base station devices that have been clustered may announce the same configuration information. Furthermore, a region (coverage) of the clustered small cell is sometimes referred to as a local area.

In downlink transmission, the base station device 1 is sometimes referred to as a transmission point (TP). Furthermore, in uplink transmission, the base station device 1 is sometimes referred to as a reception point (RP). Furthermore, the downlink transmission point and the uplink reception point may be a path loss reference point (reference point) for downlink path loss measurement. Furthermore, the reference point for path loss measurement may be configured independently from the transmission point and reception point.

The small cell, the phantom cell, and the local area cell may be configured as the third cell. The small cell, the phantom cell, and the local area cell may be reconfigured as the primary cell. The small cell, the phantom cell, and the local area cell may be reconfigured as the secondary cell. The small cell, the phantom cell, and the local area cell may be reconfigured as the serving cell. The small cell, the phantom cell, and the local area cell may be included in the serving cell.

The base station device 1 that can constitute a small cell may perform discrete reception (DRX) and discrete transmission (DTX), if necessary. Furthermore, the base station device 1 that can constitute a small cell may turn the power of some of the devices (for example, a transmission unit and a reception unit) on/off either intermittently or semi-statically.

An independent identifier (identity (ID)) may be configured for a base station device 1 that constitutes a macro cell and a base station device 1 that constitutes a small cell. In other words, the identifiers of the macro cell and the small cell may be configured independently. For example, when cell-specific reference signals (CRS) are transmitted from a macro cell and a small cell, the cell-specific reference signals may be scrambled with different identifiers even if the transmission frequency and the radio resource are the same. The cell-specific reference signal for the macro cell may be scrambled with a physical layer cell identity (physical layer cell ID (PCI)), and the cell-specific reference signal for the small cell may be scrambled with a virtual cell identity (virtual cell ID (VCI)). In the macro cell, the signal may be scrambled with the physical layer cell identity (physical layer cell ID (PCI)), and in the small cell, the signal may be scrambled with a global cell identity (global cell ID (GCI)). In the macro cell, the signal may be scrambled with a first physical layer cell ID, and in the small cell, the signal may be scrambled with a second physical layer cell ID. In the macro cell, the signal may be scrambled with a first virtual cell ID, and in the small cell, the signal may be scrambled with a second virtual cell ID. Here, the virtual cell ID may be an ID that is configured in a physical channel/physical signal. Furthermore, the virtual cell ID may be an ID that is configured independently from the physical layer cell ID. Furthermore, the virtual cell ID may be an ID that is used for scrambling of a sequence used for a physical channel/physical signal.

In a small cell, a serving cell configured as a small cell, or a component carrier corresponding to a small cell, some of the physical channels/physical signals may not be transmitted. For example, the cell-specific reference signal(s) (CRS(s)) and the physical downlink control channel (PDCCH) does not have to be transmitted. Furthermore, in a small cell, a serving cell configured as a small cell, or a component carrier corresponding to a small cell, a new physical channel/physical signal may be transmitted.

The composition of one or a plurality of HARQ-ACK feedback bits $\{o^{ACK}_{c, 0}, o^{ACK}_{c, 1}, \ldots, o^{ACK}_{c, O_{ACKc}-1}\}$ will be described below.

The HARQ-ACK bit is received, from a higher layer, for each subframe of each cell. Each positive response (ACK) is encoded as bit value '1', and each negative response (NACK) is encoded as bit value '0'. When a PUCCH format 3 is configured in the higher layer and is used for transmission of HARQ-ACK feedback information, the HARQ-ACK feedback is constituted of linking of HARQ-ACK bits in each serving cell. In a cell in which a transmission mode 1, 2, 5, 6, or 7 is configured, such as a single codeword transmission mode, 1-bit HARQ-ACK information $a_k$ is used in the cell. In a cell in which the other transmission modes, that is, two or more codeword transmission modes, are set, 2-bit HARQ-ACK information $a_k$, $a_{k+1}$ is used in the cell. Here, $a_k$ corresponds to codeword 0, and $a_{k+1}$ corresponds to codeword 1.

For the HARQ-ACK feedback bit $\{o^{ACK}_{c, 0}, o^{ACK}_{c, 1}, \ldots, o^{ACK}_{c, O_{ACKc}-1}\}$, the region is configured individually by a serving cell c.

The HARQ-ACK feedback bit for each serving cell c is rearranged in a bit string of the HARQ-ACK feedback bits aggregated in all serving cells before being coded. The HARQ-ACK feedback bits aggregated in all serving cells are allocated in order starting from the smallest index of the serving cell. Furthermore, the plurality of HARQ-ACK feedback bits for each serving cell are allocated in order starting from the smallest value of a DAI included in received downlink grant.

An HARQ process will be described below.

The retransmission process of the PDSCH is an asynchronous HARQ in which the downlink subframe and retransmission timing of the PDSCH are configured independently. Therefore, an HARQ process number is used for linking the initially-transmitted PDSCH and the retransmitted PDSCH. The base station device 1 announces the HARQ process number to the terminal device 2 by the DCI included in the PDCCH indicating the retransmitted PDSCH. From the HARQ process number included in the DCI, the terminal device 2 performs HARQ combining on the PDSCH that is linked with the HARQ process number and that is buffered, and the retransmitted PDSCH. Chase combining (CC), incremental redundancy (IR), or the like is used for the HARQ synthesis. The maximum number of downlink HARQ processes is eight in FDD and 15 in TDD. As the maximum number of downlink HARQ processes increases, the bit field of the DCI for announcing the HARQ process number is configured to have 3 bits in an FDD cell and 4 bits in the TDD.

Next, a process or configuration related to a PUCCH resource of HARQ-ACK information will be described. The HARQ-ACK information includes response information for PDSCH transmission indicated by detection of a control channel, and response information for a control channel including control information indicating release (or end) of semi-persistent scheduling (SPS). The HARQ-ACK information indicates an ACK indicating that the response has been successfully received, a NACK indicating that the response has failed to be received, and/or a DTX that indicates that the response has not been transmitted (or not received).

The terminal device 2 transmits the HARQ-ACK information to the base station device 1 on the PUCCH and/or the PUSCH. The base station device 1 receives the HARQ-ACK information from the terminal device 2 on the PUCCH and/or the PUSCH. This configuration enables the base station device 1 to determine whether the terminal device 2 has successfully received the PDSCH or the control channel.

Next, a PUCCH resource for the base station device 1 will be described. The HARQ-ACK information is spread over an SC-FDMA sample region by using a pseudo constant-amplitude zero-auto correlation (CAZAC) sequence on which a cyclic shift has been performed, and in addition, is spread over four SC-FDMA symbols in the slot by using an orthogonal cover code (OCC) having a code length of 4. Furthermore, the symbols spread by two codes are mapped to two RBs having different frequencies. In this way, the PUCCH resource is stipulated with three elements, namely a cyclic shift amount, an orthogonal code, and/or RBs to which mapping is performed. It should be noted that the cyclic shift in the SC-FDMA sample region can also be represented by a phase rotation that increases uniformly in the frequency domain.

The uplink control channel region (PUCCH region) used for transmission of the PUCCH has a predetermined number of RB pairs, and is constituted of the RB pairs at both ends of the uplink system bandwidth. The physical resource used for transmission of the PUCCH is constituted of two RBs having different frequencies in the first slot and the second slot. A physical resource used for transmission of the PUCCH is represented by m (m=0, 1, 2, . . . ). One PUCCH is allocated in a physical resource used for transmission of any PUCCH. As a result, one PUCCH is transmitted in resources having different frequencies, which obtains a frequency diversity effect.

A PUCCH resource (uplink control channel logical resource) to be used for transmission of the PUCCH is stipulated by using orthogonal codes, a cyclic shift amount, and/or a frequency resource. For example, a PUCCH resource may be used when elements included therein are assumed to be three orthogonal codes of OC0, OC1, and OC2, six cyclic shift amounts of CS0, CS2, CS4, CS6, CS8, and CS10, and 'm' indicating a frequency resource. Each combination of the orthogonal code, the cyclic shift amount, and 'm' is stipulated uniquely in correspondence to an nPUCCH which is an index indicating the uplink control channel logical resource (PUCCH resource). The index indicating the PUCCH resource is also referred to as a PUCCH resource number. It should be noted that the correspondence between the nPUCCH and each combination of the orthogonal code, the cyclic shift amount, and 'm' is only an example, and other correspondences are also possible. For example, the correspondence may be such that the cyclic shift amount, or the 'm' changes among continuous nPUCCHs. Furthermore, CS1, CS3, CS5, CS7, CS9, and CS11 which are different cyclic shift amount from CS0, CS2, CS4, CS6, CS8, and CS10 may be used. Furthermore, a case where the value of 'm' is NF2 or more is indicated here. A frequency resource for which 'm' is less than NF2 is a frequency resource with two NFs that are reserved for PUCCH transmission for the feedback of channel state information.

Next, a transmission mode used for transmission of the HARQ-ACK information will be described. Various transmission modes (transmission methods) are stipulated for the HARQ-ACK information. The transmission mode used for transmission of the HARQ-ACK information is determined on the basis of the information or configuration specific to the base station device 1, the information or configuration specific to the terminal device 2, and/or the information on the PDCCH corresponding to the HARQ-ACK information, and the configuration of the higher layer. The transmission modes used for transmission of the HARQ-ACK information include HARQ-ACK information bundling (HARQ-ACK bundling) and HARQ-ACK information multiplexing (HARQ-ACK multiplexing).

A plurality of pieces of HARQ-ACK information may be transmitted in a certain uplink subframe. The number of HARQ-ACK information transmitted in a certain uplink subframe is determined on the basis of the number of codewords (transport blocks) transmitted on one PDSCH, a subframe configuration, and/or a carrier aggregation configuration. For example, on one PDSCH, at most two codewords can be transmitted by Multi Input Multi Output (MIMO) transmission, and HARQ-ACK information is generated for each codeword. Furthermore, for example, in TDD, the type of the subframe is determined on the basis of the subframe configuration. Therefore, in a certain uplink subframe, when the HARQ-ACK information for PDSCH transmission is transmitted in a plurality of downlink subframes, a plurality of pieces of HARQ-ACK information are generated in response to the codeword on the PDSCH in each downlink subframe. Furthermore, for example, when carrier aggregation is configured with a plurality of cells, a plurality of pieces of HARQ-ACK information are generated in response to the codeword on the PDSCH transmitted in each cell.

When a plurality of pieces of HARQ-ACK information are transmitted in a certain uplink subframe, the pieces of HARQ-ACK information are transmitted by using HARQ-ACK information bundling and/or HARQ-ACK information multiplexing.

In the HARQ-ACK information bundling, a logical AND operation is performed on a plurality of pieces of HARQ-ACK information. The HARQ-ACK information bundling can be performed in various units. For example, the HARQ-ACK information bundling is performed on all codewords in the plurality of downlink subframes. The HARQ-ACK information bundling is performed on all codewords in one downlink subframe. Particularly, the HARQ-ACK information bundling performed on all codewords in one downlink subframe in one serving cell is also referred to as spatial HARQ-ACK information bundling. The HARQ-ACK information bundling can reduce the amount of HARQ-ACK information. With regards to HARQ-ACK information multiplexing, a multiplexing operation is performed on a plurality of pieces of HARQ-ACK information. It should be noted that information on which HARQ-ACK information bundling has been performed may further be multiplexed. In the description below, information on which HARQ-ACK information bundling has been performed is also simply referred to as HARQ-ACK information.

Furthermore, a plurality of types of formats can be stipulated for a PUCCH that transmits the HARQ-ACK information. The formats of a PUCCH that transmits the HARQ-ACK information include a PUCCH format 1a, a PUCCH format 1b, a PUCCH format 1b with channel selection, a PUCCH format 3, and the like. A transmission mode used for transmission of the HARQ-ACK information also includes a PUCCH format to be transmitted.

The PUCCH format 1a is a PUCCH format used for transmission of 1-bit HARQ-ACK information. When the HARQ-ACK information is transmitted in the PUCCH format 1a, one PUCCH resource is allocated, and the HARQ-ACK information is transmitted with the PUCCH resource.

The PUCCH format 1b is a PUCCH format used for transmission of 2-bit HARQ-ACK information. When the HARQ-ACK information is transmitted in the PUCCH format 1b, one PUCCH resource is allocated, and the HARQ-ACK information is transmitted with the PUCCH resource.

The PUCCH format 1b with channel selection is a PUCCH format used for transmission of two, three, or four pieces of HARQ-ACK information. The PUCCH format that is used for transmission of two, three, or four pieces of HARQ-ACK information is respectively configured with two, three, or four PUCCH resources (channels). In channel selection, any one of the plurality of configured PUCCH resources is selected, and the selected PUCCH resource is used as a part of the information. In addition, 2-bit information that can be transmitted with the selected PUCCH resource is also used as a part of the information. The 2-bit information undergoes QPSK modulation, which causes 2-bit information to be transmitted as one symbol. That is, in the PUCCH format 1b with channel selection, two, three, or four pieces of the HARQ-ACK information are transmitted with a combination of PUCCH resources selected from a plurality of configured PUCCH resources, and the 2-bit information that can be transmitted with the selected PUCCH resource. The combination and each piece of HARQ-ACK information are stipulated beforehand. Furthermore, the HARQ-ACK information corresponds to an ACK, an NACK, a DTX, or an NACK/DTX. The NACK/DTX indicates the NACK or the DTX. For example, when carrier aggregation has not been configured, two, three, or four pieces of HARQ-ACK information correspond to HARQ-ACK information on PDSCH transmission that is transmitted in two, three, or four downlink subframes, respectively.

The PUCCH format 3 is a PUCCH format used for transmission of a maximum of 20-bit HARQ-ACK information. One PUCCH resource in the PUCCH format 3 is configured. The one PUCCH resource in the PUCCH format 3 transmits a maximum of 20-bit HARQ-ACK information. A PUCCH resource in the PUCCH format 1a/1b, and a PUCCH resource in the PUCCH format 3 are independent. For example, it is preferable that the base station device 1 is configured so that the PUCCH resource in the PUCCH format 1a/1b and the PUCCH resource in the PUCCH format 3 are constituted of respective different physical resources (that is, two RBs constituting physical resources to be used for transmission of the PUCCH).

When the HARQ-ACK information is transmitted on the PUCCH, the HARQ-ACK information is transmitted after being mapped to the PUCCH resource that is configured either explicitly and/or implicitly. The PUCCH resource used for transmission of the HARQ-ACK information is determined uniquely on the basis of the information or configuration specific to the base station device 1, the information or configuration specific to the terminal device 2, and/or the information on the PDCCH or the EPDCCH corresponding to the HARQ-ACK information. For example, the PUCCH resource number indicating the PUCCH resource to be used for transmission of the HARQ-ACK information is calculated from a parameter included in the information and/or a parameter obtained from the information, and a prescribed method (operation).

In a normal FDD cell (for example, an FDD cell in which carrier aggregation is not performed, and an FDD cell in which carrier aggregation is performed only with another FDD cell), the HARQ-ACK information corresponding to the PDSCH transmitted on a downlink component carrier, or the PDCCH indicating the release (SPS release) of downlink semi-persistent scheduling (SPS) in a subframe n−4 is transmitted on the uplink component carrier corresponding to the downlink component carrier. The HARQ-ACK information corresponding to the PDSCH allocated in a subframe n is transmitted on the PUCCH/PUSCH allocated in the subframe n+4. That is, after receiving the PDSCH in a certain subframe, the terminal device 2 transmits, to the base station, the HARQ-ACK information corresponding to the PDSCH on the PUCCH/PUSCH in the fourth subframe after the certain subframe. As a result, the base station receives, from the terminal device 2, the HARQ-ACK information corresponding to the transmitted PDSCH, which allows the base station to determine whether to retransmit the PDSCH on the basis of the information of the ACK/NACK.

That is, in an FDD cell, when one serving cell is configured for the terminal device 2, or when more than one serving cell is configured for the terminal device 2 and the primary cell is an FDD cell, the terminal device 2 detects, in the subframe n−4, the PDSCH transmission, which is addressed to the terminal device 2 and to which HARQ-ACK information is to be given, and transmits the HARQ-ACK information in the subframe n.

On the other hand, in a normal TDD cell (for example, a TDD cell in which carrier aggregation is not performed, and a TDD cell in which carrier aggregation is performed only with another TDD cell), an uplink subframe is not necessarily configured as a subframe located four subframes after the downlink subframe. Therefore, an uplink subframe corresponding to the downlink subframe is defined. In an example of the details of the HARQ-ACK information multiplexing in PDSCH transmission indicated by the PDCCH or the EPDCCH, the downlink association set shown in FIG. 6 is used. FIG. 6 is a table showing an example of an index K: $\{k_0, k_1, \ldots, k_{M-1}\}$ of the downlink association set. The HARQ-ACK information included in the PUCCH/PUSCH allocated in the subframe n corresponds to the PDSCH indicated by the detection of the associated PDCCH in a subframe $n-k_i$, or the PDCCH indicating the release of the downlink SPS in the subframe $n-k_i$. In other words, the HARQ-ACK information corresponding to the PDSCH indicated by the detection of the PDCCH in the subframe n, or the PDCCH indicating the release of the downlink SPS is transmitted with being included in the PUCCH/PUSCH in a subframe $n+k_i$.

That is, in a TDD cell, when one serving cell is configured for the terminal device 2, or when more than one serving cell is configured for the terminal device 2 and the UL-DL configurations of all serving cells are the same, the terminal device 2 detects, in a subframe n−k, the PDSCH transmission, which is addressed to the terminal device 2 and to which the HARQ-ACK information is to be given, and transmits the HARQ-ACK information in an uplink subframe n. Here, k belongs to a set K (k∈K), and the set K is defined in FIG. 6.

Figure 4:
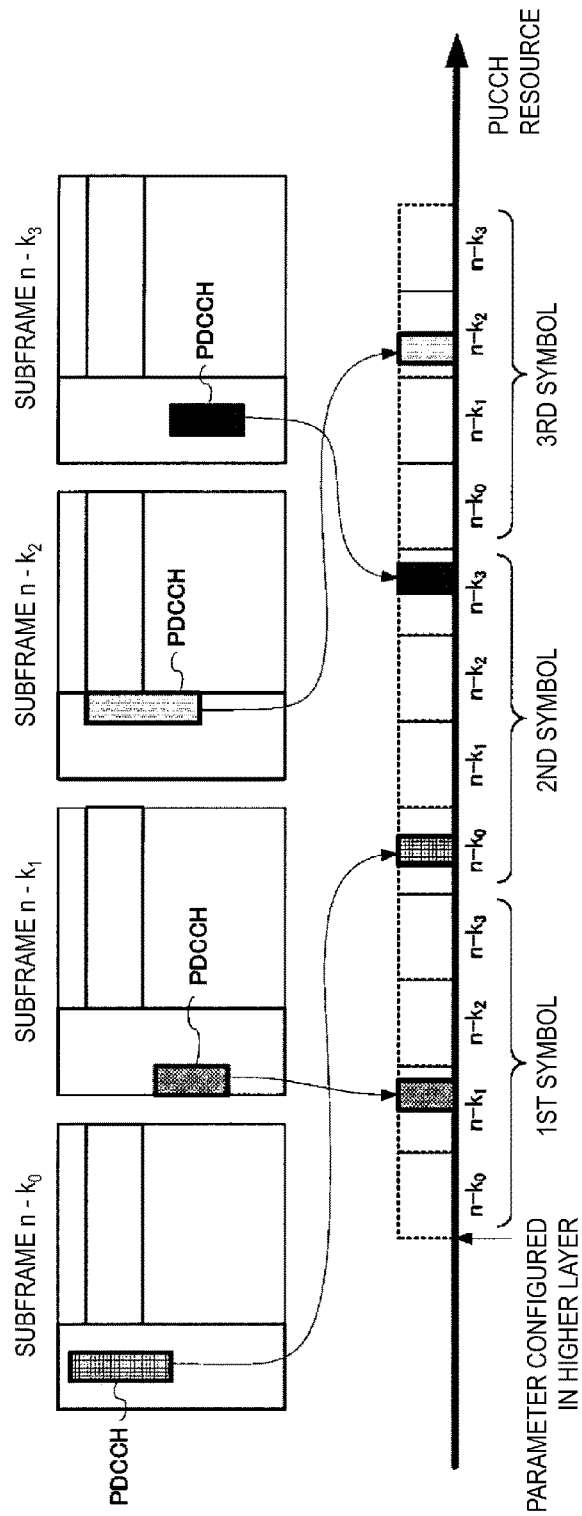
FIG. 4 is a diagram illustrating an example of arrangement of PUCCH resources of HARQ-ACK information corresponding to PDCCHs according to the first embodiment of the present invention.

FIG. 4 is a diagram illustrating an example of HARQ-ACK information multiplexing in PDSCH transmission indicated by the PDCCH in a TDD cell. FIG. 4 illustrates the PUCCH resource used for HARQ-ACK information multiplexing when HARQ-ACK information with respect to four downlink subframes (4 bits) is transmitted with the PUCCH format 1b with channel selection. Furthermore, in a certain uplink subframe n, the PUCCH resource extracted from the subframe $n-k_i$ is illustrated. Here, the subframe $n-k_i$ indicates a subframe located $k_i$ subframes before the subframe n. Furthermore, assuming that the number of subframes (bits) on which HARQ-ACK information multiplexing is performed is M, i is an integer equal to or more than 0 and equal to or less than M−1. In other words, in FIG. 4, in the subframe n, 4-bit HARQ-ACK information is transmitted with PUCCH resources extracted from four downlink subframes (subframe $n-k_0$, subframe $n-k_1$, subframe $n-k_2$, and subframe $n-k_3$). Furthermore, the value of M and the value of $k_i$ are stipulated by the number of the subframe n and the subframe configuration. Here, a time window including a set of subframes represented by n−k (k is each $k_i$ included in K) can be referred to as a bundling window. The number of subframes in the bundling window is M, and the subframes in the bundling window correspond to subframes from a subframe $n-k_0$ to a subframe $n-k_{M-1}$. The size (time length) of the bundling window can vary depending on the subframe n having the corresponding uplink subframe. Furthermore, the size of the bundling window can vary depending on the subframe configuration (UL/DL configuration) of TDD.

It should be noted that, when an FDD cell is redefined in the same manner as the HARQ-ACK information multiplexing in the PDSCH transmission indicated by the PDCCH in the TDD cell, the FDD cell can be rewritten as a downlink association set K in which the value of M of all subframes n is 1, $k_0$ indicating 4 is defined in all subframes n.

The PUCCH resource used for the HARQ-ACK information in the PDSCH transmission indicated by the PDCCH is determined on the basis of at least a parameter $N^{(1)}_{PUCCH}$ configured in the higher layer, and the first CCE number $n_{CCE}$ used for transmission of the PDCCH associated with the HARQ-ACK information. Furthermore, as illustrated in FIG. 4, the index of the PUCCH resource used for the HARQ-ACK information in the PDSCH transmission indicated by the PDCCH is assigned in the order of the OFDM symbols to which the $n_{CCE}$ are mapped in each subframe. That is, block interleaving is performed between the subframes on which the HARQ-ACK information multiplexing is performed. As a result, the number of OFDM symbols constituting a PDCCH region, to which the PDCCH can be mapped, can be configured for each subframe, which increases the possibility for the PUCCH resources to be gathered earlier. Therefore, the PUCCH resources used for the HARQ-ACK information are used efficiently.

Figure 5:
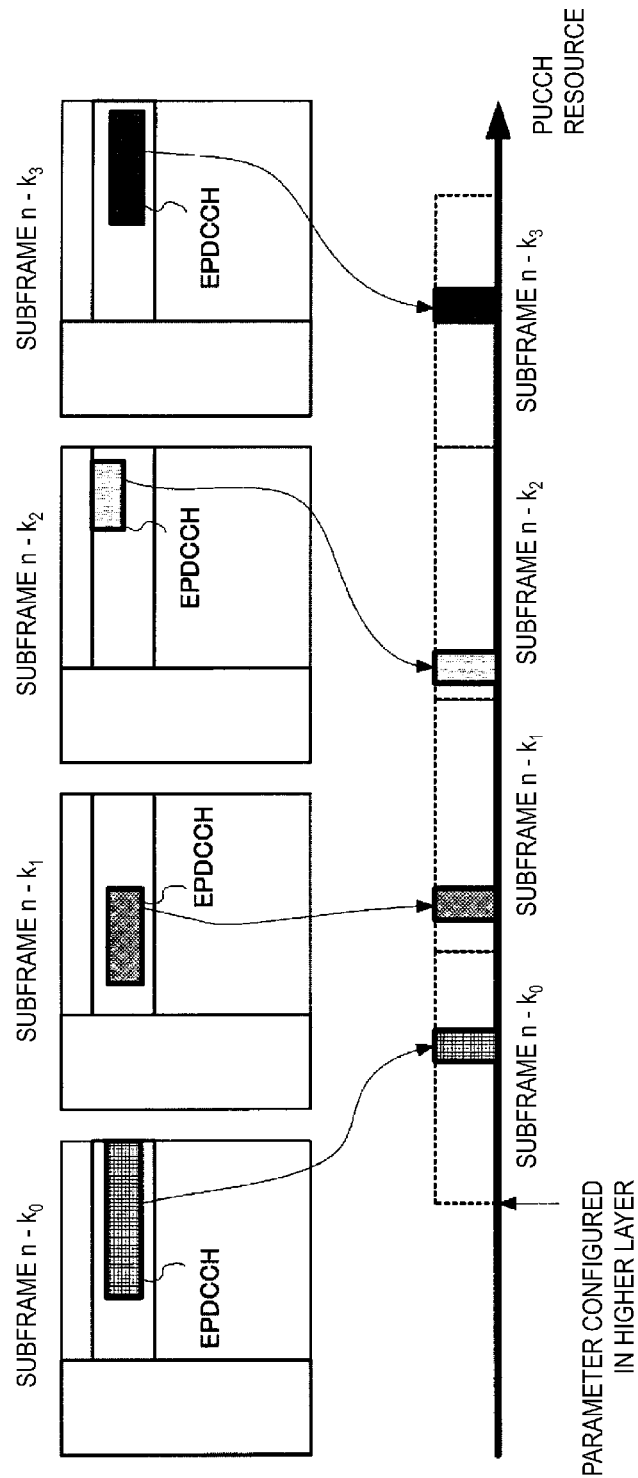
FIG. 5 is a diagram illustrating an example of arrangement of PUCCH resources of HARQ-ACK information corresponding to EPDCCHs according to the first embodiment of the present invention.

FIG. 5 is a diagram illustrating an example of HARQ-ACK information multiplexing in PDSCH transmission indicated by the EPDCCH. FIG. 5 illustrates the PUCCH resource used for HARQ-ACK information multiplexing in a case where the HARQ-ACK information is transmitted for four downlink subframes (4 bits) by using the PUCCH format 1b with channel selection has been illustrated. Furthermore, in a certain uplink subframe n, the PUCCH resource extracted from the subframe $n-k_i$ is illustrated. Here, the subframe $n-k_i$ indicates a subframe located $k_i$ subframes before the subframe n. Furthermore, assuming that the number of subframes (bits) on which HARQ-ACK information multiplexing is performed is M, i is an integer equal to or more than 0 and equal to or less than M−1. In other words, in FIG. 5, in the subframe n, 4-bit HARQ-ACK information is transmitted with the PUCCH resource extracted from four downlink subframes (subframe $n-k_0$, subframe $n-k_1$, subframe $n-k_2$, and subframe $n-k_3$). Furthermore, the value of M and the value of $k_i$ are stipulated by the number of the subframe n and the subframe configuration.

The PUCCH resource used for the HARQ-ACK information in the PDSCH transmission indicated by the EPDCCH is determined on the basis of at least a parameter $N^{(e1)}_{PUCCH}$ configured in the higher layer, and the first CCE number $n_{ECCE}$ used for transmission of the EPDCCH associated with the HARQ-ACK information. Furthermore, as illustrated in FIG. 5, the index of the PUCCH resource used for the HARQ-ACK information in the PDSCH transmission indicated by the EPDCCH is assigned in order starting from the EPDCCH mapped in the subframe $n-k_0$.

The details of the HARQ-ACK information multiplexing in PDSCH transmission indicated by the PDCCH or the EPDCCH will be described below.

In the example of the details of the HARQ-ACK information multiplexing in PDSCH transmission indicated by the PDCCH or the EPDCCH, the downlink association set shown in FIG. 6, and the operation of the PUCCH resource used for transmission of the HARQ-ACK information shown in FIG. 7 are used. FIG. 6 is a table showing an example of an index K: $\{k_0, k_1, \ldots, k_{M-1}\}$ of the downlink association set. FIG. 7 is a table showing an example of an equation used to obtain the PUCCH resource used for transmission of the HARQ-ACK information.

When HARQ-ACK information multiplexing is performed on the subframe n having M more than 1, $n^{(1)}_{PUCCH, i}$, which is the PUCCH resource extracted from the subframe $n-k_i$, and HARQ-ACK (i), which is the ACK/NACK/DTX response from the subframe $n-k_i$, are indicated as shown below. However, M is the number of elements in the set K defined in FIG. 6. M is a number based on the HARQ-ACK information on which multiplexing is performed. Furthermore, $k_i$ is included in the set K, and i is equal to or more than 0, and equal to or less than M−1. For example, when the uplink-downlink configuration is 2, the set K in subframe 2 is $\{8, 7, 4, 6\}$, M is 4, $k_0$ is 8, $k_1$ is 7, $k_2$ is 4, and $k_3$ is 6.

The PUCCH resource for the PDSCH transmission indicated by the detection of the associated PDCCH in the subframe $n-k_i$, or for the PDCCH indicating the release (SPS release) of the downlink semi-persistent scheduling (SPS) in the subframe $n-k_i$ is obtained by an equation (a) in FIG. 7. However, $n_{CCE, i}$ is the number (index) of the first CCE used for transmission of the associated PDCCH in the subframe $n-k_i$, and $N^{(1)}_{PUCCH}$ is a parameter configured in the higher layer. Furthermore, $N^{DL}_{RB}$ is the number of resource blocks in the downlink, and $N^{RB}_{sc}$ is the number of subcarriers per resource block.

Furthermore, the PUCCH resource for the PDSCH transmission indicated by the detection of the associated EPDCCH in the subframe $n-k_i$, or for the EPDCCH indicating the release (SPS release) of the downlink semi-persistent scheduling (SPS) in the subframe $n-k_i$ is obtained by an equation (b-1) and an equation (b-2) in FIG. 7. When an EPDCCH set (EPDCCH-PRB-set) q is set to distributed transmission, the equation (b-1) in FIG. 7 is used for the PUCCH resource. When the EPDCCH set (EPDCCH-PRB-set) q is set to localized transmission, the equation (b-2) in FIG. 7 is used for the PUCCH resource. However, $n_{ECCE, q}$ is the number (index) of the first CCE used for transmission of the associated DCI assignment in the EPDCCH set q in the subframe $n-k_i$. In other words, the number of the CCE is the index of the smallest ECCE used for constituting the EPDCCH. $N^{(e1)}_{PUCCH, q}$ is a parameter configured in the higher layer in the EPDCCH set q. $N^{ECCE, q}_{RB}$ is the total number of resource blocks configured for the EPDCCH set q in the subframe $n-k_i$.

That is, the M number of PUCCH resources are provided in the subframe n. The M number of PUCCH resources are used for transmission of the PUCCH in the PUCCH format 1b with channel selection. For example, when the uplink-downlink configuration is 2, four PUCCH resources are provided in the subframe 2. The four PUCCH resources are used for transmission of the PUCCH in the PUCCH format 1b with channel selection.

Here, a subframe indicated by each of the set K in the downlink association set shown in FIG. 6 is a downlink subframe, a special subframe, and/or a flexible subframe. As a result, even when a flexible subframe can be configured in addition to a downlink subframe and a special subframe, the HARQ-ACK information with respect to the PDSCH transmitted in the downlink subframe, the special subframe, and/or the flexible subframe can be transmitted efficiently.

An uplink reference UL-DL configuration (uplink reference UL/DL configuration, UL-reference UL/DL configuration, first uplink reference UL/DL configuration) and a downlink reference UL-DL configuration (downlink reference UL/DL configuration, DL-reference UL/DL configuration, first downlink reference UL-DL configuration) will be described below.

When the base station device 1 or the terminal device 2 satisfies a certain condition, one of them is configured as the uplink reference UL-DL configuration, and the other is configured as the downlink reference UL-DL configuration. For example, after receiving information on the first configuration and information on the second configuration, the terminal device 2 may be configured with the uplink reference UL-DL configuration and the downlink reference UL-DL configuration. It should be noted that the DCI format associated with the uplink (for example, the DCI format 0/4) may be transmitted in the downlink subframe configured in accordance with the uplink reference UL-DL configuration.

Furthermore, the uplink reference UL-DL configuration and the downlink reference UL-DL configuration may be configured in accordance with the same table. However, when the index of the uplink reference UL-DL configuration and the downlink reference UL-DL configuration is configured in accordance with the same table, the uplink reference UL-DL configuration and the downlink reference UL-DL configuration is preferably configured with different indexes. In other words, different subframe patterns are preferably configured for the uplink reference UL-DL configuration and the downlink reference UL-DL configuration.

Furthermore, the uplink reference UL-DL configuration and the downlink reference UL-DL configuration can be configured independently for one serving cell. Furthermore, the uplink reference UL-DL configuration and the downlink reference UL-DL configuration can be configured individually by self scheduling for scheduling the PDSCH/PUSCH of a serving cell from the PDCCH/EPDCCH of the serving cell, and by cross carrier scheduling for scheduling the PDSCH/PUSCH of a serving cell from the PDCCH/EPDCCH of a serving cell different from the serving cell, for one serving cell.

When a plurality of TDD UL/DL configurations are indicated for one serving cell (the primary cell or the secondary cell), depending on the conditions, one of them may be configured as an uplink reference UL-DL configuration and the other may be configured as a downlink reference UL-DL configuration. It should be noted that the uplink reference UL-DL configuration is used for determination of the correspondence between the subframe in which at least a physical downlink control channel is allocated, and the subframe in which a physical uplink shared channel corresponding to the physical downlink control channel is allocated, and may be different from the actual transmission direction (in other words, the uplink or the downlink) of the signal. The downlink reference UL-DL configuration is used for determination of the correspondence between the subframe in which at least a physical downlink shared channel is allocated, and the subframe used for transmission of the HARQ-ACK information corresponding to the physical downlink shared channel, and may be different from the actual transmission direction (in other words, the uplink or the downlink) of the signal. That is, the uplink reference UL-DL configuration is used to specify (select or determine) a correspondence between a subframe n in which the PDCCH/EPDCCH/PHICH is allocated and a subframe n+k in which the PUSCH corresponding to the PDCCH/EPDCCH/PHICH is allocated. When one primary cell is configured, or when one primary cell and one secondary cell are configured and the uplink reference UL-DL configuration for the primary cell and the uplink reference UL-DL configuration for the secondary cell are the same, the corresponding uplink reference UL-DL configuration is used, for each of the two serving cells, to determine the correspondence between the subframe in which the PDCCH/EPDCCH/PHICH is allocated and the subframe in which the PUSCH corresponding to the PDCCH/EPDCCH/PHICH is allocated. Furthermore, the downlink reference UL-DL configuration is used to specify (select or determine) the correspondence between the subframe n in which the PDSCH is allocated and the subframe n+k used to transmit the HARQ-ACK response information corresponding to the PDSCH. When one primary cell is configured, or when one primary cell and one secondary cell are configured and the downlink reference UL-DL configuration for the primary cell and the downlink reference UL-DL configuration for the secondary cell are the same, the corresponding downlink reference UL-DL configuration is used, for each of the two serving cells, to specify (select or determine) the correspondence between the subframe n in which the PDSCH is allocated and the subframe n+k used to transmit the HARQ-ACK information corresponding to the PDSCH.

An example in which the downlink reference UL-DL configuration is configured in the terminal device 2 includes a case in which two or more TDD cells are configured for the terminal device 2, and the UL-DL configuration of at least two serving cells is configured differently. At this time, the downlink reference UL-DL configuration of the serving cells is determined from the combination of whether the cell is the primary cell or secondary cell, the set number defined in FIG. 10, and the pair of the primary cell UL-DL configuration and the secondary cell UL-DL configuration. At this time, the HARQ-ACK information included in the PUCCH/PUSCH allocated in the subframe n corresponds to the PDSCH indicated by the detection of the associated PDCCH in the subframe n−k, or the PDCCH indicating the release of the downlink SPS in the subframe n−k. Here, k is associated by using the value defined in FIG. 6 from the downlink reference UL-DL configuration.

That is, in a TDD cell, when more than one serving cell is configured for the terminal device 2, at least two serving cells have different UL-DL configurations, and the serving cell is a primary cell, the UL-DL configuration of the primary cell is the downlink reference UL-DL configuration for the serving cell.

That is, in a TDD cell, in any of a case in which more than one serving cell is configured for the terminal device 2, at least two serving cells have different UL-DL configurations, the serving cell is a secondary cell, and the pair of the primary cell UL-DL configuration and the secondary cell UL-DL configuration belongs to a set 1 shown in FIG. 10, a case in which the monitoring of the PDCCH/EPDCCH from another serving cell for the scheduling of the serving cell is not configured for the terminal device 2, the pair of the primary cell UL-DL configuration and the secondary cell UL-DL configuration belongs to either a set 2 or a set 3 of FIG. 10, or a case in which the monitoring of the PDCCH/EPDCCH from another serving cell for the scheduling of the serving cell is configured for the terminal device 2, and the pair of the primary cell UL-DL configuration and the secondary cell UL-DL configuration belongs to either a set 4 or a set 5 of FIG. 10, the downlink reference UL-DL configuration of the serving cell is defined in FIG. 10.

That is, in a TDD cell, when more than one serving cell is configured for the terminal device 2, at least two serving cells have different UL-DL configurations, and the downlink reference UL-DL configuration of at least one serving cell is a TDD cell UL-DL configuration 5, the terminal device 2 does not expect that more than two serving cells are configured.

That is, in a TDD cell, when more than one serving cell is configured for the terminal device 2, and at least two serving cells have different UL-DL configurations, the terminal device 2 detects, in the subframe n–k for the serving cell c, the PDSCH transmission, which is addressed to the terminal device 2 and to which the HARQ-ACK information is to be given, and transmits the HARQ-ACK information in the uplink subframe n. Here, k belongs to a set $K_c$ (k∈$K_c$), and the set K is defined in FIG. 6. Furthermore, here, the set $K_c$ includes a value of k belonging to the set K, such as the subframe n–k equivalent to the downlink subframe or the special subframe for the serving cell c. Furthermore, here, the UL-DL configuration shown in FIG. 6 references the downlink reference UL-DL configuration of the FDD cell.

A transmission timing of HARQ-ACK information will be described below. The description includes a case in which a plurality of cells to which different frame structure types are applied are aggregated.

Here, aggregation of a plurality of cells to which different frame structure types are applied includes, for example, aggregation of a cell with the frame structure type as type 1 (FDD), and a cell with the frame structure type as type 2 (TDD). Hereinafter, the aggregation of a cell with the frame structure type as type 1 (FDD) and a cell with the frame structure type as type 2 (TDD) is referred to as TDD-FDD carrier aggregation (TDD-FDD CA, TDD-FDD, FDD-TDD). Furthermore, aggregation of a plurality of cells to which different frame structure types are applied includes, for example, aggregation of a plurality of cells with the frame structure type as type 1 (FDD), and a plurality of cells with the frame structure type as type 2 (TDD). In other words, aggregation of a plurality of cells to which different frame structure types are applied includes, for example, aggregation of one or more cells with the frame structure type as type 1 (FDD), and one or more cells with the frame structure type as type 2 (TDD). It should be noted that each of the above-described frame structure type is merely an example, and may be applied in the similar manner even when type 3 or type 4 is defined. Hereinafter, a cell in which the primary cell is a TDD cell is referred to as a TDD primary cell, a cell in which the secondary cell is a TDD cell is referred to as a TDD secondary cell, a cell in which the primary cell is an FDD cell is referred to as an FDD primary cell, and a cell in which the secondary cell is an FDD cell is referred to as an FDD secondary cell. When carrier aggregation is configured, the terminal device 2 transmits a PUCCH in the primary cell, and the base station device 1 receives the PUCCH from the terminal device 2 in the primary cell. The terminal device 2 does not have to transmit a PUCCH in the secondary cell, and the base station device 1 does not have to receive the PUCCH from the terminal device 2 in the secondary cell.

Here, the uplink reference UL-DL configuration or the downlink reference UL-DL configuration can be configured for the FDD cell as well. Furthermore, only the uplink reference UL-DL configuration can be configured for the FDD cell. Furthermore, only the downlink reference UL-DL configuration can be configured for the FDD cell. Furthermore, the uplink reference UL-DL configuration and the downlink reference UL-DL configuration are configured individually by a scheduling method (self scheduling, cross carrier scheduling). For example, for self scheduling, the uplink reference UL-DL configuration is not configured for the FDD cell, and for cross carrier scheduling, the uplink reference UL-DL configuration is configured for the FDD cell. Furthermore, configuration may be made depending on the type of the serving cell (primary cell, secondary cell), and the combination of aggregation of serving cells. For example, when the terminal device 2 is configured as an FDD primary cell, the downlink reference UL-DL configuration is not configured for the FDD primary cell, and when the terminal device 2 is configured as an FDD secondary cell and the primary cell is a TDD cell, the downlink reference UL-DL configuration is configured for the FDD secondary cell.

When the uplink reference UL-DL configuration is not configured for the FDD cell, the base station device 1 performs scheduling of the PUSCH and transmission of the PHICH at the transmission timing of the FDD. When the downlink reference UL-DL configuration is not configured for the FDD cell, the base station device 1 performs scheduling of the PDSCH at the transmission timing of the FDD, and the terminal device 2 transmits the HARQ-ACK information corresponding to the PDSCH at the transmission timing of the FDD.

A virtual TDD UL-DL configuration (TDD-FDD UL-DL configuration) may be configured for the FDD cell in the higher layer, and the downlink reference UL-DL configuration of the FDD cell may be configured on the basis of the virtual TDD UL-DL configuration. In such a case, the downlink reference UL-DL configuration of the FDD cell is determined, using FIG. 10, from the pair of the TDD UL-DL configuration of the TDD primary cell and the virtual TDD UL-DL configuration of the FDD secondary cell.

An example of the transmission timing of the HARQ-ACK information in the FDD cell when the primary cell is a TDD cell will be described.

The HARQ-ACK information corresponding to the PDSCH detected in the FDD secondary cell or the PDCCH indicating the release of a downlink SPS may be transmitted on the PUCCH. The PUCCH is transmitted in an uplink subframe of the TDD primary cell. In other words, the downlink reference UL-DL configuration that determines the transmission timing of the HARQ-ACK information of the FDD secondary cell that performs carrier aggregation with the TDD primary cell is in accordance with the TDD UL-DL configuration of the primary cell.

That is, in an FDD cell, when more than one serving cell is configured for the terminal device 2 and the primary cell is a TDD cell, the downlink reference UL-DL configuration of the FDD cell is the TDD UL-DL configuration of the primary cell.

That is, in an FDD cell, when more than one serving cell is configured for the terminal device 2, the primary cell is a TDD cell, and at least one serving cell has the TDD UL-DL configuration 5, the terminal device 2 does not expect that more than two serving cells are configured.

That is, in an FDD cell, when more than one serving cell is configured for the terminal device 2 and the primary cell is a TDD cell, the terminal device 2 detects, in the subframe n–k, the PDSCH transmission, which is addressed to the terminal device 2 and to which the HARQ-ACK information is to be given, and transmits the HARQ-ACK information in the uplink subframe n. Here, k belongs to a set K (k∈K), and the set K is defined in FIG. 6. Furthermore, here, the UL-DL configuration shown in FIG. 6 references the downlink reference UL-DL configuration of the FDD cell.

An example of the transmission timing of the HARQ-ACK information in the FDD cell when the primary cell is a TDD cell will be described.

When the HARQ-ACK information of the FDD cell described above is transmitted in accordance with the TDD UL-DL configuration of the TDD primary cell, the TDD primary cell cannot be associated with the subframe that is to be an uplink subframe, and therefore, the scheduling of the PDSCH or the PDCCH indicating the release of the downlink SPS is not performed on the subframe even in the FDD secondary cell. Thus, also for the subframe that is to be an uplink subframe, the table showing the association of the transmission timing of the HARQ-ACK information with the PDSCH and the PDCCH indicating the release of the downlink SPS is used. FIG. 9 and FIG. 15 show examples of the PDSCH of an FDD secondary cell in the case of a TDD primary cell and the PDCCH indicating the release of a downlink SPS, and the corresponding HARQ-ACK information transmission timing. By using the transmission timing defined in FIG. 9 or FIG. 15, the PDSCH and the PDCCH indicating the release of the downlink SPS can be transmitted in an FDD secondary cell even in a subframe that is to be the uplink subframe in a TDD primary cell, and the corresponding HARQ-ACK information is transmitted in the uplink subframe of the TDD primary cell. In other words, the downlink reference UL-DL configuration that determines the transmission timing of the HARQ-ACK information of the FDD cell is in accordance with the TDD UL-DL configuration of the primary cell, and the transmission timing is determined in accordance with the table of the HARQ-ACK information transmission timing for the FDD secondary cell that performs carrier aggregation with the TDD primary cell.

The table shown in FIG. 9 has a small delay in HARQ-ACK information feedback compared to the table shown in FIG. 15. Therefore, the throughput performance by HARQ is favorable. On the other hand, in the table shown in FIG. 15, the maximum number of M in the TDD UL-DL configuration is defined to become small as compared to the table shown in FIG. 9. Therefore, M is 4 or less when the TDD UL-DL configuration is other than 2, 4, and 5, which enables the HARQ-ACK information to be fed back in the PUCCH format 1b when the TDD UL-DL configuration is 0, 1, 3, or 6.

That is, in an FDD cell, when more than one serving cell is configured for the terminal device 2 and the primary cell is a TDD cell, the downlink reference UL-DL configuration of the FDD cell is the TDD UL-DL configuration of the primary cell.

In an FDD cell, when more than one serving cell is configured for the terminal device 2, the primary cell is a TDD cell, and at least one serving cell has the TDD UL-DL configuration 5, the terminal device 2 does not expect that more than two serving cells are configured.

In an FDD cell, when more than one serving cell is configured for the terminal device 2, and the primary cell is a TDD cell, the terminal device 2 detects, in the subframe n−k, the PDSCH transmission, which is addressed to the terminal device 2 and to which the HARQ-ACK information is to be given, and transmits the HARQ-ACK information in the uplink subframe n. Here, k belongs to a set K (k∈K), and the set K is defined in FIG. 9. Furthermore, here, the UL-DL configuration shown in FIG. 9 references the downlink reference UL-DL configuration of the FDD cell.

It should be noted that the downlink reference UL-DL configuration of the FDD cell may be configured in a higher layer.

That is, in an FDD cell, when more than one serving cell is configured for the terminal device 2 and the primary cell is a TDD cell, the downlink reference UL-DL configuration of the FDD cell is configured in a higher layer.

It should be noted that in TDD-FDD CA, when the primary cell is a TDD cell and the serving cell is an FDD cell, the definition of the downlink association set may be switched depending on the scheduling type. For example, when cross carrier scheduling is configured from the TDD cell to the FDD cell, the downlink association set used when communication is performed in one TDD cell is used, and in other cases, the downlink association set that is also associated with the subframe that is to be the uplink subframe of the TDD cell is used. That is, when self scheduling is configured for the terminal device 2 (cross carrier scheduling is not configured from the TDD cell to the FDD serving cell), the downlink association set shown in FIG. 9 may be used, and when cross carrier scheduling is configured from the TDD cell to the FDD serving cell for the terminal device 2, the downlink association set shown in FIG. 6 may be used, and when cross carrier scheduling is configured from the FDD cell to the FDD serving cell for the terminal device 2, the downlink association set shown in FIG. 9 may be used.

Furthermore, the table shown in FIG. 11 may be used in place of the tables shown in FIG. 9 and FIG. 15. FIG. 11 shows an example of the PDSCH of an FDD secondary cell in the case of a TDD primary cell and the PDCCH indicating the release of a downlink SPS, and the corresponding HARQ-ACK information transmission timing. In the table shown in FIG. 11, when the TDD UL-DL configuration is 0, 1, 2, 3, 4, or 6, the HARQ-ACK information transmission timing of the subframe that is to be the uplink subframe is defined in the TDD primary cell, and when the TDD UL-DL configuration is 5, the HARQ-ACK information transmission timing of the subframe that is to be the uplink subframe is not defined in the TDD primary cell. With this table, the maximum number of downlink HARQ processes can be configured as 16 or less. The TDD UL-DL configuration may be the downlink reference UL-DL configuration.

Furthermore, when the set K of the TDD UL-DL configuration 5 is configured by using the transmission timing defined in FIG. 9 and FIG. 15, the base station device 1 may perform scheduling such that the transmission count of the PDSCH in one radio frame in a certain cell is limited to nine. Furthermore, the terminal device 2 does not expect the reception of the PDSCH in 10 subframes or more in one radio frame in a certain cell. This configuration makes it possible to perform communication with the maximum number of downlink HARQ processes being 16 or less.

An example of the transmission timing of HARQ-ACK information in an FDD cell when the primary cell is a TDD cell will be described.

In the transmission timing defined in FIG. 9 and FIG. 15, the maximum number of downlink HARQ processes may be required to be 17 or more. For example, for the TDD UL-DL configuration 5 shown in FIG. 9, the maximum number of downlink HARQ processes is required to be 19. When the maximum number of downlink HARQ processes is equal to or more than 17, a bit field that is 5 bits or more in length is required for the DCI for announcing the HARQ process number. Thus, the transmission timing defined by a set K in which the maximum number of downlink HARQ processes does not exceed 17 is used. For example, the TDD UL-DL configurations 0, 1, 2, 3, 4, and 6 use the set K defined in the transmission timing table of FIG. 9 and FIG. 15, and the TDD UL-DL configuration 5 uses the set K defined in the transmission timing table of FIG. 6. This configuration makes it possible to configure the maximum number of downlink HARQ processes to be 16 or less.

That is, in an FDD cell, when more than one serving cell is configured for the terminal device 2, and the primary cell is a TDD cell, the downlink reference UL-DL configuration of the FDD cell is the TDD UL-DL configuration of the primary cell.

In an FDD cell, when more than one serving cell is configured for the terminal device 2, the primary cell is a TDD cell, and at least one serving cell has the TDD UL-DL configuration 5, the terminal device 2 does not expect that more than two serving cells are configured. Furthermore, when more than one serving cell is configured for the terminal device 2, the primary cell is a TDD cell, at least one serving cell is an FDD cell, and at least one serving cell has the TDD UL-DL configuration 2 or 4, the terminal device 2 does not expect that more than four serving cells are configured.

In an FDD cell, when more than one serving cell is configured for the terminal device 2 and the primary cell is a TDD cell, the terminal device 2 detects, in the subframe n−k, the PDSCH transmission, which is addressed to the terminal device 2 and to which the HARQ-ACK information is to be given, and transmits the HARQ-ACK information in the uplink subframe n. Here, k belongs to a set K (k∈K), and the set K is defined in the table shown in FIG. 6 or FIG. 9. Furthermore, here, when the downlink reference UL-DL configuration of the FDD cell is 0, 1, 2, 3, 4, or 6, the UL-DL configuration shown in FIG. 9 is referenced. Furthermore, here, when the downlink reference UL-DL configuration of the FDD cell is 5, the UL-DL configuration shown in FIG. 6 is referenced.

The number of component carriers (CCs) with which carrier aggregation can be performed in a case in which a table of a downlink association set that is different from the TDD primary cell is defined by the FDD secondary cell when a plurality of cells to which different frame structure types are applied are aggregated will be described.

In the PUCCH format 3, a maximum of 20-bit HARQ-ACK information can be transmitted. To perform carrier aggregation, the number of bits used for transmission of the HARQ-ACK information is reduced by performing spatial HARQ-ACK information bundling. However, when the information exceeds 20 bits in length even with the spatial HARQ-ACK information bundling, the HARQ-ACK information cannot be transmitted. For example, when the primary cell is a TDD cell, carrier aggregation is performed on the FDD cell and the TDD cell, and the table shown in FIG. 6 is applied to the primary cell while the table shown in FIG. 9 is applied to the secondary cell, and the TDD UL-DL configuration of the TDD primary cell is 2, while the TDD UL-DL configuration of the FDD secondary cell is 2, the maximum number of bits after performing the spatial HARQ-ACK information bundling of the HARQ-ACK information corresponding to the PUSCH transmission or the PDCCH/EPDCCH indicating the release of the downlink SRS is 9 bits. However, when four FDD cells with the TDD UL-DL configuration being 2 are configured in a TDD cell with the TDD UL-DL configuration being 2, the maximum number of bits after performing the spatial HARQ-ACK information bundling is 24 bits, thus exceeding the number of bits by which the PUCCH format 3 can be transmitted. Therefore, the terminal device 2 cannot transmit the HARQ-ACK information in the PUCCH format 3.

Thus, the number of serving cells on which carrier aggregation can be performed is restricted depending on the TDD UL-DL configuration.

For example, when the primary cell is a TDD cell and the table shown in FIG. 15 is applied to the FDD secondary cell, the base station device 1 does not configure, for the terminal device 2, a TDD primary cell, and when the downlink reference UL-DL configuration is 5 in at least one FDD cell, two or more FDD secondary cells. The base station device 1 does not configure, for the terminal device 2, a TDD primary cell, and when the downlink reference UL-DL configuration is 2 or 4 in at least one FDD cell, four or more FDD secondary cells.

When more than one serving cell is configured for the terminal device 2, the primary cell is a TDD cell, at least one serving cell is an FDD cell, and at least one serving cell has the downlink reference UL-DL configuration 2 or 4, the terminal device 2 does not expect that more than four serving cells are configured. When at least one serving cell has the TDD UL-DL configuration 5, the terminal device 2 does not expect that more than two serving cells are configured.

For example, when the primary cell is a TDD cell, and the table shown in FIG. 9 is applied to the FDD secondary cell, the base station device 1 does not configure, for the terminal device 2, a TDD primary cell, and when the downlink reference UL-DL configuration is 5 in at least one FDD cell, two or more FDD secondary cells. The base station device 1 does not configure, for the terminal device 2, a TDD primary cell, and when the downlink reference UL-DL configuration is 3 or 4 in at least one FDD cell, three or more FDD secondary cells. The base station device 1 does not configure, for the terminal device 2, a TDD primary cell, and when the downlink reference UL-DL configuration is 2 in at least one FDD cell, four or more FDD secondary cells.

When more than one serving cell is configured for the terminal device 2, the primary cell is a TDD cell, at least one serving cell is an FDD cell, and at least one serving cell has the downlink reference UL-DL configuration 2, the terminal device 2 does not expect that more than four serving cells are configured. When more than one serving cell is configured for the terminal device 2, the primary cell is a TDD cell, at least one serving cell is an FDD cell, and at least one serving cell has the downlink reference UL-DL configuration 3 or 4, the terminal device 2 does not expect that more than three serving cells are configured. When at least one serving cell has the TDD UL-DL configuration 5, the terminal device 2 does not expect that more than two serving cells are configured.

Furthermore, the number of serving cells on which carrier aggregation can be performed can also be restricted depending on the maximum value of M in the TDD UL-DL configuration.

When the maximum value of M in the TDD UL-DL configuration is 7 or more, three or more serving cells are not configured. When the maximum value of M in the TDD UL-DL configuration is 6, four or more serving cells are not configured. When the maximum value of M in the TDD UL-DL configuration is 5, five or more serving cells are not configured.

The support of the PUCCH format 1b with channel selection in a case in which a table of a downlink association set that is different from the TDD primary cell is defined by the FDD secondary cell when a plurality of cells to which different frame structure types are applied are aggregated will be described.

When carrier aggregation of a TDD cell and an FDD cell is configured, and the primary cell is a TDD cell, and when the maximum value of M in the TDD UL-DL configuration is 4 or less, the HARQ-ACK information is transmitted in the PUCCH format 1b with channel selection or the PUCCH format 3. When the maximum value of M in the TDD UL-DL configuration is 5 or more, the HARQ-ACK information is transmitted only in the PUCCH format 3.

For example, when the downlink association set is defined in the table shown in FIG. 15 in the FDD secondary cell, and when the downlink reference UL-DL configuration is 2, 4, or 5, only the PUCCH format 3 is supported, and the PUCCH format 1b with channel selection is not supported.

When more than one serving cell is configured for the terminal device 2, the primary cell is a TDD cell, and the downlink reference UL-DL configuration of at least one serving cell is 5, only the PUCCH format 3 is supported for up to two of the serving cells. When more than one serving cell is configured for the terminal device 2, the primary cell is a TDD cell, and the downlink reference UL-DL configuration of at least one serving cell is 2 or 4, only the PUCCH format 3 is supported for up to four of the serving cells. When more than one serving cell is configured for the terminal device 2, the primary cell is a TDD cell, and the downlink reference UL-DL configuration of at least one serving cell is 2, 4, or 5, the PUCCH format 1b with channel selection is not supported.

Furthermore, for example, when the downlink association set is defined in the table shown in FIG. 9 in the FDD secondary cell, and when the downlink reference UL-DL configuration is 2, 3, 4, or 5, only the PUCCH format 3 is supported, and the PUCCH format 1b with channel selection is not supported.

When more than one serving cell is configured for the terminal device 2, the primary cell is a TDD cell, and the downlink reference UL-DL configuration of at least one serving cell is 5, only the PUCCH format 3 is supported for up to two of the serving cells. When more than one serving cell is configured for the terminal device 2, the primary cell is a TDD cell, and the downlink reference UL-DL configuration of at least one serving cell is 3 or 4, only the PUCCH format 3 is supported for up to three of the serving cells. When more than one serving cell is configured for the terminal device 2, the primary cell is a TDD cell, and the downlink reference UL-DL configuration of at least one serving cell is 2, only the PUCCH format 3 is supported for up to four of the serving cells. When more than one serving cell is configured for the terminal device 2, the primary cell is a TDD cell, and the downlink reference UL-DL configuration of at least one serving cell is 2, 4, or 5, the PUCCH format 1b with channel selection is not supported.

In addition, the transmission of the PUCCH format may be switched for each subframe. For example, when carrier aggregation of a TDD cell and an FDD cell is configured, and the primary cell is a TDD cell, and when the value of M is 4 or less in the subframe n, the HARQ-ACK information is transmitted in the PUCCH format 1b with channel selection or the PUCCH format 3. When the value of M is 5 or more in the subframe n, the HARQ-ACK information is transmitted only in the PUCCH format 3.

For example, when the downlink association set is defined in the table shown in FIG. 9 in the FDD secondary cell, and the downlink reference UL-DL configuration is 3, the HARQ-ACK information is transmitted only in the PUCCH format 3 in the subframe 2, and the HARQ-ACK information is transmitted in the PUCCH format 1b with channel selection or the PUCCH format 3 in the subframe 3 or 4. The selection of whether to perform transmission in the PUCCH format 1b with channel selection or the PUCCH format 3 in the subframe 3 or 4 is configured in a higher layer. In the subframe 2, transmission in the PUCCH format 3 is configured regardless of the configuration of the higher layer.

When more than one serving cell is configured for the terminal device 2, the primary cell is a TDD cell, and the downlink reference UL-DL configuration of at least one serving cell is 5, only the PUCCH format 3 is supported for up to two of the serving cells. When more than one serving cell is configured for the terminal device 2, the primary cell is a TDD cell, and the downlink reference UL-DL configuration of at least one serving cell is 2, only the PUCCH format 3 is supported for up to four of the serving cells. When more than one serving cell is configured for the terminal device 2, the primary cell is a TDD cell, and the downlink reference UL-DL configuration of at least one serving cell is 2 or 5, the PUCCH format 1b with channel selection is not supported. When more than one serving cell is configured for the terminal device 2, the primary cell is a TDD cell, and the downlink reference UL-DL configuration of at least one serving cell is 3 or 4, in the subframe n, the HARQ-ACK information is transmitted in the PUCCH format 3 when M is more than 4, and the HARQ-ACK information is transmitted in the PUCCH format 1b with channel selection or the PUCCH format 3 when M is 4 or less.

An example of the transmission timing of HARQ-ACK information in a TDD cell when the primary cell is an FDD cell will be described below.

When the primary cell is an FDD cell, an uplink resource (an uplink component carrier) is configured in all subframes. The transmission timing of the HARQ-ACK information corresponding to the PDSCH or the PDCCH indicating the release of the downlink SPS may be in accordance with the transmission timing of the HARQ-ACK information configured in the FDD cell. In other words, even in a TDD cell, when the primary cell is an FDD cell, the transmission timing is the same as the transmission timing of the HARQ-ACK information when one FDD cell is configured and when carrier aggregation is performed only by FDD cells. In other words, after receiving the PDSCH in a certain subframe, the terminal device 2 transmits the HARQ-ACK information corresponding to the PDSCH to the base station device 1 on the PUCCH/PUSCH in the subframe located four subframes after the certain subframe.

That is, in a TDD cell, when more than one serving cell is configured for the terminal device 2, at least two serving cells have different frame structure types, and the primary cell is an FDD cell, the terminal device 2 detects, in the subframe n−4, the PDSCH transmission, which is addressed to the terminal device 2 and to which the HARQ-ACK information is to be given, and transmits the HARQ-ACK information in the subframe n.

When the FDD cell is a primary cell and the TDD cell is a secondary cell, the base station device 1 receives the HARQ-ACK information for the PDSCH transmitted in the TDD cell in the subframe that is located four subframes after the subframe in which the PDSCH has been transmitted. When the FDD cell is a primary cell and the TDD cell is a secondary cell, the terminal device 2 transmits the HARQ-ACK information for the PDSCH transmitted in the TDD cell in the subframe that is located four subframes after the subframe in which the PDSCH transmitted in the TDD cell has been transmitted.

This configuration enables, even when carrier aggregation of a TDD cell and an FDD cell is performed, the terminal device 2 to be efficiently transmit the HARQ-ACK information corresponding to the PDSCH or the PDCCH indicating the release of the downlink SPS.

Switching of the uplink reference UL-DL configuration (UL-reference UL/DL configuration, virtual UL-DL configuration, virtual uplink reference UL-DL configuration, PUSCH/PHICH-reference configuration) of an FDD cell and a TDD cell will be described below.

The uplink reference UL-DL configuration applied (configured, referenced) to a serving cell is configured depending on whether the type of the aggregated cells (FDD cell, TDD cell), whether the TDD UL-DL configurations are the same or different, and whether cross carrier scheduling is configured for the serving cell.

In an FDD cell, the transmission timing of the PUSCH is n+4, with respect to a subframe n in which an uplink grant is transmitted at all times. Therefore, when determining the transmission timing of the PUSCH, the uplink reference UL-DL configuration does not have to be configured for an FDD cell.

In an FDD cell, when one or more FDD cells are configured for the terminal device 2, the uplink reference UL-DL configuration of the FDD cell is not configured.

In an FDD cell, when two or more serving cells are configured for the terminal device 2, the FDD cell is a primary cell, or monitoring of the PDCCH/EPDCCH of another TDD cell for scheduling of the FDD cell is not configured for the terminal device 2, the uplink reference UL-DL configuration of the FDD cell is not configured.

In a TDD cell, when one or more TDD cells are configured for the terminal device 2, and the UL-DL configurations of all TDD cells are the same, the uplink reference UL-DL configuration of the TDD cell is the UL-DL configuration of the TDD.

In a TDD cell, when two or more TDD cells are configured for the terminal device 2, the UL-DL configurations of at least two TDD cells are different, the TDD cell is a primary cell, or monitoring of the PDCCH/EPDCCH of another TDD cell for scheduling of the TDD cell is not configured for the terminal device 2, the uplink reference UL-DL configuration of the TDD cell is the UL-DL configuration of the TDD cell.

In a TDD cell, when two or more TDD cells are configured for the terminal device 2, the UL-DL configurations of at least two TDD cells are different, the TDD cell is a secondary cell, and monitoring of the PDCCH/EPDCCH of another TDD cell for scheduling of the TDD cell is configured for the terminal device 2, the uplink reference UL-DL configuration of the TDD cell is determined from a table predetermined on the basis of the combination of the UL-DL configuration of the TDD cell and the other TDD cell.

In a TDD cell, when two or more serving cells are configured for the terminal device 2, the TDD cell is a secondary cell, and monitoring of the PDCCH/EPDCCH of another FDD cell for scheduling of the TDD cell is configured for the terminal device 2, the uplink reference UL-DL configuration of the TDD cell is not configured.

In TDD-FDD CA, the transmission timing of the PUSCH of a TDD cell when the primary cell is a TDD cell is in accordance with the transmission timing of the TDD cell.

That is, in FDD-TDD and the primary cell frame structure type 2, when the serving cell is a primary cell, the uplink reference UL-DL configuration of the serving cell is the UL/DL configuration of the serving cell.

In TDD-FDD CA, when the secondary cell is a TDD cell, the transmission timing of the PUSCH of a TDD cell for which self scheduling is configured is in accordance with the transmission timing of the TDD cell.

That is, in FDD-TDD, when monitoring of the PDCCH/EPDCCH in another serving cell for scheduling of a secondary serving cell with the frame structure type 2 is not configured for the terminal device 2, the uplink reference UL-DL configuration of the serving cell is the UL-DL configuration of the serving cell.

In TDD-FDD CA, when the secondary cell is a TDD cell, the transmission timing of the PUSCH of a TDD cell for which cross carrier scheduling from an FDD cell is configured is in accordance with the transmission timing of the TDD cell.

That is, in FDD-TDD and a secondary serving cell with the frame structure type 2, when monitoring of the PDCCH/EPDCCH in another serving cell with the frame structure type 1 for scheduling of the serving cell is configured for the terminal device 2, the uplink reference UL-DL configuration of the serving cell is the UL-DL configuration of the serving cell.

In TDD-FDD CA, when cross carrier scheduling from a TDD serving cell to a TDD serving cell is configured, the transmission timing of the PUSCH is determined in accordance with the uplink reference UL-DL configuration of the TDD serving cell that is scheduled depending on the combination of the UL-DL configuration of the two TDD serving cells.

That is, in FDD-TDD, when more than one serving cell with the frame structure type 2 is configured for the terminal device 2, the prescribed serving cell is a secondary serving cell with the frame structure type 2, and monitoring of the PDCCH/EPDCCH in another serving cell with the frame structure type 2 for scheduling of the prescribed serving cell is configured, the uplink reference UL-DL configuration of the prescribed serving cell is determined from a table predetermined on the basis of the combination of the UL-DL configuration of the prescribed serving cell and the other serving cell.

This configuration enables the terminal device 2 to efficiently transmit the PUSCH even when carrier aggregation of a TDD cell and an FDD cell is performed.

A downlink assignment index (DAI) will be described below.

A DAI is used for detection of a PDCCH/EPDCCH assigned with PDSCH transmission that has been transmitted from the base station device 1 but is lost during transmission, and a PDCCH/EPDCCH indicating a downlink SPS release.

For example, in a situation where a plurality of pieces of HARQ-ACK information in a plurality of downlink subframes are transmitted in one uplink subframe by HARQ-ACK information bundling, even when a PDCCH/EPDCCH transmitted in a certain downlink subframe is lost and the terminal device 2 cannot detect the PDCCH/EPDCCH, the terminal device 2 returns an ACK when a PDSCH indicated by a PDCCH/EPDCCH transmitted in another downlink subframe has been successfully received, and therefore, the base station device 1 cannot detect the lost PDCCH/EPDCCH.

Thus, with the DAI, the base station device 1 announces, to the terminal device 2, a value based on the transmission count of the PDCCH/EPDCCH from among a plurality of downlink subframes corresponding to one uplink subframe that can transmit the HARQ-ACK information for PDSCH transmission in a plurality of downlink subframes, and of the PDCCH/EPDCCH indicating the downlink SPS release, with the value included in the DCI format. The terminal device 2 acquires, by the DAI, the value based on the transmission count of the PDCCH/EPDCCH assigned with the PDSCH transmission transmitted from the base station device 1, and of the PDCCH/EPDCCH indicating the downlink SPS release, and compares the value based on the transmission count of the PDCCH/EPDCCH and the actual successful reception count of the PDCCH/EPDCCH. When the value based on the transmission count and the successful reception count do not match, the terminal device 2 determines that the PDCCH/EPDCCH transmitted in a certain downlink subframe is lost, and returns an NACK to the base station device 1. The base station device 1 receives the NACK, and performs the retransmission process with the PDSCH corresponding to the lost PDCCH/EPDCCH included therein. This configuration enables, even when the PDCCH/EPDCCH is lost during transmission, the terminal device 2 to detect the loss and perform the retransmission process.

Furthermore, when the DAI is transmitted by HARQ-ACK information multiplexing, the DAI is used for determination of the number of bits of the HARQ-ACK information to be multiplexed. The DAI is used for determination of the number of bits of the HARQ-ACK information to be transmitted on the PUCCH/PUSCH. The DAI is used for determination of the arrangement of the bits of the HARQ-ACK information to be transmitted on the PUCCH/PUSCH.

The DAI that is announced with being included in a downlink grant indicates the cumulative value of the PDCCH/EPDCCH assigned with the PDSCH transmission in up to the current subframe from among a plurality of downlink subframes corresponding to one uplink subframe that can transmit the HARQ-ACK information for the PDSCH transmission in a plurality of downlink subframes, and of the PDCCH/EPDCCH indicating the downlink SPS release. In other words, the DAI included in the downlink grant that triggers the PDSCH transmission in a subframe $n-k_i$ indicates the number of subframes in which PDSCH transmission (the PDSCH transmission by dynamic scheduling and/or the PDSCH transmission by semi-persistent scheduling) has been performed to the terminal device 2 from among the subframes (from $n-k_0$ to $n-k_{i-1}$) before the subframe $n-k_i$ in the bundling window corresponding to a subframe n. It should be noted that when the DAI field is 2 bits in length, the surplus with respect to four of the number of the subframes, which is four, may be indicated in place of the actual number of subframes.

The DAI that is announced with being included in an uplink grant indicates the value of the PDCCH/EPDCCH assigned with the all the PDSCH transmission from among a plurality of downlink subframes corresponding to one uplink subframe that can transmit the HARQ-ACK information for the PDSCH transmission in a plurality of downlink subframes, and of the PDCCH/EPDCCH indicating the downlink SPS release. In other words, the DAI included in the uplink grant that triggers the PUSCH transmission in a subframe n indicates the number of subframes in which the PDSCH transmission to the terminal device 2 has been performed in the bundling window corresponding to the subframe n.

In the carrier aggregation of an FDD cell and a TDD cell, the relationship of a plurality of downlink subframes corresponding to one uplink subframe in which the HARQ-ACK information for the PDSCH transmission can be transmitted will be described. FIG. 8 illustrates an example of a relationship between an uplink subframe and a downlink subframe in the transmission of the HARQ-ACK information for the PDSCH transmission. In FIG. 8, it is assumed that a serving cell 1 is a TDD cell and a serving cell 2 is an FDD cell. The HARQ-ACK information for the PDSCH transmission transmitted in a downlink subframe of the subframe 1 is transmitted in an uplink subframe of the serving cell 1, and at the same time, the HARQ-ACK information for the PDSCH transmission transmitted in a downlink subframe of the serving cell 2 is also transmitted in an uplink subframe of the serving cell 1. In the example illustrated in FIG. 8, the HARQ-ACK information for the PDSCH transmission in the subframes 0 and 1 of the serving cell 1 is transmitted in an uplink subframe, namely the subframe 7, of the serving cell 1. A plurality of downlink subframes are associated with one uplink subframe, and therefore, the loss of the PDCCH/EPDCCH is detected by using the information on the DAI. Furthermore, the HARQ-ACK information for the PDSCH transmission of subframes 0, 1, 2, and 3 of the serving cell 2 is also transmitted in an uplink subframe, namely the subframe 7, of the serving cell 1. Here too, a plurality of downlink subframes are associated with one uplink subframe. That is, including the information on the DAI even in the PDCCH/EPDCCH indicating the PDSCH transmission in an FDD cell allows the loss of the PDCCH/EPDCCH to be detected, which enables efficient communication.

A DAI is configured for each terminal.

A DAI that is announced with being included in an uplink grant (UL DAI) is configured in common among the cells for which carrier aggregation is performed. It should be noted that a DAI that is announced with being included in an uplink grant may also be configured individually among the cells for which carrier aggregation is performed. A case where the DAI is configured individually among the cells for which carrier aggregation is performed corresponds to, for example, a case where a transmission of a PUCCH is allowed in a secondary cell.

A DAI that is announced with being included in a downlink grant (DL DAI) is configured individually among the cells for which carrier aggregation is performed.

The presence of the fields of a DAI and the application of the DAI will be described below. The description also includes the assumption that a plurality of cells to which different frame structure types are applied are aggregated.

The configuration of a DAI is switched depending on the frame structure type of the cell in which the HARQ-ACK information is transmitted. For example, when the HARQ-ACK information of an FDD cell is returned via a TDD cell, a DAI field is configured in the DCI transmitted in the FDD cell. On the other hand, when the HARQ-ACK information of a TDD cell is returned via an FDD cell, a DAI field may not be configured in the DCI transmitted in the TDD cell.

In addition, the configuration of a DAI may be switched depending on the transmission timing of the HARQ-ACK information. For example, when the HARQ-ACK information of an FDD cell is returned via a TDD cell in accordance with the HARQ-ACK information transmission timing of the TDD cell, the HARQ-ACK information for a plurality of downlink subframes is returned in one uplink subframe, and therefore, a DAI field is configured. When the HARQ-ACK information of a TDD cell is returned via an FDD cell in accordance with the HARQ-ACK information transmission timing of the FDD cell, the HARQ-ACK information corresponding to one downlink subframe is returned in one uplink subframe, and therefore, a DAI field is not configured. On the other hand, when the HARQ-ACK information of a TDD cell is returned via an FDD cell in accordance with the HARQ-ACK information transmission timing of the TDD cell, the HARQ-ACK information corresponding to a plurality of downlink subframes is returned in one uplink subframe, and therefore, a DAI field is configured. Furthermore, when the HARQ-ACK information of a TDD cell is also applied to an FDD cell, and the HARQ-ACK information of the FDD cell is returned via the FDD cell, a DAI field is configured in the DCI.

That is, when the HARQ-ACK information of an FDD cell is returned via a TDD cell in accordance with the HARQ-ACK information transmission timing of the TDD cell, a DAI field is configured in the DCI. When the HARQ-ACK information of a TDD cell is returned via an FDD cell in accordance with the HARQ-ACK information transmission timing of the TDD cell, a DAI field is configured in the DCI. When the HARQ-ACK information of an FDD cell is returned via an FDD cell in accordance with the HARQ-ACK information transmission timing of the TDD cell, a DAI field is configured in the DCI. When the HARQ-ACK information of a TDD cell is returned via an FDD cell in accordance with the HARQ-ACK information transmission timing of the FDD cell, a DAI field does not have to be configured in the DCI.

The base station device 1 performs transmission on a PDCCH in a first DCI format or a second DCI format. The terminal device 2 performs reception on a PDCCH transmitted in a first DCI format or a second DCI format. When an integration of an FDD cell and a TDD cell is configured for the terminal device 2, a first DAI indicating a cumulative count of the PDSCH transmission in subframes up to the current subframe in prescribed subframes, or of the PDCCH or EPDCCH indicating downlink semi-persistent scheduling release is present in the first DCI format in the FDD cell, and is applied to the FDD cell, and a second DAI is present in the second DCI format in the FDD cell, and is applied to the FDD cell.

An example of the presence of a DAI field and application of a DAI based on a combination of a primary cell and a secondary cell will be further described below.

An example of presence of the DAI field included in DCI related to downlink grant is described.

For example, in a terminal device 2 for which an FDD primary cell and a TDD secondary cell are configured, the number of downlink subframes of the TDD secondary cell is less than the number of uplink subframes of the FDD primary cell. Therefore, the value of the DAI is configured to be 1 at all times. The information of the DAI is not needed in such situations, and therefore, the information of the DAI may be excluded from DCI that controls PDSCH scheduling of the TDD cell. That is, when the primary cell is an FDD cell, a DAI field is not configured in the TDD cell and the FDD cell.

In the case of a TDD primary cell, DCI related to a downlink grant is transmitted with the DAI included therein when the PDSCH is transmitted in a TDD cell and when the PDSCH is transmitted in an FDD cell. On the other hand, in the case of an FDD primary cell, DCI related to a downlink grant is transmitted without the DAI included therein both when the PDSCH is transmitted in a TDD cell and when the PDSCH is transmitted in an FDD cell.

That is, a 2-bit DAI field is present in the DCI that is transmitted to a serving cell (FDD cell or TDD cell) in the DCI format 1/1B/1D/2/2A/2B/2C/2D, or the DCI format 1A used for compact scheduling of a codeword of one PDSCH in a certain cell and for a random access procedure initialized by a PDCCH order, only when the primary cell is a TDD cell. On the other hand, when the primary cell is an FDD cell, a DAI field is not present in the DCI.

An example of the presence of the DAI field included in the DCI related to a downlink grant will be described.

A PUCCH including the HARQ-ACK information is mainly transmitted with a PUCCH resource of an uplink subframe of the primary cell. The number of downlink subframes of the FDD secondary cell is more than the number of uplink subframes of the TDD primary cell, and therefore, the information on the DAI is also required in the DCI indicating the FDD cell. On the other hand, when the PUCCH including the HARQ-ACK information can be transmitted in an uplink subframe of the FDD secondary cell, information on the DAI is not required in the DCI indicating the FDD cell.

That is, a 2-bit DAI field is present in the DCI that is transmitted to a TDD cell based on all the UL-DL configurations, or to an FDD secondary cell (the FDD cell aggregated in a TDD primary cell) in which the transmission of a PUCCH in the FDD secondary cell is not configured by a higher layer, and in which the primary cell is operated by TDD, by the DCI format 1/1B/1D/2/2A/2B/2C/2D, or the DCI format 1A used for compact scheduling of a codeword of one PDSCH of a certain cell and for a random access procedure initialized by a PDCCH order.

That is, on the other hand, when a configuration is made, by a higher layer, in which a PUCCH is transmitted in an FDD secondary cell, a DAI field is not present in the DCI that is transmitted to the FDD cell.

An example of the presence of the DAI field included in the DCI related to a downlink grant will be described.

A 2-bit DAI field is present in the DCI that is transmitted to a TDD cell when the transmission of a PUCCH in an FDD secondary cell is configured by a higher layer, and to a serving cell (FDD cell or TDD cell) when the transmission of a PUCCH in an FDD secondary cell is not configured by a higher layer, and the primary cell is a TDD cell, by the DCI format 1/1B/1D/2/2A/2B/2C/2D, or the DCI format 1A used for compact scheduling of a codeword of one PDSCH of a certain cell and for a random access procedure initialized by a PDCCH order.

On the other hand, a DAI field is not present in the DCI that is transmitted to an FDD cell when the transmission of a PUCCH in a secondary cell is configured by a higher layer, or to a serving cell when the transmission of a PUCCH in a secondary cell is not configured by a higher layer, and the primary cell is not a TDD cell.

An example of the presence of the DAI field included in the DCI related to an uplink grant will be described.

When the primary cell is a TDD cell, the DCI related to an uplink grant is transmitted with the DAI included therein when the PDSCH is transmitted in a TDD cell in which the UL-DL configuration is configured as 1 to 6 and when the PDSCH is transmitted in an FDD cell. On the other hand, when the primary cell is an FDD cell, the DCI related to the uplink grant is transmitted without the DAI included therein when the PDSCH is transmitted in a TDD cell and when the PDSCH is transmitted in an FDD cell.

That is, only when the primary cell is a TDD cell, a 2-bit DAI field is present in the DCI that is transmitted in the DCI format 0/4 to an FDD cell or a TDD cell in which the UL-DL configuration is configured as 1 to 6.

That is, when the primary cell is not a TDD cell, a DAI field is not present in the DCI that is transmitted in the DCI format 0/4.

An example of the presence of the DAI field included in the DCI related to an uplink grant will be described.

When a configuration is not made, by a higher layer, in which a PUCCH is transmitted in an FDD secondary cell, a 2-bit DAI field is present in the DCI that is transmitted in the DCI format 0/4 to an FDD secondary cell (FDD cell aggregated in a TDD primary cell) in which the primary cell is operated with TDD, or to a TDD cell in which the UL-DL configuration is configured as 1 to 6.

When a configuration is made by a higher layer, in which a PUCCH is transmitted in an FDD secondary cell, a DAI field is not present in the DCI that is transmitted in the DCI format 0/4 to an FDD cell or a TDD cell in which the UL-DL configuration is configured as 0.

An example of the presence of the DAI field included in the DCI related to an uplink grant will be described.

When a configuration is made, by a higher layer, in which a PUCCH is transmitted in an FDD secondary cell, a 2-bit DAI field is present in the DCI that is transmitted in the DCI format 0/4 to a TDD cell in which the UL-DL configuration is configured as 1 to 6.

When a configuration is made, by a higher layer, in which a PUCCH is transmitted in an FDD secondary cell, a DAI field is not present in the DCI that is transmitted in the DCI format 0/4 to an FDD cell and a TDD cell in which the UL-DL configuration is configured as 0.

An example of application of the DAI field included in the DCI related to a downlink grant will be described.

When carrier aggregation is performed in a TDD cell and an FD cell, a DAI field may be applied to the FDD cell at all times.

When one or more TDD cells are configured, and the UL-DL configurations of all TDD cells are the same, the DAI field in the DCI related to the downlink grant is applied to the TDD cell in which the UL-DL configuration is configured as 1 to 6. In addition, when two or more TDD cells are configured, and at least two TDD cells are configured with different UL-DL configurations, the DAI field in the DCI related to the downlink grant is applied to the TDD cell in which the downlink reference UL-DL configuration is configured as 1 to 6. In addition, when the primary cell is a TDD cell and at least one secondary cell is an FDD cell, the DAI field in the DCI related to the downlink grant is applied to the FDD cell.

That is, when one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, at least two TDD cells have different UL-DL configurations or at least one serving cell is an FDD cell, the DAI field is applied to the FDD cell or the TDD cell in which the downlink reference UL-DL configuration is configured as 1 to 6.

An example of application of the DAI field included in the DCI related to an uplink grant will be described below.

When one or more TDD cells are configured and the UL-DL configurations of all TDD cells are the same, the DAI field in the DCI related to the uplink grant is applied to the TDD cell in which the UL-DL configuration is configured as 1 to 6. In addition, when two or more TDD cells are configured and at least two TDD cells are configured with different UL-DL configurations, the DAI field in the DCI related to the uplink grant is applied to the TDD cell in which the uplink reference UL-DL configuration is configured as 1 to 6. In addition, when the primary cell is a TDD cell and at least one secondary cell is an FDD cell, the DAI field in the DCI related to the uplink grant is applied to the FDD cell.

That is, when one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, and at least two TDD cells have different UL-DL configurations or at least one serving cell is an FDD cell, the DAI field is applied to the FDD cell or the TDD cell in which the uplink reference UL-DL configuration is configured as 1 to 6.

It should be noted that the presence of the DAI field included in the DCI related to the downlink grant or the uplink grant and the combination of the application of the DAI are not restricted.

An example of the presence of the DAI field and a combination of the application of the DAI included in the DCI related to the downlink grant or the uplink grant is described.

When one TDD cell is configured for the terminal device 2, or when more than one serving cell is configured for the terminal device 2 and the primary cell is a TDD cell, the base station device 1 configures the DAI field in the DCI included in the PDCCH/EPDCCH transmitted in association with a serving cell (TDD cell or FDD cell).

Only when the primary cell is a TDD cell, a 2-bit DAI field is present in the DCI that is transmitted to a serving cell (FDD cell or TDD cell) in the DCI format 1/1B/1D/2/2A/2B/2C/2D, or the DCI format 1A used for compact scheduling of a codeword of one PDSCH in a certain cell and for a random access procedure initialized by a PDCCH order. On the other hand, when the primary cell is an FDD cell, the DAI field is not present in the DCI.

It should be noted that regardless of whether the primary cell is a TDD cell, a 2-bit field may be reserved in the DCI that is transmitted to a TDD cell in which the UL-DL configuration is configured as 0, in the DCI format 1/1B/1D/2/2A/2B/2C/2D, or the DCI format 1A used for compact scheduling of a codeword of one PDSCH in a certain cell and for a random access procedure initialized by a PDCCH order.

In other words, when one serving cell is configured for the terminal device 2, or when more than one serving cell is configured for the terminal device 2 and the UL-DL configurations of all serving cells are the same, the DAI field is applied to the serving cell in which the UL-DL configuration is configured as 1 to 6. When more than one serving cell is configured for the terminal device 2, and at least two serving cells have different UL-DL configurations or at least one cell is an FDD cell, the DAI field is applied to the FDD cell or the TDD cell in which the downlink reference UL-DL configuration is configured as 1 to 6. In other words, when one serving cell is configured for the terminal device 2, or when more than one serving cell is configured for the terminal device 2 and the UL-DL configurations of all serving cells are the same, the DAI field is not applied to the serving cell in which the UL-DL configuration is configured as 0. When more than one serving cell is configured for the terminal device 2, and at least two serving cells have different UL-DL configurations or at least one serving cell is an FDD cell, the DAI field is not applied to the serving cell in which the downlink reference UL-DL configuration is configured as 0.

Furthermore, a 2-bit DAI field is present in the DCI that is transmitted to a TDD cell in a DCI format 1A in which CRC is scrambled with an RA-RNTI, a P-RNTI, or an SI-RNTI.

On the other hand, the DAI field is not present in the DCI that is transmitted to an FDD cell in a DCI format 1A in which CRC is scrambled with an RA-RNTI, a P-RNTI, or an SI-RNTI.

Only when the primary cell is a TDD cell, a 2-bit DAI field is present in the DCI that is transmitted in the DCI format 0/4 to an FDD cell or a TDD cell in which the UL-DL configuration is configured as 1 to 6. On the other hand, when the primary cell is not a TDD cell, the DAI field is not present in the DCI that is transmitted in the DCI format 0/4.

When one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, and at least two TDD cells have different UL-DL configurations or at least one serving cell is an FDD cell, the DAI field is applied to the FDD cell or the TDD cell in which the uplink reference UL-DL configuration is configured as 1 to 6.

It should be noted that the field for the DAI does not have to be reserved in the DCI that is transmitted in the DCI format 0/4 to a TDD cell in which the UL-DL configuration is configured as 0.

An example of the presence of the DAI field and a combination of the application of the DAI included in the DCI related to downlink grant or uplink grant is described.

When a configuration is not made by a higher layer, in which a PUCCH can be transmitted in a secondary cell, and in addition, when one TDD cell is configured for the terminal device 2, or when more than one serving cell is configured for the terminal device 2 and the primary cell is a TDD cell, the base station device 1 configures the DAI field in the DCI included in the PDCCH/EPDCCH transmitted in association with a TDD cell or an FDD cell. In other words, when a configuration is made by a higher layer, in which a PUCCH can be transmitted in a secondary cell, the base station device 1 does not configure the DAI field in the DCI included in the PDCCH/EPDCCH transmitted in association with an FDD cell.

A 2-bit DAI field is present in the DCI that is transmitted to a TDD cell in accordance with all the UL-DL configurations, or to an FDD secondary cell (the FDD cell aggregated in a TDD primary cell) in which the transmission of a PUCCH in the FDD secondary cell is not configured by a higher layer, and in which the primary cell is operated by TDD, by the DCI format 1/1B/1D/2/2A/2B/2C/2D, or the DCI format 1A used for compact scheduling of a codeword of one PDSCH of a certain cell and for a random access procedure initialized by a PDCCH order.

When one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, and at least two TDD cells have different UL-DL configurations or at least one serving cell is an FDD cell, the DAI field is applied to the FDD cell or the TDD cell in which the downlink reference UL-DL configuration is configured as 1 to 6. In other words, when one TDD cell is configured for the terminal device 2, or when more than one serving cell is configured for the terminal device 2 and the UL-DL configurations of all serving cells are the same, the DAI field is not applied to the serving cell in which the UL-DL configuration is configured as 0. When more than one serving cell is configured for the terminal device 2 and at least two serving cells have different UL-DL configurations, the DAI field is not applied to the serving cell in which the downlink reference UL-DL configuration is configured as 0.

On the other hand, when a configuration is made by a higher layer, in which a PUCCH is transmitted in an FDD secondary cell, the DAI field is not present in the DCI that is transmitted to the FDD cell.

Furthermore, for TDD, a 2-bit DAI field is present in the DCI that is transmitted in a DCI format 1A in which CRC is scrambled with an RA-RNTI, a P-RNTI, or an SI-RNTI.

On the other hand, for FDD, the DAI field is not present in the DCI that is transmitted in a DCI format 1A in which CRC is scrambled with an RA-RNTI, a P-RNTI, or an SI-RNTI.

Furthermore, when a configuration is not made by a higher layer, in which a PUCCH is transmitted in an FDD secondary cell, a 2-bit DAI field is present in the DCI that is transmitted in the DCI format 0/4 to an FDD secondary cell (FDD cell aggregated in a TDD primary cell) in which the primary cell is operated with TDD, or to a TDD cell in which the UL-DL configuration is configured as 1 to 6.

When one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, and at least two TDD cells have different UL-DL configurations or at least one serving cell is an FDD cell, the DAI field is applied to the FDD cell or the TDD cell in which the uplink reference UL-DL configuration is configured as 1 to 6.

On the other hand, when a configuration is made by a higher layer, in which a PUCCH is transmitted in an FDD secondary cell, the DAI field is not present in the DCI that is transmitted in the DCI format 0/4 to an FDD cell or a TDD cell in which the UL-DL configuration is configured as 0.

An example of the presence of the DAI field and a combination of the application of the DAI included in the DCI related to the downlink grant or the uplink grant is described.

When a configuration is made in which a PUCCH including the HARQ-ACK information can be transmitted in an uplink subframe of an FDD secondary cell, the PUCCH is transmitted to the TDD cell with the DAI included therein, or when a configuration is not made in which the PUCCH including the HARQ-ACK information can be transmitted in an uplink subframe of an FDD secondary cell and the primary cell is a TDD cell, the PUCCH is transmitted to the serving cell (FDD cell or TDD cell) with the DAI included therein.

That is, when a configuration is not made by a higher layer, in which a PUCCH can be transmitted in a secondary cell, and when one TDD cell is configured for the terminal device 2 or when more than one serving cell is configured for the terminal device 2 and the primary cell is a TDD cell, the base station device 1 configures the DAI field in the DCI included in the PDCCH/EPDCCH transmitted in association with the serving cell (TDD cell or FDD cell).

A 2-bit DAI field is present in the DCI that is transmitted to a TDD cell when the transmission of a PUCCH in an FDD secondary cell is configured by a higher layer, or to a serving cell (FDD cell or TDD cell) when the transmission of a PUCCH in an FDD secondary cell is not configured by a higher layer, and the primary cell is a TDD cell, by the DCI format 1/1B/1D/2/2A/2B/2C/2D, or the DCI format 1A used for compact scheduling of a codeword of one PDSCH of a certain cell and for a random access procedure initialized by a PDCCH order.

When one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, and at least two TDD cells have different UL-DL configurations or at least one serving cell is an FDD cell, the DAI field is applied to the FDD cell or the TDD cell in which the downlink reference UL-DL configuration is configured as 1 to 6. In other words, when one TDD cell is configured for the terminal device 2, or when more than one serving cell is configured for the terminal device 2 and the UL-DL configurations of all serving cells are the same, the DAI field is not applied to the serving cell in which the UL-DL configuration is configured as 0. When more than one serving cell is configured for the terminal device 2 and at least two serving cells have different UL-DL configurations, the DAI field is not applied to the serving cell in which the downlink reference UL-DL configuration is configured as 0.

On the other hand, a DAI field is not present in the DCI that is transmitted to an FDD cell when a configuration is made, by a higher layer, in which a PUCCH is transmitted in a secondary cell, or to a serving cell when a configuration is not made, by a higher layer, in which a PUCCH is transmitted in a secondary cell and the primary cell is not a TDD cell.

Furthermore, for TDD, a 2-bit DAI field is present in the DCI that is transmitted in the DCI format 1A in which CRC is scrambled with an RA-RNTI, a P-RNTI, or an SI-RNTI.

On the other hand, for FDD, the DAI field is not present in the DCI that is transmitted in the DCI format 1A in which CRC is scrambled with an RA-RNTI, a P-RNTI, or an SI-RNTI.

Furthermore, when a configuration is made by a higher layer, in which a PUCCH is transmitted in an FDD secondary cell, a 2-bit DAI field is present in the DCI that is transmitted in the DCI format 0/4 to a TDD cell in which the UL-DL configuration is configured as 1 to 6.

When one TDD cell is configured for the terminal device 2, or when more than one TDD cell is configured for the terminal device 2 and the UL-DL configurations of all TDD cells are the same, the DAI field is applied to the serving cell in which the UL-DL configuration is configured as 1 to 6. When more than one serving cell is configured for the terminal device 2, and at least two TDD cells have different UL-DL configurations or at least one serving cell is an FDD cell, the DAI field is applied to the FDD cell or the TDD cell in which the uplink reference UL-DL configuration is configured as 1 to 6.

On the other hand, when a configuration is made by a higher layer, in which a PUCCH is transmitted in an FDD secondary cell, a DAI field is not present in the DCI that is transmitted in the DCI format 0/4 to an FDD cell and a TDD cell in which the UL-DL configuration is configured as 0.

It should be noted that when a TDD cell and an FDD cell perform carrier aggregation, a field that is 3 bits or more in length may also be configured for the DAI that is announced as one that is included in uplink grant. A field that is 3 bits or more in length may also be configured for the DAI that is announced as one that is included in downlink grant.

A DAI is used when the number of elements M of the downlink association set is more than one (two or more). The DAI is not used when the DAI field is not present. The DAI does not have to be used when the number of elements M of the downlink association set is one.

That is, when the TDD UL/DL configuration configured in a serving cell belongs to any one of {1, 2, 3, 4, 5, 6}, the number of elements M of the downlink association set is more than one, and therefore, the DAI is used. Furthermore, when the TDD UL/DL configuration configured in a serving cell is 0, the number of elements M of the downlink association set is one, and therefore, the DAI may not be used.

That is, when the uplink reference UL/DL configuration configured in a serving cell belongs to any one of {1, 2, 3, 4, 5, 6}, the number of elements M of the downlink association set is more than one, and therefore, the UL DAI is used. Furthermore, when the TDD UL/DL configuration configured in a serving cell is 0, the number of elements M of the downlink association set is one, and therefore, the UL DAI may not be used.

That is, when the downlink reference UL/DL configuration configured in a serving cell belongs to any one of {1, 2, 3, 4, 5, 6}, the number of elements M of the downlink association set is more than one, and therefore, the DL DAI is used. Furthermore, when the TDD UL/DL configuration configured in a serving cell is 0, the number of elements M of the downlink association set is one, and therefore, the DL DAI may not be used.

An HARQ-ACK reporting procedure to which a UL DAI and a DL DAI are applied will be described below.

In TDD-FDD CA, when the primary cell is a TDD cell (frame structure type 2), the DAI field is configured in the DCI. Thus, the number of HARQ-ACK bits and the arrangement of HARQ-ACK are determined from a UL DAI and a DL DAI.

That is, an FDD-TDD HARQ-ACK reporting procedure in the primary cell frame structure type 2 is in accordance with an HARQ-ACK reporting procedure when the UL-DL configurations of the two TDD serving cells are different.

Here, in the TDD-FDD CA of the TDD primary cell (carrier aggregation when two or more serving cells are configured, the frame structure types of two serving cells are different, and the primary cell is a TDD cell), when cross carrier scheduling from a TDD cell is not configured for an FDD cell, a PDSCH can be transmitted even in a subframe that is to be an uplink subframe of the TDD primary cell. Thus, for example, even in a subframe that is to be the uplink subframe, such as the one shown in FIG. 9, for the FDD cell, the downlink association set with which the transmission timing of the HARQ-ACK is linked is applied. On the other hand, in other cases, for example, in a subframe that is to be the uplink subframe, such as the one shown in FIG. 6, the downlink association set with which the transmission timing of the HARQ-ACK is not linked is applied.

That is, in the FDD-TDD HARQ-ACK reporting procedure of the primary cell frame structure type 2, in a serving cell with the frame structure type 1, when monitoring of a PDCCH/EPDCCH in another serving cell for scheduling of the serving cell is not configured, K is defined by the downlink association set of FIG. 6, and in other cases, K is defined by the downlink association set of FIG. 9.

In TDD-FDD CA in which the primary cell is a TDD cell, the reception timing of an uplink grant for a subframe n in which the PUSCH is transmitted to the FDD cell is always n−4. Therefore, the UL DAI included in the DCI that is scheduled for the FDD cell is announced in a subframe n−4.

That is, in the FDD-TDD HARQ-ACK reporting procedure of the primary cell frame structure type 2, in a serving cell with the frame structure type 1, the value of $W^{UL}_{DAI}$ is determined by the DAI in the DCI format 0/4 that corresponds to the PUSCH transmitted in the serving cell and is transmitted in the subframe n−4.

Furthermore, in TDD-FDD CA in which the primary cell is a TDD cell, in a case in which self-scheduling being performed for the FDD cell, the UL DA included in the DCI that is scheduled for an FDD cell applies the value of the DAI field that is announced in the subframe n−4 when the UL-DL configuration of the TDD primary cell is 1 to 6, and does not apply the value of the DAI field when the UL-DL configuration of the TDD primary cell is 0.

That is, in the FDD-TDD HARQ-ACK reporting procedure of the primary cell frame structure type 2, in a serving cell with the frame structure type 1, when monitoring of a PDCCH/EPDCCH in another serving cell for scheduling of the serving cell with the frame structure type 1 is not configured for the terminal device 2, and the uplink reference UL-DL configuration of the serving cell with the frame structure type 1 is 1 to 6, the value of $W^{UL}_{DAI}$ is determined by the DAI in the DCI format 0/4 that corresponds to the PUSCH transmitted in the serving cell and is transmitted in the subframe n−4.

A second uplink reference UL-DL configuration will be described below.

The first uplink reference UL-DL configuration is used for determination of the subframe interval (subframe timing) between the reception of the uplink grant and PUSCH transmission, and the subframe interval between the PUSCH transmission and the reception of a PHICH, and also in the application conditions of the UL DAI. On the other hand, the second uplink reference UL-DL configuration is used in the application conditions of at least the UL DAI. The second uplink reference UL-DL configuration is not used for determination of the subframe interval (subframe timing) of PUSCH transmission from the reception of the uplink grant, and the subframe interval between PUSCH transmission and the reception of a PHICH.

That is, a terminal configured to communicate with a base station by using an FDD cell and a TDD cell includes a reception unit configured to perform reception on a PDCCH that is transmitted in a DCI format. In the terminal, when the primary cell is configured as a TDD cell, a first uplink reference UL-DL configuration used for determination of the interval between the reception of the PDCCH indicating the PUSCH transmission and the PUSCH transmission is configured in the TDD cell, and a second uplink reference UL-DL configuration used for determination of whether the DAI included in the DCI format of the PDCCH indicating the PUSCH transmission is applicable is configured in the FDD cell.

An example of the operation of the terminal device 2 in a case in which the second uplink reference UL-DL configuration has been configured will be described.

In an FDD cell, the subframe interval between the reception of the uplink grant and the PUSCH transmission, and the subframe interval between the PUSCH transmission and the reception of a PHICH is configured as a fixed interval. Even when the second uplink reference UL-DL configuration is applied to an FDD serving cell, the terminal device 2 is not based on the second uplink reference UL-DL configuration for determination of the timing of the uplink grant reception, the PUSCH transmission, and the PHICH reception. Even when the second uplink reference UL-DL configuration is applied to an FDD serving cell, the base station device 1 is not based on the uplink reference UL-DL configuration for determination of the timing of the uplink grant transmission, the PUSCH reception, and the PHICH transmission.

An example of the application conditions of the UL DAI based on the second uplink reference UL-DL configuration will be described.

When the second uplink reference UL-DL configuration is configured as 0, the UL DAI is not applied (used). When the second uplink reference UL-DL configuration is configured as other than 0 (the second uplink reference UL-DL configuration is 1, 2, 3, 4, 5, 6), the UL DAI is applied (used).

It should be noted that when the uplink reference UL-DL configuration is assumed (hypothesized) to be a prescribed TDD UL-DL configuration for a serving cell, it can be said that the second uplink reference UL-DL configuration is configured (applied) as the prescribed TDD UL-DL configuration for the serving cell in the terminal device 2.

It should be noted that the parameter of the second uplink reference UL-DL configuration may be common with the parameter of the first uplink reference UL-DL configuration.

It should be noted that the configuration method of the second uplink reference UL-DL configuration may be common with the configuration method of the first uplink reference UL-DL configuration.

It should be noted that only the second uplink reference UL-DL configuration may be configured in the serving cell. In other words, the second uplink reference UL-DL configuration may be configured for the serving cell, and the first uplink reference UL-DL configuration does not have to be configured.

An example of the second uplink reference UL-DL configuration of the serving cell frame structure type 1 in the FDD-TDD HARQ-ACK reporting procedure of the primary cell frame structure type 2 will be described.

In the FDD-TDD HARQ-ACK reporting procedure of the primary cell frame structure type 2, the second uplink reference UL-DL configuration of the serving cell frame structure type 1 is any one of the TDD UL/DL configurations {1, 2, 3, 4, 6}. For example, the second uplink reference UL-DL configuration of the serving cell frame structure type 1 is the TDD UL/DL configuration 1.

In the FDD-TDD HARQ-ACK reporting procedure of the primary cell frame structure type 2, the uplink reference UL-DL configuration of the serving cell frame structure type 1 is assumed (hypothesized) to be any one of the TDD UL/DL configurations {1, 2, 3, 4, 6}. For example, the uplink reference UL-DL configuration of the serving cell frame structure type 1 is assumed (hypothesized) to be TDD UL/DL configuration 1.

An example of the second uplink reference UL-DL configuration of the serving cell frame structure type 1 in the FDD-TDD HARQ-ACK reporting procedure of the primary cell frame structure type 2 will be described.

In the FDD-TDD HARQ-ACK reporting procedure of the primary cell frame structure type 2, the second uplink reference UL-DL configuration of the serving cell frame structure type 1 is configured in a higher layer.

An example of the second uplink reference UL-DL configuration of the serving cell frame structure type 1 in the FDD-TDD HARQ-ACK reporting procedure of the primary cell frame structure type 2 will be described.

Regarding the FDD-TDD HARQ-ACK reporting procedure of the primary cell frame structure type 2, specifically, a serving cell with the frame structure type 1, when monitoring of a PDCCH/EPDCCH in another serving cell for scheduling of the serving cell is not configured, the second uplink reference UL-DL configuration of the serving cell frame structure type 1 is any one of TDD UL/DL configurations {1, 2, 3, 4, 6}, and in other cases, the second uplink reference UL-DL configuration of the serving cell frame structure type 1 is the UL/DL configuration of the primary cell.

Regarding the FDD-TDD HARQ-ACK reporting procedure of the primary cell frame structure type 2, specifically, a serving cell with the frame structure type 1, when monitoring of a PDCCH/EPDCCH in another serving cell for scheduling of the serving cell is not configured, the uplink reference UL-DL configuration of the serving cell frame structure type 1 is assumed (hypothesized) to be any one of TDD UL/DL configurations {1, 2, 3, 4, 6}, and in other cases, the uplink reference UL-DL configuration of the serving cell frame structure type 1 is assumed (hypothesized) to be the UL/DL configuration of the primary cell.

An example of the second uplink reference UL-DL configuration of the serving cell frame structure type 1 in the FDD-TDD HARQ-ACK reporting procedure of the primary cell frame structure type 2 will be described.

Regarding the FDD-TDD HARQ-ACK reporting procedure of the primary cell frame structure type 2, specifically, a serving cell with the frame structure type 1, when monitoring of a PDCCH/EPDCCH in another serving cell for scheduling of the serving cell is not configured, the second uplink reference UL-DL configuration of the serving cell frame structure type 1 is any one of TDD UL/DL configurations {1, 2, 3, 4, 6}, and in other cases, the second uplink reference UL-DL configuration of the serving cell frame structure type 1 is the UL/DL configuration of the primary cell.

Regarding the FDD-TDD HARQ-ACK reporting procedure of the primary cell frame structure type 2, specifically, a serving cell with the frame structure type 1, when monitoring of a PDCCH/EPDCCH in another serving cell for scheduling of the serving cell is not configured, the uplink reference UL-DL configuration of the serving cell frame structure type 1 is assumed (hypothesized) to be any one of TDD UL/DL configurations {1, 2, 3, 4, 6}, and in other cases, the uplink reference UL-DL configuration of the serving cell frame structure type 1 is assumed (hypothesized) to be the UL/DL configuration of the primary cell.

An example of the second uplink reference UL-DL configuration of the serving cell frame structure type 1 in the FDD-TDD HARQ-ACK reporting procedure of the primary cell frame structure type 2 will be described.

Regarding the FDD-TDD HARQ-ACK reporting procedure of the primary cell frame structure type 2, the second uplink reference UL-DL configuration of the serving cell frame structure type 1 is the UL/DL configuration of the primary cell, but when monitoring of a PDCCH/EPDCCH in another serving cell for the scheduling of the serving cell is configured, and the UL/DL configuration of the primary cell is 0, the second uplink reference UL-DL configuration of the serving cell frame structure type 1 is any one of {1, 2, 3, 4, 6}.

A second downlink reference UL-DL will be described below.

The first downlink reference UL-DL configuration is used for determination of the subframe interval (the subframe timing) of an HARQ-ACK transmission corresponding to a PDSCH or a PDCCH/EPDCCH indicating an SPS release from the PDSCH reception or the reception of the PDCCH/EPDCCH indicating the SPS release, and in the application conditions of the DL DAI, and also in a subframe to which the HARQ-ACK bit needs to be fed back. On the other hand, the second downlink reference UL-DL configuration is used for determination of a subframe to which the HARQ-ACK bit needs to be fed back. The second downlink reference UL-DL configuration may be used in the application conditions of the DL DAI. The second downlink reference UL-DL configuration is not used for determination of the subframe interval (subframe timing) of an HARQ-ACK transmission corresponding to a PDSCH or a PDCCH/EPDCCH indicating an SPS release from the PDSCH reception or the reception of the PDCCH/EPDCCH indicating the SPS release.

That is, a terminal configured to communicate with a base station by using an FDD cell and a TDD cell includes a reception unit configured to perform reception on a PDCCH that is transmitted in a DCI format. In the terminal, when the primary cell is configured as a TDD cell, the first downlink reference UL-DL configuration used for determination of the interval between the PDSCH reception and the HARQ-ACK transmission corresponding to the PDSCH is configured in the TDD cell and the FDD cell, and in the terminal, when the primary cell is configured as an FDD cell, the second uplink reference UL-DL configuration used for determination of a downlink subframe or a special subframe is configured in the TDD cell.

An example of the operation of the terminal device 2 when the second downlink reference UL-DL configuration has been configured will be described.

In the FDD cell, the subframe interval between the PDSCH reception or the reception of the PDCCH/EPDCCH indicating the SPS release and the HARQ-ACK transmission corresponding to a PDSCH or a PDCCH/EPDCCH indicating an SPS release is configured with a fixed interval. Even when the second downlink reference UL-DL configuration is applied to the FDD serving cell, the terminal device 2 is not based on the second downlink reference UL-DL configuration for the subframe interval between the PDSCH reception or the reception of the PDCCH/EPDCCH indicating the SPS release and the HARQ-ACK transmission corresponding to a PDSCH or a PDCCH/EPDCCH indicating an SPS release. Even when the second downlink reference UL-DL configuration is applied to an FDD serving cell, the base station device 1 is not based on the downlink reference UL-DL configuration for determination of the timing of the PDCCH/EPDCCH/PDSCH transmission and the HARQ-ACK reception.

An example of the application conditions of the DL DAI based on the second downlink reference UL-DL configuration will be described.

When the second downlink reference UL-DL configuration is configured as 0, the DL DAI is not applied (used). When the second uplink reference UL-DL configuration is configured as other than 0 (the second uplink reference UL-DL configuration is 1, 2, 3, 4, 5, 6), the DL DAI is applied (used).

It should be noted that when the downlink reference UL-DL configuration is assumed (hypothesized) to be a prescribed TDD UL-DL configuration for a serving cell, it can be said that the second downlink reference UL-DL configuration is configured (applied) as the prescribed TDD UL-DL configuration for the serving cell in the terminal device 2.

It should be noted that the parameter of the second downlink reference UL-DL configuration may be common with the parameter of the first downlink reference UL-DL configuration.

It should be noted that the configuration method of the second downlink reference UL-DL configuration may be common with the configuration method of the first downlink reference UL-DL configuration.

It should be noted that only the second downlink reference UL-DL configuration may be configured in the serving cell. In other words, the second downlink reference UL-DL configuration may be configured for the serving cell, and the first downlink reference UL-DL configuration does not have to be configured.

In the FDD-TDD HARQ-ACK reporting procedure of the primary cell frame structure type 2, the DL DAI is applied to an FDD cell for which self scheduling is performed, and therefore, the arrangement of the HARQ-ACK bit is determined from the DL DAI. In such a case, the downlink reference UL-DL configuration 0 is the configuration in which the DL DAI is not used, and therefore, the allocation method of the HARQ-ACK when the UL-DL configurations of two TDD serving cells are different is followed by assuming (hypothesizing) that the FDD cell has a downlink reference UL-DL configuration in which M is not less than 2 and not more than 4.

That is, when monitoring of the PDCCH/EPDCCH in another serving cell for the FDD serving cell is not configured for the terminal device 2, in a subframe n−k of the FDD serving cell, the HARQ-ACK association for the PDSCH transmission by the corresponding PDCCH/EPDCCH, or for the PDCCH/EPDCCH indicating the release of a downlink SPS is the same as the HARQ-ACK association when the UL-DL configurations of the two TDD serving cells corresponding to the serving cell with the downlink reference UL-DL configuration {1, 2, 3, 4, 6} are different. Here, k is an element of a set K (downlink association set) (k∈K).

The details of the HARQ-ACK reporting procedure will be described below.

An example of using a DAI is described.

In TDD-FDD CA of a TDD primary cell, in the configured serving cell, when the serving cell is a TDD cell, and the downlink reference UL-DL configuration is 0, the DAI included in the DCI format 1/1A/1B/1D/2/2A/2B/2C/2D is not used.

In TDD-FDD CA of a TDD primary cell, in the configured serving cell, when the serving cell is an FDD cell and cross carrier scheduling from another cell is configured for the FDD cell, and the downlink reference UL-DL configuration is 0, the DAI included in the DCI format 1/1A/1B/1D/2/2A/2B/2C/2D is not used.

An example of using a DAI will be described.

In the configured serving cell, when the downlink reference UL-DL configuration is 0, the DAI included in the DCI format 1/1A/1B/1D/2/2A/2B/2C/2D is not used. In the configured serving cell, when the uplink reference UL-DL configuration is 0, the DAI included in the DCI format 0/4 is not used.

An example of using a DAI will be described.

In the configured serving cell, when the downlink reference UL-DL configuration of the TDD primary cell is 0, the DAI included in the DCI format 1/1A/1B/1D/2/2A/2B/2C/2D is not used. In the configured serving cell, when the uplink reference UL-DL configuration of the TDD primary cell is 0, the DAI included in the DCI format 0/4 is not used.

An example of using a DAI is described.

In the configured serving cell, when the primary cell is an FDD cell, or the downlink reference UL-DL configuration of the serving cell is 0, the DAI included in the DCI format 1/1A/1B/1D/2/2A/2B/2C/2D is not used. In the configured serving cell, when the primary cell is an FDD cell, or the uplink reference UL-DL configuration of the serving cell is 0, the DAI included in the DCI format 0/4 is not used.

An example of using a DAI will be described.

In the configured serving cell, when the primary cell is an FDD cell, or the downlink reference UL-DL configuration of the TDD primary cell is 0, the DAI included in the DCI format 1/1A/1B/1D/2/2A/2B/2C/2D is not used. In the configured serving cell, when the primary cell is an FDD cell, or the uplink reference UL-DL configuration of the TDD primary cell is 0, the DAI included in the DCI format 0/4 is not used.

In a TDD cell, the value of the DAI that is announced with being included in an uplink grant is used for determination of $V^{UL}_{DAI}$ and $W^{UL}_{DAI}$. $V^{UL}_{DAI}$ is determined from the value of the DAI that is announced with being included in the uplink grant, when one TDD serving cell is configured, and the PUCCH format 3 is not configured for the terminal device 2. $W^{UL}_{DAI}$ is determined from the value of the DAI that is announced as being included in the uplink grant, when more than one serving cell is configured for the terminal device 2, or one serving cell and the PUCCH format 3 are configured for the terminal device 2.

The base station device 1 transmits the uplink grant including the DAI in accordance with the table shown in FIG. 13. FIG. 13 is an example showing an uplink association index. An uplink association index k' is defined by using the table shown in FIG. 13. When the uplink grant including the DAI is transmitted in a subframe n, the PUSCH is transmitted in a subframe n+k'. When the terminal device 2 transmits the HARQ-ACK information in the subframe in which the PUSCH is transmitted, the HARQ-ACK information is constituted of the information on the DAI, and is transmitted on the PUSCH.

That is, in one configured serving cell in which the TDD UL-DL configuration is from 1 to 6, when the PUCCH format 3 is not configured in the terminal device 2, the value $V^{UL}_{DAI}$ of the DAI included in the DCI format 0/4 that is detected by the terminal device 2 in a subframe n−k' indicates the total number of subframes including the PDSCH transmission corresponding to the terminal device 2 from among all subframes n−k, and the PDCCH/EPDCCH indicating the release of the downlink SPS. Here k' is defined in the table shown in FIG. 13, and k belongs to K (k∈K). The value of $V^{UL}_{DAI}$ includes all PDSCH transmissions corresponding to the PDCCH/EPDCCH, and all PDSCH transmissions that do not correspond to the PDCCH/EPDCCH from among all subframes. When both the PDSCH transmission instructed to the terminal device 2 and the PDCCH/EPDCCH indicating the release of a downlink SPS resource do not exist, the terminal device 2 expects that the value of the DAI in the transmitted DCI format is configured as 4.

That is, when more than one serving cell is configured for the terminal device 2, in a TDD cell in which the TDD UL-DL configuration is from 1 to 6, or when one serving cell and the PUCCH format 3 are configured for the terminal device 2, and in a TDD cell in which the TDD UL-DL configuration is from 1 to 6, the value of $W^{UL}_{DAI}$ is determined from the DAI in the DCI format 0/4 in the subframe n−k'. Here, k' is defined in the table shown in FIG. 13. When both the PDSCH transmission instructed to the terminal device 2 and the PDCCH/EPDCCH indicating the release of a downlink SPS resource do not exist, the terminal device 2 expects that $W^{UL}_{DAI}$ is configured as 4 in accordance with the DAI in the transmitted DCI format.

That is, when the uplink reference UL-DL configuration of a certain serving cell belongs to any one from {1, 2, 3, 4, 5, 6}, the value of $W^{UL}_{DAI}$ is determined from the DAI in the DCI format 0/4 that corresponds to the PUSCH transmitted in the serving cell and is transmitted in the subframe n−k'.

Here, k' is defined in the table shown in FIG. 13, and the TDD UL-DL configuration of the table shown in FIG. 13 references the uplink reference UL-DL configuration of the serving cell. When both the PDSCH transmission instructed to the terminal device 2 and the PDCCH/EPDCCH indicating the release of a downlink SPS resource do not exist, the terminal device 2 expects that $W^{UL}_{DAI}$ is configured as 4 in accordance with the DAI in the transmitted DCI format.

The determination of $W^{UL}_{DAI}$ when a plurality of cells to which different frame structure types have been applied are aggregated will be described below.

When the primary cell is a TDD cell, even in the FDD cell, $W^{UL}_{DAI}$ may be configured in accordance with the value of the DAI included in the uplink grant.

An example of a case in which an uplink reference UL-DL configuration is configured in an FDD cell, when a DAI field is configured in a serving cell only in the case of a TDD primary cell will be described.

When the primary cell is a TDD cell and the uplink reference UL-DL configuration of a certain serving cell belongs to any one from $\{1, 2, 3, 4, 5, 6\}$, the value of $W^{UL}_{DAI}$ is determined from the DAI in the DCI format 0/4 that corresponds to the PUSCH that is transmitted in the serving cell and is transmitted in the subframe n−k'. Here, k' is defined in the table shown in FIG. 13, and the TDD UL-DL configuration of the table shown in FIG. 13 references the uplink reference UL-DL configuration of the serving cell. When both the PDSCH transmission instructed to the terminal device 2 and the PDCCH/EPDCCH indicating the release of a downlink SPS resource do not exist, the terminal device 2 expects that $W^{UL}_{DAI}$ is configured as 4 in accordance with the DAI in the transmitted DCI format.

An example of a case in which an uplink reference UL-DL configuration is not configured in an FDD cell, when a DAI field is configured in a serving cell only in the case of a TDD primary cell will be described.

$W^{UL}_{DAI}$ is determined from the value of UL DAI. $W^{UL}_{DAI}$ is announced from the base station device 1 to the terminal device 2 as being included in the uplink grant by which the scheduling of the PUSCH that is transmitted with the HARQ-ACK included therein is indicated. Therefore, the reception timing of the UL DAI is the same as the reception timing of the uplink grant by which the PUSCH is scheduled. That is, in a TDD cell in which the PUSCH is scheduled, the UL DAI is announced in the subframe n−k', and in an FDD cell in which the PUSCH is scheduled, the UL DAI is announced, in the subframe n−4, to the subframe n in which the PUSCH including the HARQ-ACK is transmitted.

When the primary cell is a TDD cell and the uplink reference UL-DL configuration of a certain configured TDD cell belongs to any one from $\{1, 2, 3, 4, 5, 6\}$, the value of $W^{UL}_{DAI}$ is determined from the DAI in the DCI format 0/4 that corresponds to the PUSCH that is transmitted in the TDD cell and is transmitted in the subframe n−k', or is determined from the DAI in the DCI format 0/4 that corresponds to the PUSCH that is transmitted in the FDD cell and is transmitted in the subframe n−4. Here, k' is defined in the table shown in FIG. 13, and the TDD UL-DL configuration of the table shown in FIG. 13 references the uplink reference UL-DL configuration of the TDD cell. When both the PDSCH transmission instructed to the terminal device 2 and the PDCCH/EPDCCH indicating the release of a downlink SPS resource do not exist, the terminal device 2 expects that $W^{UL}_{DAI}$ is configured as 4 in accordance with the DAI in the transmitted DCI format.

An example of a case in which an uplink reference UL-DL configuration is configured in an FDD cell, when a DAI field is configured for a TDD cell and an FDD secondary cell configured in a TDD primary cell will be described.

In a TDD cell or an FDD secondary cell aggregated with a TDD primary cell, when the uplink reference UL-DL configuration of a certain serving cell belongs to any one from $\{1, 2, 3, 4, 5, 6\}$, the value of $W^{UL}_{DAI}$ corresponds to the PUSCH that is transmitted in the serving cell, and is determined from the DAI in the DCI format 0/4 that is transmitted in the subframe n−k'. Here, k' is defined in the table shown in FIG. 13, and the TDD UL-DL configuration of the table shown in FIG. 13 references the uplink reference UL-DL configuration of the serving cell. When both the PDSCH transmission instructed to the terminal device 2 and the PDCCH/EPDCCH indicating the release of a downlink SPS resource do not exist, the terminal device 2 expects that $W^{UL}_{DAI}$ is configured as 4 in accordance with the DAI in the transmitted DCI format.

An example of a case where a DAI field is configured for a TDD cell and an FDD secondary cell configured in a TDD primary cell, and when an uplink reference UL-DL configuration is not configured in an FDD cell will be described.

In a TDD cell or an FDD secondary cell aggregated with a TDD primary cell, when the uplink reference UL-DL configuration of a certain TDD cell belongs to any one from $\{1, 2, 3, 4, 5, 6\}$, the value of $W^{UL}_{DAI}$ corresponds to the PUSCH that is transmitted in the TDD cell, and is determined from the DAI in the DCI format 0/4 that is transmitted in the subframe n−k', or corresponds to the PUSCH that is transmitted in the FDD cell, and is determined from the DAI in the DCI format 0/4 that is transmitted in the subframe n−4. Here, k' is defined in the table shown in FIG. 13, and the TDD UL-DL configuration of the table shown in FIG. 13 references the uplink reference UL-DL configuration of the TDD cell. When both the PDSCH transmission instructed for the terminal device 2 and the PDCCH/EPDCCH indicating the release of a downlink SPS resource do not exist, the terminal device 2 expects that $W^{UL}_{DAI}$ is configured as 4 in accordance with the DAI in the transmitted DCI format.

It should be noted that the uplink reference UL-DL configuration in the configuration of the value $W^{UL}_{DAI}$ references either the configured first uplink reference UL-DL configuration or the second uplink reference UL-DL configuration. When both the first uplink reference UL-DL configuration and the second uplink reference UL-DL configuration are configured for the serving cell, the second uplink reference UL-DL configuration is referenced.

In a TDD cell, the value of the DAI that is announced with being included in a downlink grant is used for determination of $V^{DL}_{DAI}$.

When one TDD cell, or two or more TDD cells with the same TDD UL-DL configuration are configured for the terminal device 2, in the TDD cell with the TDD UL-DL configuration from 1 to 6, or when two or more TDD cells are configured for the terminal device 2, and the TDD UL-DL configurations of at least two TDD cells are different, in the TDD cell in which the downlink reference UL-DL configuration belongs to any one of $\{1, 2, 3, 4, 5, 6\}$, the value of the DAI included in the DCI format 1/1A/1B/1D/2/2A/2B/2C/2D indicates the cumulative count of the PDSCH transmission in subframes up to the current subframe from among the subframes n−k of each configured serving cell, or of the PDCCH or EPDCCH indicating the release of a downlink SPS (semi-persistent scheduling), and the value of the DAI is updated in each subframe. $V^{DL}_{DAI}$, $c$ is indicated as the value of the DAI in the PDCCH/EPDCCH that is transmitted concomitantly with the DCI format 1/1A/1B/1D/2/2A/2B/2C/2D that is detected by the terminal device 2 in a subframe n−$k_m$ in the serving cell c. Here, $k_m$ is the smallest value from among the $k_m$ detected with the 1/1A/1B/1D/2/2A/2B/2C/2D by the terminal device 2 in a set K defined in the table shown in FIG. 6. It should be noted that when one serving cell has been configured, the notation c in $V^{DL}_{DAI, c}$ may be deleted.

The determination of $V^{DL}_{DAI, c}$ when a plurality of cells to which different frame structure types have been applied are aggregated will be described below.

When the primary cell is a TDD cell, also in the FDD cell, $V^{DL}_{DAI, c}$ may be configured in accordance with the value of the DAI included in the downlink grant.

An example of a case where a DAI field is configured in a serving cell only in the case of a TDD primary cell, and when a table defining a downlink association set is configured individually in the TDD cell and in the FDD cell will be described.

When the primary cell is a TDD cell, in an FDD cell or a TDD cell in which the downlink reference UL-DL configuration is from 1 to 6, the value of the DAI included in the DCI format 1/1A/1B/1D/2/2A/2B/2C/2D indicates the cumulative count of the PDSCH transmission in up to the current subframe from among the subframes n−k of each configured serving cell, or of the PDCCH or EPDCCH indicating the release of a downlink SPS (semi-persistent scheduling), and the value of the DAI is updated in each subframe. $V^{DL}_{DAI, c}$ is indicated as the value of the DAI in the PDCCH/EPDCCH that is transmitted concomitantly with the DCI format 1/1A/1B/1D/2/2A/2B/2C/2D that is detected by the terminal device 2 in the subframe n−$k_m$ in the serving cell c. Here, $k_m$ is the smallest value from among the $k_m$ detected with the 1/1A/1B/1D/2/2A/2B/2C/2D by the terminal device 2 in a set K defined in the table shown in FIG. 9 in an FDD cell, and in a set K defined in the table shown in FIG. 6 in a TDD cell.

An example of a case where a DAI field is configured for a TDD cell and an FDD secondary cell configured by a TDD primary cell, and when a table defining a downlink association set is configured individually in the TDD cell and the FDD cell will be described.

In an FDD secondary cell aggregated with a TDD primary cell, or in a TDD cell in which the downlink reference UL-DL configuration is from 1 to 6, the value of the DAI included in the DCI format 1/1A/1B/1D/2/2A/2B/2C/2D indicates the cumulative count of the PDSCH transmission in up to the current subframe from among the subframes n−k of each configured serving cell, or of the PDCCH or EPDCCH indicating the release of a downlink SPS (semi-persistent scheduling), and the value of the DAI is updated for each subframe. $V^{DL}_{DAI, c}$ is indicated as the value of the DAI in the PDCCH/EPDCCH that is transmitted concomitantly with the DCI format 1/1A/1B/1D/2/2A/2B/2C/2D that has been detected by the terminal device 2 in a subframe n−$k_m$ in the serving cell c. Here, $k_m$ is the smallest value from among the $k_m$ detected with 1/1A/1B/1D/2/2A/2B/2C/2D by the terminal device 2 in a set K defined in the table shown in FIG. 9 in an FDD cell, and in a set K defined in the table shown in FIG. 6 in a TDD cell.

An example of a case where a DAI field is configured in a serving cell only in the case of a TDD primary cell, and a table defining a downlink association set is configured in common in the TDD cell and the FDD cell, will be described.

When the primary cell is a TDD cell, in an FDD cell or a TDD cell in which the downlink reference UL-DL configuration is from 1 to 6, the value of the DAI included in the DCI format 1/1A/1B/1D/2/2A/2B/2C/2D indicates the cumulative count of the PDSCH transmission in up to the current subframe from among the subframes n−k of each configured serving cell, or of the PDCCH or EPDCCH indicating the release of a downlink SPS (semi-persistent scheduling), and the value of the DAI is updated for each subframe. $V^{DL}_{DAI, c}$ is indicated as the value of the DAI in the PDCCH/EPDCCH that is transmitted concomitantly with the DCI format 1/1A/1B/1D/2/2A/2B/2C/2D that is detected by the terminal device 2 in a subframe n−$k_m$ in the serving cell c. Here, $k_m$ is the smallest value from among the $k_m$ detected with 1/1A/1B/1D/2/2A/2B/2C/2D by the terminal device 2 in a set K defined in the table shown in FIG. 6.

An example of a case where a DAI field is configured for a TDD cell and an FDD secondary cell configured by a TDD primary cell, and a table defining a downlink association set is configured in common in the TDD cell and the FDD cell, will be described.

In an FDD secondary cell aggregated with a TDD primary cell, or in a TDD cell in which the downlink reference UL-DL configuration is from 1 to 6, the value of the DAI included in the DCI format 1/1A/1B/1D/2/2A/2B/2C/2D indicates the cumulative count of the PDSCH transmission in up to the current subframe from among the subframes n−k of each configured serving cell, or of the PDCCH or EPDCCH indicating the release of a downlink SPS (semi-persistent scheduling), and the value of the DAI is updated for each subframe. $V^{DL}_{DAI, c}$ is indicated as the value of the DAI in the PDCCH/EPDCCH that is transmitted concomitantly with the DCI format 1/1A/1B/1D/2/2A/2B/2C/2D that is detected by the terminal device 2 in subframe n−$k_m$ in the serving cell c. Here, $k_m$ is the smallest value from among the $k_m$ detected by 1/1A/1B/1D/2/2A/2B/2C/2D by the terminal device 2 in a set K defined in the table shown in FIG. 6.

It should be noted that the downlink reference UL-DL configuration in the configuration of the above described value of $V^{DL}_{DAI, c}$ references either the configured first downlink reference UL-DL configuration or the second downlink reference UL-DL configuration. When both the first downlink reference UL-DL configuration and the second downlink reference UL-DL configuration are configured for the serving cell, the second downlink reference UL-DL configuration is referenced.

In TDD, $U_{DAI, c}$ indicating the total number of the PDCCHs/EPDCCHs assigned with the PDSCH transmission of each TDD serving cell, and the PDCCH/EPDCCH indicating the release of the downlink SPS is configured.

That is, in all TDD cells with TDD UL-DL configuration, the $U_{DAI, c}$ indicates the total number of the PDCCHs/EPDCCHs assigned with the PDSCH transmission that is detected in the terminal device 2 from among the subframes n−k of the serving cell c, and the PDCCH/EPDCCH indicating the release of the downlink SPS. Here, k belongs to K (k∈K). $N_{SPS}$ indicates the number of PDSCH transmissions that are not accompanied by a PDCCH/EPDCCH from among the subframes n−k, and $N_{SPS}$ is either 0 or 1. Here, k belongs to K (k∈K).

The determination of $U_{DAI, c}$ when a plurality of cells to which different frame structure types have been applied are aggregated will be described below.

An example of a case where a DAI field is configured in a serving cell only in the case of a TDD primary cell will be described.

In all TDD cells with TDD UL-DL configuration, the $U_{DAI,\ c}$ indicates the total number of the PDCCHs/EPDCCHs assigned with the PDSCH transmission that is detected by the terminal device 2 from among the subframes n−k of the serving cell c, and the PDCCH/EPDCCH indicating the release of the downlink SPS. Here, k belongs to K (k∈K). $N_{SPS}$ indicates the number of PDSCH transmissions that are not accompanied by a PDCCH/EPDCCH from among the subframes n−k, and $N_{SPS}$ is either 0 or 1. Here, k belongs to K (k∈K).

In a serving cell, when the primary cell is a TDD cell, the $U_{DAI,\ c}$ indicates the total number of the PDCCHs/EPDCCHs assigned with the PDSCH transmission that is detected by the terminal device 2 from among the subframes n−k of the serving cell c, and the PDCCH/EPDCCH indicating the release of the downlink SPS. Here, k belongs to K (k∈K). $N_{SPS}$ indicates the number of PDSCH transmissions that are not accompanied by a PDCCH/EPDCCH from among the subframes n−k, and $N_{SPS}$ is either 0 or 1. Here, k belongs to K (k∈K).

An example of a case where a DAI field is configured for a TDD cell and an FDD secondary cell configured by a TDD primary cell will be described.

In a TDD cell, or an FDD secondary cell aggregated with a TDD primary cell, the $U_{DAI,\ c}$ indicates the total number of the PDCCHs/EPDCCHs assigned with the PDSCH transmission that is detected by the terminal device 2 from among the subframes n−k of the serving cell c, and the PDCCH/EPDCCH indicating the release of the downlink SPS. Here, k belongs to K (k∈K). $N_{SPS}$ indicates the number of PDSCH transmissions that are not accompanied by a PDCCH/EPDCCH from among the subframes n−k, and $N_{SPS}$ is either 0 or 1. Here, k belongs to K (k∈K).

The configuration of one or a plurality of HARQ-ACK feedback bits $\{o^{ACK}_{c,0}, o^{ACK}_{c,1}, \ldots, o^{ACK}_{c,\ OACKc-1}\}$ (HARQ-ACK feedback bit string) in a case where the PUCCH format 3 is configured for the transmission of the HARQ-ACK information will be described below.

The number of HARQ-ACK feedback bits is determined on the basis of the value of the DAI included in an uplink grant.

The arrangement of HARQ-ACK feedback bits is determined on the basis of the value of the DAI included in a downlink grant.

A terminal configured to communicate with a base station by using an FDD cell and a TDD cell includes a reception unit configured to perform reception on a PDCCH that is transmitted in a first DCI format or a second DCI format. When an integration of the FDD cell and the TDD cell is configured by the base station, a first DAI indicating a cumulative count of the PDSCH transmission in subframes up to the current subframe in prescribed subframes, or of the PDCCH or EPDCCH indicating the release of downlink semi-persistent scheduling receives with being included in the first DCI format, and determines the HARQ-ACK feedback bits corresponding to the PDSCH transmission or the PDCCH or EPDCCH in the FDD cell, and a second DAI that is different from the first DAI receives with being included in the second DCI format, and determines the size of the HARQ-ACK feedback bits in the FDD cell. Furthermore, the HARQ-ACK information is transmitted in the PUCCH format 3. Furthermore, the TDD cell is a primary cell, and the FDD cell is a secondary cell. Furthermore, the table for defining the downlink association set in the TDD cell and the table for defining the downlink association set in the FDD cell are different. The first DAI is used in the FDD cell in all downlink reference uplink-downlink configurations.

When the PUCCH format 3 is configured for the transmission of the HARQ-ACK information, the HARQ-ACK feedback bits $\{o^{ACK}_{c,0}, o^{ACK}_{c,1}, \ldots, o^{ACK}_{c,\ OACKc-1}\}$ for the c-th serving cell configured in RRC are configured under the conditions described below. When c equal to or more than 0, the transmission mode configured in the c-th serving cell supports one transport block, or spatial HARQ-ACK information bundling is applied, $O^{ACK}_c$ (OACKc, number of HARQ-ACK feedback bits for the c-th serving cell) is equal to $B^{DL}_c$ ($O^{ACK}_c = B^{DL}_c$), and in other cases, $O^{ACK}_c$ is equal to twice of $B^{DL}_c$ ($O^{ACK}_c = 2B^{DL}_c$). Here, $B^{DL}_c$ is the number of downlink subframes necessary for the feedback of the HARQ-ACK information bits for the c-th serving cell by the terminal device 2.

The determination of $B^{DL}_c$ when one TDD cell is configured in the terminal device 2, or when two or more TDD cells are configured, and the TDD UL-DL configuration of all TDD cells is the same will be described below.

In a subframe n, when the HARQ-ACK information is transmitted on the PUCCH, or a PUSCH that does not correspond to the DCI format is transmitted, or a PUSCH is transmitted in correspondence to the DCI format in a serving cell with the TDD UL-DL configuration as 0, an equation (a-1) shown in FIG. 14 is applied. When a PUSCH is transmitted in correspondence to the DCI format in a serving cell in which the TDD UL-DL configuration is configured as any one of 1 to 6, an equation (a-2) shown in FIG. 14 is applied. When a PUSCH is transmitted in correspondence to the DCI format in a serving cell in which the TDD UL-DL configuration is configured as 1 to 6, an equation (a-3) shown in FIG. 14 is applied.

When the terminal device 2 performs transmission on a PUCCH, $B^{DL}_c$ is equal to M (the equation (a-1) shown in FIG. 14).

In a TDD cell with the TDD UL-DL configuration 0, or a PUSCH that is not adjusted on the basis of the DCI format 0/4 detected in association, $B^{DL}_c$ is equal to $M_c$ (the equation (a-1) shown in FIG. 14)). When the terminal device 2 does not receive a PDSCH in a subframe n−k, or a PDCCH/EPDCCH indicating the release of a downlink SPS, the terminal device 2 does not transmit the HARQ-ACK information in the PUSCH. Here, k belongs to K (k∈K).

In a TDD cell with the TDD UL-DL configuration as any one of {0, 1, 2, 3, 4, 6}, or in the PUSCH transmission of a subframe n that is adjusted on the basis of the PDCCH/EPDCCH detected concomitantly with the DCI format 0/4, it is assumed that the terminal device 2 substitutes $W^{UL}_{DAI}$ in $B^{DL}_c$ (the equation (a-2) shown in FIG. 14). When $W^{UL}_{DAI}$ is 4 ($W^{UL}_{DAI}=4$), and the terminal device 2 does not receive a PDSCH in a subframe n−k, or a PDCCH/EPDCCH indicating the release of downlink SPS, the terminal device 2 does not transmit HARQ-ACK in the PUSCH. Here, k belongs to K (k∈K).

In a TDD cell with the TDD UL-DL configuration as 5, or in the PUSCH transmission of a subframe n that is adjusted on the basis of the PDCCH/EPDCCH detected concomitantly with the DCI format 0/4, it is assumed that the terminal device 2 substitutes a value that is the sum of $W^{UL}_{DAI}$ and a value obtained by multiplying 4 with the fraction of the value obtained by dividing the difference between U and $W^{UL}_{DAI}$ with 4, the fraction being rounded towards positive infinity, in $B^{DL}_c$ (the equation (a-3) shown in FIG. 14). Here, U indicates the maximum value of $U_c$ among all configured serving cells, and $U_c$ is the total number of the PDSCH received in a subframe n−k of the c-th serving cell specified by k that belongs to a set K, and the PDCCH/EPDCCH indicating the release of the downlink SPS. When $W^{UL}_{DAI}$ is 4 ($W^{UL}_{DAI}=4$), and the terminal device 2 receives, in the subframe n–k, neither the PDSCH, nor the PDCCH/EPDCCH indicating the release of a downlink SPS, the terminal device 2 does not transmit the HARQ-ACK by the PUSCH.

The determination of $B^{DL}_c$ when two or more TDD cells are configured for the terminal device 2, and when the TDD UL-DL configurations of at least two TDD cells are different will be described below.

In a subframe n, when the HARQ-ACK information is transmitted on the PUCCH, or a PUSCH that does not correspond to the DCI format is transmitted, or a PUSCH is transmitted in correspondence to the DCI format in a serving cell with the uplink reference UL-DL configuration as 0, an equation (b-1) shown in FIG. 14 is applied. When a PUSCH is transmitted in correspondence to the DCI format in a serving cell in which the uplink reference UL-DL configuration is 1 to 6, and the downlink reference UL-DL configuration is any one of 0, 1, 2, 3, 4, or 6, an equation (b-2) shown in FIG. 14 is applied. When a PUSCH is transmitted in correspondence to the DCI format in a serving cell in which the uplink reference UL-DL configuration is 1 to 6, and the downlink reference UL-DL configuration is configured as 5, an equation (b-3) shown in FIG. 14 is applied.

That is, in the subframe n in the terminal device 2, when a PUCCH, or a PUSCH that is not adjusted on the basis of the detected DCI format 0/4, or the PUSCH that is adjusted on the basis of the DCI format 0/4 of the uplink reference UL-DL configuration 0 detected in association is transmitted, $B^{DL}_c$ is equal to $M_c$ (the equation (b-1) shown in FIG. 14). When the terminal device 2 does not receive a PDSCH in the subframe n–k, or a PDCCH/EPDCCH indicating the release of a downlink SPS, the terminal device 2 does not transmit the HARQ-ACK information in the PUSCH. Here, k belongs to K (k∈K).

That is, when the downlink reference UL-DL configuration of each of the configured serving cells belongs to any one of {0, 1, 2, 3, 4, 6}, in the PUSCH transmission in the subframe n that is adjusted on the basis of the PDCCH/EPDCCH detected concomitantly with the DCI format 0/4 by using a TDD cell in which the uplink reference UL-DL configuration belongs to any one of {1, 2, 3, 4, 5, 6}, it is assumed that the terminal device 2 compares $W^{UL}_{DAI}$ and $M_c$, and substitutes the smaller value in $B^{DL}_c$ (the equation (b-2) shown in FIG. 14). When the terminal device 2 does not receive a PDSCH in the subframe n–k, or a PDCCH/EPDCCH indicating the release of a downlink SPS, the terminal device 2 does not transmit the HARQ-ACK in the PUSCH. Here, k belongs to K (k∈K).

That is, when the downlink reference UL-DL configuration of at least one serving cell is 5, in the PUSCH transmission in the subframe n that is adjusted on the basis of the PDCCH/EPDCCH detected concomitantly with the DCI format 0/4 by using a TDD cell in which the uplink reference UL-DL configuration belongs to any one of {1, 2, 3, 4, 5, 6}, it is assumed that the terminal device 2 compares a value that is the sum of $W^{UL}_{DAI}$ and a value obtained by multiplying 4 with the fraction of the value obtained by dividing the difference between U and $W^{UL}_{DAI}$ with 4, the fraction being rounded towards positive infinity, and $M_c$, and substitutes the smaller value in $B^{DL}_c$ (the equation (b-3) shown in FIG. 14). Here, U indicates the maximum value of $U_C$ among all configured serving cells, and $U_C$ is the total number of the PDSCH received in the subframe n–k of the c-th serving cell specified by k that belongs to a set K, and the PDCCH/EPDCCH indicating the release of the downlink SPS. When $W^{UL}_{DAI}$ is 4 ($W^{UL}_{DAI}=4$), and the terminal device 2 receives, in the subframe n–k, neither the PDSCH nor the PDCCH/EPDCCH indicating the release of a downlink SPS, the terminal device 2 does not transmit the HARQ-ACK by the PUSCH.

The determination of $B^{DL}_c$ when two or more serving cells are configured for the terminal device 2, and when the frame structure of at least two serving cells is different will be described below.

When the primary cell is a TDD cell, then also in the FDD cell, the size of the HARQ-ACK feedback bits is determined on the basis of the value of the DAI included in the uplink grant and the value of the downlink association set M.

An example of switching of an equation applied according to the downlink reference UL-DL configuration when a DAI field is configured in a serving cell only in the case of a TDD primary cell, and when a table defining a downlink association set is configured individually in the TDD cell and the FDD cell will be described below.

When the primary cell is a TDD cell, and in a subframe n, when the HARQ-ACK information is transmitted on the PUCCH, or a PUSCH that does not correspond to the DCI format is transmitted, or a PUSCH is transmitted in correspondence to the DCI format in a serving cell with the uplink reference UL-DL configuration as 0, the equation (b-1) shown in FIG. 14 is applied. When the primary cell is a TDD cell, and in the subframe n, when a PUSCH is transmitted in correspondence to the DCI format in an FDD cell in which the uplink reference UL-DL configuration is configured as 1 to 6, and the downlink reference UL-DL configuration is configured as any one of 0, 1, 3, or 6, or in a TDD cell in which the downlink reference UL-DL configuration is configured as any one of 0, 1, 2, 3, 4, or 6, the equation (b-2) shown in FIG. 14 is applied. When the primary cell is a TDD cell, and in subframe n, when a PUSCH is transmitted in correspondence to the DCI format in an FDD cell in which the uplink reference UL-DL configuration is 1 to 6, and the downlink reference UL-DL configuration is configured as any one of 2, 4, or 5, or in a TDD cell in which the downlink reference UL-DL configuration is configured as 5, the equation (b-3) shown in FIG. 14 is applied. When the primary cell is an FDD cell, the equation (b-4) shown in FIG. 14 is applied.

When the primary cell is a TDD cell, and in the subframe n in the terminal device 2, when a PUCCH, or a PUSCH that is not adjusted on the basis of the detected DCI format 0/4, or the PUSCH that is adjusted on the basis of the DCI format 0/4 of the uplink reference UL-DL configuration 0 detected in association is transmitted, $B^{DL}_c$ is equal to $M_c$ (the equation (b-1) shown in FIG. 14). When the terminal device 2 does not receive a PDSCH in the subframe n–k, or a PDCCH/EPDCCH indicating the release of a downlink SPS, the terminal device 2 does not transmit the HARQ-ACK information in the PUSCH. Here, k belongs to K (k∈K).

That is, when the primary cell is a TDD cell, and when the downlink reference UL-DL configuration of each of the configured FDD cells belongs to any one of {0, 1, 3, 6}, or when the downlink reference UL-DL configuration of each of the configured TDD cell belongs to any one of {0, 1, 2, 3, 4, 6}, in the PUSCH transmission in the subframe n that is adjusted on the basis of the PDCCH/EPDCCH detected concomitantly with the DCI format 0/4 by using a serving cell in which the uplink reference UL-DL configuration belongs to any one of {1, 2, 3, 4, 5, 6}, it is assumed that the terminal device 2 compares $W^{UL}_{DAI}$ and $M_c$, and substitutes the smaller value in $B^{DL}_c$ (the equation (b-2) shown in FIG. 14). When the terminal device 2 does not receive a PDSCH in the subframe n–k, or a PDCCH/EPDCCH indicating the release of a downlink SPS, the terminal device 2 does not transmit the HARQ-ACK in the PUSCH. Here, k belongs to K (k∈K).

When the primary cell is a TDD cell, and when the downlink reference UL-DL configuration of at least one FDD cell is {2, 4, 5}, or the downlink reference UL-DL configuration of at least one TDD cell is 5, in the PUSCH transmission of the subframe n that is adjusted on the basis of the PDCCH/EPDCCH detected concomitantly with the DCI format 0/4 by using a serving cell in which the uplink reference UL-DL configuration belongs to any one of {1, 2, 3, 4, 5, 6}, it is assumed that the terminal device 2 compares a value that is the sum of $W^{UL}_{DAI}$ and a value obtained by multiplying 4 with the fraction of the value obtained by dividing the difference between U and $W^{UL}_{DAI}$ with 4, the fraction being rounded towards positive infinity, and $M_c$, and substitutes the smaller value in $B^{DL}_c$ (the equation (b-3) shown in FIG. 14). Here, U indicates the maximum value of $U_C$ among all configured serving cells, and $U_C$ is the total number of the PDSCH received in the subframe n−k o the c-th serving cell specified by k that belongs to a set K, and the PDCCH/EPDCCH indicating the release of the downlink SPS. When $W^{UL}_{DAI}$ is 4 ($W^{UL}_{DAI}$=4), and the terminal device 2 receives, in the subframe n−k, neither the PDSCH nor the PDCCH/EPDCCH indicating the release of a downlink SPS, the terminal device 2 does not transmit the HARQ-ACK by the PUSCH.

When the primary cell is an FDD cell, 1 is substituted in $B^{DL}_c$ (the equation (b-4) shown in FIG. 14). When the terminal device 2 does not receive a PDSCH in a subframe n−4, or a PDCCH/EPDCCH indicating the release of a downlink SPS, the terminal device 2 does not transmit the HARQ-ACK information in the PUSCH.

It should be noted that when the primary cell is an FDD cell, the equation (b-1) shown in FIG. 14 may be applied by assuming $M_c$=1. It should be noted that when the DAI is configured in a TDD secondary cell also when the primary cell is an FDD cell, and also when the primary cell is an FDD cell, the equation (b-2) shown in FIG. 14 may be applied.

An example of switching of an equation applied according to the size of M when a DAI field is configured in a serving cell only in the case of a TDD primary cell, and when a table defining a downlink association set is configured individually in the TDD cell and in the FDD cell will be described.

When the primary cell is a TDD cell, and in a subframe n, when the HARQ-ACK information is transmitted on the PUCCH, or a PUSCH that does not correspond to the DCI format is transmitted, or a PUSCH is transmitted in correspondence to the DCI format in a serving cell with the uplink reference UL-DL configuration as 0, the equation (b-1) shown in FIG. 14 is applied. When the primary cell is a TDD cell, M is 4 or less in the subframe n, and a PUSCH is transmitted in correspondence to the DCI format in a serving cell in which the uplink reference UL-DL configuration is 1 to 6, the equation (b-2) shown in FIG. 14 is applied. When the primary cell is a TDD cell, M is 5 or more in the subframe n, and a PUSCH is transmitted in correspondence to the DCI format in a serving cell in which the uplink reference UL-DL configuration is 1 to 6, and the downlink reference UL-DL configuration is configured as any one of 2, 4, or 5, the equation (b-3) shown in FIG. 14 is applied. When the primary cell is an FDD cell, the equation (b-4) shown in FIG. 14 is applied.

When the primary cell is a TDD cell, and in the subframe n in the terminal device 2, when a PUCCH, or a PUSCH that is not adjusted on the basis of the detected DCI format 0/4, or the PUSCH that is adjusted on the basis of the DCI format 0/4 of the uplink reference UL-DL configuration 0 detected in association is transmitted, $B^{DL}_c$ is equal to $M_c$ (the equation (b-1) shown in FIG. 14). When the terminal device 2 does not receive a PDSCH in a subframe n−k, or a PDCCH/EPDCCH indicating the release of a downlink SPS, the terminal device 2 does not transmit the HARQ-ACK information on the PUSCH. Here, k belongs to K (k∈K).

When the primary cell is a TDD cell, in the PUSCH transmission of subframe n that is adjusted on the basis of the PDCCH/EPDCCH detected concomitantly with the DCI format 0/4 by using a TDD cell in which the uplink reference UL-DL configuration belongs to any one of {1, 2, 3, 4, 5, 6}, when $M_c$ is 4 or less, it is assumed that the terminal device 2 compares $W^{UL}_{DAI}$ and $M_c$, and substitutes the smaller value in $B^{DL}_c$ (the equation (b-2) shown in FIG. 14). When the terminal device 2 does not receive a PDSCH in the subframe n−k, or a PDCCH/EPDCCH indicating the release of a downlink SPS, the terminal device 2 does not transmit the HARQ-ACK on the PUSCH. Here, k belongs to K (k∈K).

When the primary cell is a TDD cell, in the PUSCH transmission in the subframe n that is adjusted on the basis of the PDCCH/EPDCCH detected concomitantly with the DCI format 0/4 by using a TDD cell in which the uplink reference UL-DL configuration belongs to any one of {1, 2, 3, 4, 5, 6}, when $M_c$ is more than 4, it is assumed that the terminal device 2 compares a value that is the sum of $W^{UL}_{DAI}$ and a value obtained by multiplying 4 with the fraction of the value obtained by dividing the difference between U and $W^{UL}_{DAI}$ with 4, the fraction being rounded towards positive infinity, and $M_c$, and substitutes the smaller value in $B^{DL}_c$ (the equation (b-3) shown in FIG. 14). Here, U indicates the maximum value of $U_c$ among all configured serving cells, and $U_c$ is the total number of the PDSCH received in the subframe n−k of the c-th serving cell specified by k that belongs to the set K, and the PDCCH/EPDCCH indicating the release of the downlink SPS. When $W^{UL}_{DAI}$ is 4 ($W^{UL}_{DAI}$=4), and the terminal device 2 receives, in the subframe n−k, neither the PDSCH, nor the PDCCH/EPDCCH indicating the release of a downlink SPS, the terminal device 2 does not transmit the HARQ-ACK on the PUSCH.

When the primary cell is an FDD cell, 1 is substituted in $B^{DL}_c$ (the equation (b-4) shown in FIG. 14). When the terminal device 2 does not receive a PDSCH in a subframe n−4, or a PDCCH/EPDCCH indicating the release of a downlink SPS, the terminal device 2 does not transmit the HARQ-ACK information on the PUSCH.

It should be noted that when the primary cell is an FDD cell, the equation (b-1) shown in FIG. 14 may be applied by assuming $M_c$=1. It should be noted that when the DAI is configured in a TDD secondary cell also when the primary cell is an FDD cell, and also when the primary cell is an FDD cell, the equation (b-2) shown in FIG. 14 may be applied.

It should be noted that the uplink reference UL-DL configuration in the above determination of $B^{DL}_c$ references either the configured first uplink reference UL-DL configuration or the second uplink reference UL-DL configuration. When both the first uplink reference UL-DL configuration and the second uplink reference UL-DL configuration are configured for the serving cell, the second uplink reference UL-DL configuration is referenced.

The determination of the arrangement of HARQ-ACK feedback bits when one or more TDD cells are configured for the terminal device 2 will be described below.

The HARQ-ACK for the PDSCH transmission corresponding to the PDCCH/EPDCCH, or for the PDCCH/EPDCCH indicating the release of a downlink SPS is allocated in the order of the value of the DAI included in the PDCCH/EPDCCH.

When the PUCCH format 3 is configured for the transmission of the HARQ-ACK, and the downlink reference UL-DL configuration belongs to any one of {1, 2, 3, 4, 5, 6}, the HARQ-ACK for the PDSCH transmission corresponding to the PDCCH/EPDCCH in a subframe n−k, or for the PDCCH/EPDCCH indicating the release of a downlink SPS is allocated to $o^{ACK}_{c, DAI(k)-1}$ when the transmission mode configured in the c-th serving cell supports one transport block, or when spatial HARQ-ACK bundling is assigned, and is assigned to $o^{ACK}_{c, 2DAI(k)-2}$ and $o^{ACK}_{c, 2DAI(k)-1}$ in the other cases. Here, DAI(k) is the value of the DAI in the DCI format 1A/1B/1D1/2/2A/2C/2D detected in the subframe n−k. $o^{ACK}_{c, 2DAI(k)-2}$ and $o^{ACK}_{c, 2DAI(k)-1}$ are the HARQ-ACK feedback to the codeword 0 and the codeword 1, respectively. When $N_{SPS}$ has a value that is more than 0 ($N_{SPS}>0$), the HARQ-ACK accompanying the PDSCH transmission that does not correspond to the PDCCH/EPDCCH is mapped to $o^{ACK}_{c, OACKc-1}$. An HARQ-ACK feedback bit for which no PDSCH transmission, and no PDCCH/EPDCCH indicating the release of a downlink SPS are detected is set as an NACK.

When the PUCCH format 3 is configured for the transmission of an HARQ-ACK, and the downlink reference UL-DL configuration is 0, the HARQ-ACK for the PDSCH transmission corresponding to the PDCCH/EPDCCH in the subframe n−k, or for the PDCCH/EPDCCH indicating the release of a downlink SPS is assigned to $o^{ACK}_{c, 0}$ when the transmission mode configured in the c-th serving cell supports one transport block, or when spatial HARQ-ACK bundling is applied, and is allocated to $o^{ACK}_{c, 0}$ and $O^{ACK}_{c, 1}$ in the other cases. $o^{ACK}_{c, 0}$ and $o^{ACK}_{c, 1}$ are the HARQ-ACK feedback for the codeword 0 and the codeword 1, respectively. An HARQ-ACK feedback bit for which no PDSCH transmission, and no PDCCH/EPDCCH indicating the release of a downlink SPS are detected is set as an NACK.

The determination of the arrangement of an HARQ-ACK feedback bit when two or more serving cells are configured in the terminal device 2, and when the frame structures of at least two serving cells is different will be described below.

Also in an FDD cell, the HARQ-ACK feedback bits are arranged by using the value of the DAI included in downlink grant.

An example of a case where a DAI field is configured in a serving cell only in the case of a TDD primary cell, and a table defining a downlink association set is configured individually in the TDD cell and in the FDD cell, will be described.

When the PUCCH format 3 is configured for the transmission of an HARQ-ACK, and the primary cell is a TDD cell, then in an FDD cell or a TDD cell in which the downlink reference UL-DL configuration belongs to any one of {1, 2, 3, 4, 5, 6}, the HARQ-ACK for the PDSCH transmission corresponding to the PDCCH/EPDCCH in a subframe n−k, or for the PDCCH/EPDCCH indicating the release of a downlink SPS is assigned to $o^{ACK}_{c, DAI(k)-1}$ when the transmission mode configured in the c-th serving cell supports one transport block, or when spatial HARQ-ACK bundling is applied, and is assigned to $o^{ACK}_{c, 2DAI(k)-2}$ and $o^{ACK}_{c, 2DAI(k)-1}$ in the other cases. Here, DAI(k) is the value of the DAI in the DCI format 1A/1B/1D1/2/2A/2C/2D detected in the subframe n−k. $o^{ACK}_{c, 2DAI(k)-2}$ and $o^{ACK}_{c, 2DAI(k)-1}$ are an HARQ-ACK feedback to the codeword 0 and the codeword 1, respectively. When $N_{SPS}$ has a value that is more than 0 ($N_{SPS}>0$), the HARQ-ACK accompanying the PDSCH transmission that does not correspond to the PDCCH/EPDCCH is mapped to $o^{ACK}_{c, OACKc-1}$. An HARQ-ACK feedback bit for which no PDSCH transmission, and no PDCCH/EPDCCH indicating the release of a downlink SPS are detected is set as an NACK.

When the PUCCH format 3 is configured for the transmission of an HARQ-ACK, in a TDD cell with the downlink reference UL-DL configuration as 0, the HARQ-ACK for the PDSCH transmission corresponding to the PDCCH/EPDCCH in the subframe n−k, or for the PDCCH/EPDCCH indicating the release of a downlink SPS is allocated to $o^{ACK}_{c, 0}$ when the transmission mode configured in the c-th serving cell supports one transport block, or when spatial HARQ-ACK bundling is applied, and is allocated to $o^{ACK}_{c, 0}$ and $o^{ACK}_{c, 1}$ in the other cases. $o^{ACK}_{c, 0}$ and $o^{ACK}_{c, 1}$ are the HARQ-ACK feedback to the codeword 0 and the codeword 1, respectively. An HARQ-ACK feedback bit for which no PDSCH transmission, and no PDCCH/EPDCCH indicating the release of a downlink SPS are detected is set as an NACK.

When the PUCCH format 3 is configured for the transmission of an HARQ-ACK, and the primary cell is an FDD cell, in a serving cell, the HARQ-ACK for the PDSCH transmission corresponding to the PDCCH/EPDCCH in a subframe n−4, or for the PDCCH/EPDCCH indicating the release of a downlink SPS is assigned to $o^{ACK}_{c, 0}$ when the transmission mode configured in the c-th serving cell supports one transport block, or when spatial HARQ-ACK bundling is applied, and is assigned to $o^{ACK}_{c, 0}$ and $o^{ACK}_{c, 1}$ in the other cases. $o^{ACK}_{c, 0}$ and $o^{ACK}_{c, 1}$ are the HARQ-ACK feedback to the codeword 0 and the codeword 1, respectively. An HARQ-ACK feedback bit for which no PDSCH transmission, and no PDCCH/EPDCCH indicating the release of a downlink SPS are detected is set as an NACK.

It should be noted that when a DAI field is configured for a TDD cell and an FDD secondary cell configured by a TDD primary cell, the HARQ-ACK feedback bits may be arranged by using the value of DAI.

An example of a case where a DAI field is configured in a serving cell only in the case of a TDD primary cell, and a table defining a downlink association set is configured in common in the TDD cell and in the FDD cell, will be described.

When the PUCCH format 3 is configured for the transmission of an HARQ-ACK, and the primary cell is a TDD cell, in a serving cell in which the downlink reference UL-DL configuration belongs to any one of {1, 2, 3, 4, 5, 6}, the HARQ-ACK for the PDSCH transmission corresponding to the PDCCH/EPDCCH in a subframe n−k, or for the PDCCH/EPDCCH indicating the release of a downlink SPS is assigned to $o^{ACK}_{c, DAI(k)-1}$ when the transmission mode configured in the c-th serving cell supports one transport block, or when spatial HARQ-ACK bundling is applied, and is assigned to $o^{ACK}_{c, 2DAI(k)-2}$ and $o^{ACK}_{c, 2DAI(k)-1}$ in the other cases. Here, DAI(k) is the value of the DAI in the DCI format 1A/1B/1D1/2/2A/2C/2D detected in the subframe n−k. $o^{ACK}_{c, 2DAI(k)-2}$ and $o^{ACK}_{c, 2DAI(k)-1}$ are the HARQ-ACK feedback to the codeword 0 and the codeword 1, respectively. When $N_{SPS}$ has a value that is more than 0 ($N_{SPS}>0$), the HARQ-ACK accompanying the PDSCH transmission that does not correspond to the PDCCH/EPDCCH is mapped to $O^{ACK}_{c, OACKc-1}$. An HARQ-ACK feedback bit for which no PDSCH transmission, and no PDCCH/EPDCCH indicating the release of a downlink SPS are detected is set as an NACK.

When the PUCCH format 3 is configured for the transmission of an HARQ-ACK, in a serving cell with the downlink reference UL-DL configuration as 0, the HARQ-ACK for the PDSCH transmission corresponding to the PDCCH/EPDCCH in the subframe n−k, or for the PDCCH/EPDCCH indicating the release of a downlink SPS is assigned to $o^{ACK}_{c,0}$ when the transmission mode configured in the c-th serving cell supports one transport block, or when spatial HARQ-ACK bundling is applied, and is assigned to $O^{ACK}_{c,0}$ and $O^{ACK}_{c,1}$ in the other cases. $o^{ACK}_{c,0}$ and $o^{ACK}_{c,1}$ are the HARQ-ACK feedback to the codeword 0 and the codeword 1, respectively. An HARQ-ACK feedback bit for which no PDSCH transmission, and no PDCCH/EPDCCH indicating the release of a downlink SPS are detected is set as an NACK.

When the PUCCH format 3 is configured for the transmission of an HARQ-ACK, and the primary cell is an FDD cell, in a serving cell, the HARQ-ACK for the PDSCH transmission corresponding to the PDCCH/EPDCCH in a subframe n−4, or for the PDCCH/EPDCCH indicating the release of a downlink SPS is assigned to $o^{ACK}_{c,0}$ when the transmission mode configured in the c-th serving cell supports one transport block, or when spatial HARQ-ACK bundling is applied, and is assigned to $o^{ACK}_{c,0}$ and $o^{ACK}_{c,1}$ in the other cases. $o^{ACK}_{c,0}$ and $o^{ACK}_{c,1}$ are the HARQ-ACK feedback to the codeword 0 and the codeword 1, respectively. An HARQ-ACK feedback bit for which no PDSCH transmission, and no PDCCH/EPDCCH indicating the release of a downlink SPS are detected is set as an NACK.

An example of arrangement of the HARQ-ACK bits of the terminal device 2 in which the PUCCH format 3 is configured will be described.

Regarding FDD-TDD in which the primary cell is a TDD cell and FDD cell in which cross carrier scheduling from another cell is not configured (self scheduling is configured), or when the downlink reference UL-DL configuration of an FDD cell or a TDD cell in which cross carrier scheduling from another cell is configured (self scheduling is not configured) belongs to any one of {1, 2, 3, 4, 5, 6}, the process described below is performed.

When the PUCCH format 3 is configured for the transmission of an HARQ-ACK, the HARQ-ACK for the PDSCH transmission corresponding to the PDCCH/EPDCCH in a subframe n−k, or for the PDCCH/EPDCCH indicating the release of a downlink SPS is assigned to $o^{ACK}_{c,DAI(k)-1}$ when the transmission mode configured in the c-th serving cell supports one transport block, or when spatial HARQ-ACK bundling is applied, and is assigned to $o^{ACK}_{c,2DAI(k)-2}$ and $o^{ACK}_{c,2DAI(k)-1}$ in the other cases. Here, DAI(k) is the value of the DAI in the DCI format 1A/1B/1D1/2/2A/2C/2D detected in the subframe n−k. $o^{ACK}_{c,2DAI(k)-2}$ and $o^{ACK}_{c,2DAI(k)-1}$ are the HARQ-ACK feedback to the codeword 0 and the codeword 1, respectively. When $N_{SPS}$ has a value that is more than 0 ($N_{SPS}$>0), the HARQ-ACK accompanying the PDSCH transmission that does not correspond to the PDCCH/EPDCCH is mapped to $o^{ACK}_{c,OACKc-1}$. An HARQ-ACK feedback bit for which no PDSCH transmission, and no PDCCH/EPDCCH indicating the release of a downlink SPS are detected is set as an NACK.

Regarding FDD-TDD in which the primary cell is a TDD cell, when the downlink reference UL-DL configuration of an FDD cell or a TDD cell in which cross carrier scheduling from another cell is configured (self scheduling is not configured) is 0, the process described below is performed.

When the PUCCH format 3 is configured for the transmission of an HARQ-ACK, the HARQ-ACK for the PDSCH transmission corresponding to the PDCCH/EPDCCH in the subframe n−k, or for the PDCCH/EPDCCH indicating the release of a downlink SPS is allocated to $o^{ACK}_{c,0}$ when the transmission mode configured in the c-th serving cell supports one transport block, or when spatial HARQ-ACK bundling is applied, and is allocated to $o^{ACK}_{c,0}$ and $o^{ACK}_{c,1}$ in the other cases. $o^{ACK}_{c,0}$ and $o^{ACK}_{c,1}$ are the HARQ-ACK feedback to the codeword 0 and the codeword 1, respectively. An HARQ-ACK feedback bit for which no PDSCH transmission, and no PDCCH/EPDCCH indicating the release of a downlink SPS are detected is set as an NACK.

It should be noted that when a DAI field is configured for a TDD cell and an FDD secondary cell configured by a TDD primary cell, the HARQ-ACK feedback bits may be arranged by using the value of a DAI.

It should be noted that the downlink reference UL-DL configuration in the determination of allocation of the HARQ-ACK feedback bits references either the configured first downlink reference UL-DL configuration or the second downlink reference UL-DL configuration. When both the first downlink reference UL-DL configuration and the second downlink reference UL-DL configuration are configured for the serving cell, the second downlink reference UL-DL configuration is referenced.

The above description was provided for the PUCCH format 3. However, in a case in which two or more serving cells are configured, and the UL-DL configurations of all serving cells are the same, when the HARQ-ACK feedback of two or more serving cells is transmitted in the PUCCH format 1b with channel selection when a DAI included in uplink grant for which the TDD UL-DL configuration belongs to any one of {1, 2, 3, 4, 6} and the $W^{UL}_{DAI}$ is 1 or 2 is received, and there is an instruction for PUSCH transmission in a serving cell, the arrangement of the HARQ-ACK feedback bits can have the same assignment to that in the format 3.

That is, when the TDD UL-DL configuration belongs to any one of {1, 2, 3, 4, 6}, in the PUSCH transmission that is adjusted on the basis of a PDCCH/EPDCCH detected concomitantly with the DCI format 0/4 with $W^{UL}_{DAI}$ as 1 or 2, $o^{ACK}_j$ is determined in the same manner as when the PUCCH format 3 is configured for the transmission of the HARQ-ACK. However, this excludes the case where spatial HARQ-ACK bundling is performed across several codewords of one downlink subframe for all serving cells in which the downlink transmission mode that supports a maximum of two transport blocks is configured when $W^{UL}_{DAI}$=2.

Furthermore, in a case in which two or more serving cells are configured, and the UL-DL configurations of at least two serving cells are different, when the HARQ-ACK feedback of two or more serving cells is transmitted in the PUCCH format 1b with channel selection, the configuration of the HARQ-ACK feedback bits is such that a DAI included in uplink grant for which the uplink reference UL-DL configuration belongs to any one of {1, 2, 3, 4, 6} and the $W^{UL}_{DAI}$ is 1 or 2 is received, and when there is an instruction for PUSCH transmission in a serving cell, the arrangement of the HARQ-ACK feedback bits can have the similar assignment to that in the format 3.

That is, when the uplink reference UL-DL configuration belongs to any one of {1, 2, 3, 4, 6}, in the PUSCH transmission that is adjusted on the basis of a PDCCH/EPDCCH detected concomitantly with the DCI format 0/4 with $W^{UL}_{DAI}$ as 1 or 2, $o^{ACK}_j$ is determined in the same manner as when the PUCCH format 3 is configured for the transmission of the HARQ-ACK. However, this excludes the case where spatial HARQ-ACK bundling is performed across several codewords of one downlink subframe for all serving cells in which the downlink transmission mode that supports a maximum of two transport blocks is configured when $W^{UL}_{DAI}=2$. Furthermore, the uplink reference UL-DL configuration is the uplink reference UL-DL configuration of a serving cell corresponding to the PUSCH transmission.

Furthermore, in a case in which two or more serving cells are configured and the frame structures of at least two serving cells are different, when the HARQ-ACK feedback of two or more serving cells is transmitted in the PUCCH format 1b with channel selection, upon the primary cell being TDD, the configuration of the HARQ-ACK feedback bits is such that a DAI included in uplink grant for which the uplink reference UL-DL configuration belongs to any one of $\{1, 2, 3, 4, 6\}$ and the $W^{UL}_{DAI}$ is 1 or 2 is received, and when there is an instruction for PUSCH transmission in a serving cell, the configuration of the HARQ-ACK feedback bits can have similar assignment to that in the format 3.

That is, when the primary cell is a TDD cell, and the uplink reference UL-DL configuration belongs to any one of $\{1, 2, 3, 4, 6\}$, in the PUSCH transmission that is adjusted on the basis of a PDCCH/EPDCCH detected concomitantly with the DCI format 0/4 with $W^{UL}_{DAI}$ as 1 or 2, $O^{ACK}_j$ is determined in the same manner as when the PUCCH format 3 is configured for the transmission of the HARQ-ACK. However, this excludes the case where spatial HARQ-ACK bundling is performed across several codewords from among one downlink subframe for all serving cells in which the downlink transmission mode that supports a maximum of two transport blocks is configured when $W^{UL}_{DAI}=2$. Furthermore, the uplink reference UL-DL configuration is the uplink reference UL-DL configuration of a serving cell corresponding to the PUSCH transmission.

Furthermore, in case in which two or more serving cells are configured, and the frame structures of at least two serving cells are different, when the HARQ-ACK feedback of two or more serving cells is transmitted in a PUCCH format 1b with channel selection, in a TDD cell or an FDD secondary cell aggregated with a TDD primary cell, a DAI included in uplink grant for which the uplink reference UL-DL configuration belongs to any one of $\{1, 2, 3, 4, 6\}$ and the $W^{UL}_{DAI}$ is 1 or 2 is received, and when there is an instruction for PUSCH transmission in a serving cell, the arrangement of the HARQ-ACK feedback bits can have the similar allocation to that in format 3.

That is, in a TDD cell or an FDD secondary cell aggregated with or a TDD primary cell, when the uplink reference UL-DL configuration belongs to any one of $\{1, 2, 3, 4, 6\}$, in the PUSCH transmission that is adjusted on the basis of a PDCCH/EPDCCH detected concomitantly with the DCI format 0/4 with $W^{UL}_{DAI}$ as 1 or 2, $o^{ACK}_j$ is determined in the same manner as when the PUCCH format 3 is configured for the transmission of the HARQ-ACK. However, this excludes the case where spatial HARQ-ACK bundling is performed across several codewords from among one downlink subframe for all serving cells in which the downlink transmission mode that supports a maximum of two transport blocks is configured when $W^{UL}_{DAI}=2$. Furthermore, the uplink reference UL-DL configuration is the uplink reference UL-DL configuration of a serving cell corresponding to the PUSCH transmission.

Furthermore, in a case in which two or more serving cells are configured, and the frame structures of at least two serving cells are different (in the case of TDD-FDD CA), when the HARQ-ACK feedback of two or more serving cells is transmitted in a PUCCH format 1b with channel selection, upon the primary cell being TDD, the configuration of the HARQ-ACK feedback bits is such that a DAI included in uplink grant for which the uplink reference UL-DL configuration belongs to any one of $\{1, 2, 3, 4, 6\}$ and the $W^{UL}_{DAI}$ is 1 or 2 is received, and when there is an instruction for PUSCH transmission in a serving cell, the arrangement of the HARQ-ACK feedback bits can have the similar assignment to that in the format 3.

That is, when the primary cell is a TDD cell, and the uplink reference UL-DL configuration belongs to any one of $\{1, 2, 3, 4, 6\}$, in the PUSCH transmission that is adjusted on the basis of a PDCCH/EPDCCH detected concomitantly with the DCI format 0/4 with $W^{UL}_{DAI}$ as 1 or 2, $o^{ACK}_j$ is determined in the same manner as when the PUCCH format 3 is configured for the transmission of the HARQ-ACK. However, this excludes the case where spatial HARQ-ACK bundling is performed across several codewords of one downlink subframe for all serving cells in which the downlink transmission mode that supports a maximum of two transport blocks is configured when $W^{UL}_{DAI}=2$. Furthermore, the uplink reference UL-DL configuration is the uplink reference UL-DL configuration of a serving cell corresponding to the PUSCH transmission.

An example of the configuration of the HARQ-ACK feedback bits when two or more serving cells are configured, and the UL-DL configurations of at least two serving cells are different, or when the HARQ-ACK feedback of two or more serving cells is transmitted in the PUCCH format 1b with channel selection in the case of TDD-FDD CA of TDD primary cells, will be described.

When a DAI included in uplink grant for which the uplink reference UL-DL configuration belongs to any one of $\{1, 2, 3, 4, 6\}$ and $W^{UL}_{DAI}$ is either 3 or 4 is received, and there is an instruction for PUSCH transmission, the HARQ-ACK bit that is determined by replacing the value of M with UL DAI ($W^{UL}_{DAI}$) is substituted.

That is, when the downlink reference UL-DL configuration of each serving cell belongs to any one of $\{0, 1, 2, 3, 4, 6\}$, and the transmission of the HARQ-ACK for two configured serving cells is configured by the PUCCH format 1b with channel selection, then for the HARQ-ACK feedback bits $o^{ACK}_0, o^{ACK}_1, \ldots, o^{ACK}_{O_{ACK}-1}$, when the uplink reference UL-DL configuration belongs to any one of $\{0, 1, 2, 3, 4, 6\}$, in the PUSCH transmission that is adjusted on the basis of the PDCCH/EPDCCH detected concomitantly with the DCI format 0/4 with $W^{UL}_{DAI}$ as 3 or 4, $o^{ACK}_j=o(j)$. Here, j is 0 or more and 3 or less, and o(j) is an RM code input bit. o(j) is determined on the basis of the combination of the HARQ-ACK of the first serving cell and the second serving cell, and on the basis of the number of Ms. Here, the value of M is substituted in $W^{UL}_{DAI}$. Here, the uplink reference UL-DL configuration is the uplink UL-DL configuration of a serving cell corresponding to the PUSCH transmission. When the terminal device 2 does not receive a PDSCH in a subframe n−k, or a PDCCH/EPDCCH indicating the release of a downlink SPS, the terminal device 2 does not transmit the HARQ-ACK. Here, k is an element of a set K (downlink association set) (k∈K), and $W^{UL}_{DAI}=0$.

An example of the configuration of the HARQ-ACK feedback bits when the HARQ-ACK feedback is transmitted in the PUCCH format 1b with channel selection in the case of TDD-FDD CA of TDD primary cells will be described.

When a DAI included in an uplink grant for which the uplink reference UL-DL configuration of a TDD cell belongs to any one of {1, 2, 3, 4, 6} and $W^{UL}_{DAI}$ is either 3 or 4 is received, and there is an instruction for PUSCH transmission in the TDD cell, or when a DAI included in uplink grant for which the $W^{UL}_{DAI}$ of the FDD cell is either 3 or 4 is received, and there is an instruction for PUSCH transmission in the FDD cell, the HARQ-ACK bit that is determined by replacing the value of M with UL DAI ($W^{UL}_{DAI}$) is substituted.

That is, when the downlink reference UL-DL configuration of each serving cell belongs to any one of {0, 1, 2, 3, 4, 6}, and the transmission of the HARQ-ACK for two configured serving cells is configured in the PUCCH format 1b with channel selection, then for the HARQ-ACK feedback bits $o^{ACK}_0, o^{ACK}_1, \ldots, o^{ACK}_{O_{ACK}-1}$, when the uplink reference UL-DL configuration belongs to any one of {0, 1, 2, 3, 4, 6}, then in the PUSCH transmission that is adjusted on the basis of the PDCCH/EPDCCH detected concomitantly with the DCI format 0/4 with $W^{UL}_{DAI}$ as 3 or 4, $o^{ACK}_j = o(j)$. Here, j is 0 or more and 3 or less, and o(j) is an RM code input bit. o(j) is determined on the basis of the combination of the HARQ-ACK of the first serving cell and the second serving cell, and on the basis of the number of Ms. Here, the value of M is substituted in $W^{UL}_{DAI}$. Here, the uplink reference UL-DL configuration is the uplink UL-DL configuration of a serving cell corresponding to the PUSCH transmission. When the terminal device 2 does not receive a PDSCH in subframe n−k, or a PDCCH/EPDCCH indicating the release of a downlink SPS, the terminal device 2 does not transmit the HARQ-ACK. Here, k is an element of a set K (downlink association set) (k∈K), and $W^{UL}_{DAI} = 0$.

It should be noted that when cross carrier scheduling is configured for an FDD cell, and the TDD UL-DL configuration of the TDD primary cell is 0, the operation described above may be performed without substituting the value of M in $W^{UL}_{DAI}$.

An example of the configuration of the HARQ-ACK feedback bits when two or more serving cells are configured, and the UL-DL configurations of at least two serving cells are different, or when the HARQ-ACK feedback of two or more serving cells is transmitted in the PUCCH format 1b with channel selection in the case of TDD-FDD CA of TDD primary cells will be described.

When a UL DAI is not acquired, the HARQ-ACK bit is determined on the basis of the value of M. That is, when the UL DAI is not acquired, the HARQ-ACK bit is determined in consideration of all subframes in which the HARQ-ACK bits can occur.

That is, when the downlink reference UL-DL configuration of each serving cell belongs to any one of {0, 1, 2, 3, 4, 6}, and the transmission of the HARQ-ACK for two configured serving cells is configured by the PUCCH format 1b with channel selection, then for the HARQ-ACK feedback bits $o^{ACK}_0, o^{ACK}_1, \ldots, o^{ACK}_{O_{ACK}-1}$, when the uplink reference UL-DL configuration belongs to any one of {0, 1, 2, 3, 4, 6}, then in the PUSCH transmission (PUSCH transmission for which re-transmission is instructed by the PHICH) that is not adjusted on the basis of the PDCCH/EPDCCH detected along with the DCI format 0/4 (uplink grant), $o^{ACK}_j = \text{HARQ-ACK}(j)$ in the prescribed subframe n with M as 1 or 2. Here, j is 0 or more and A−1 or less. A is the number of HARQ-ACK (j), and is the total number of transport blocks corresponding to the HARQ-ACK to be transmitted. Here, the uplink reference UL-DL configuration is the uplink UL-DL configuration of a serving cell corresponding to the PUSCH transmission. When the terminal device 2 does not receive a PDSCH in a subframe n−k, or a PDCCH/EPDCCH indicating the release of a downlink SPS, the terminal device 2 does not transmit the HARQ-ACK. Here, k is an element of a set K (a downlink association set) (k∈K). When the uplink reference UL-DL configuration belongs to any one of {0, 1, 2, 3, 4, 6}, then in the PUSCH transmission (PUSCH transmission for which re-transmission is instructed by the PHICH) that is not adjusted on the basis of the PDCCH/EPDCCH detected along with the DCI format 0/4 (uplink grant), $o^{ACK}_j = o(j)$ in the prescribed subframe n with M as 3 or 4. Here, j is 0 or more and 3 or less, and o(j) is an RM code input bit. o(j) is determined on the basis of the combination of the HARQ-ACK of the first serving cell and the second serving cell, and on the basis of the number of Ms. Here, the uplink reference UL-DL configuration is the uplink UL-DL configuration of a serving cell corresponding to the PUSCH transmission. When the terminal device 2 does not receive a PDSCH in the subframe n−k, or a PDCCH/EPDCCH indicating the release of a downlink SPS, the terminal device 2 does not transmit the HARQ-ACK. Here, k is an element of a set K (downlink association set) (k∈K), and $W^{UL}_{DAI} = 0$.

An example of the configuration of the HARQ-ACK feedback bits when the HARQ-ACK feedback of two or more serving cells is transmitted in the PUCCH format 1b with channel selection in the case of TDD-FDD CA of TDD primary cells will be described.

When a UL DAI is not acquired, the HARQ-ACK bit is determined on the basis of the value of M.

That is, when the downlink reference UL-DL configuration of each serving cell belongs to any one of {0, 1, 2, 3, 4, 6}, and the transmission of the HARQ-ACK for two configured serving cells is configured by the PUCCH format 1b with channel selection, then for the HARQ-ACK feedback bits $o^{ACK}_0, o^{ACK}_1, \ldots, o^{ACK}_{O_{ACK}-1}$, when the uplink reference UL-DL configuration of a TDD cell belongs to any one of {0, 1, 2, 3, 4, 6}, or the cell is an FDD cell, then in the PUSCH transmission (PUSCH transmission for which re-transmission is instructed by the PHICH) that is not adjusted on the basis of the PDCCH/EPDCCH detected along with the DCI format 0/4 (the uplink grant), $o^{ACK}_j = \text{HARQ-ACK}(j)$ in the prescribed subframe n with M as 1 or 2. Here, j is 0 or more, and A−1 or less. A is the number of HARQ-ACK (j), and is the total number of transport blocks corresponding to the HARQ-ACK to be transmitted. Here, the uplink reference UL-DL configuration is the uplink UL-DL configuration of a serving cell corresponding to the PUSCH transmission. When the terminal device 2 does not receive a PDSCH in the subframe n−k, or a PDCCH/EPDCCH indicating the release of a downlink SPS, the terminal device 2 does not transmit the HARQ-ACK. Here, k is an element of a set K (downlink association set) (k∈K). When the uplink reference UL-DL configuration of a TDD cell belongs to any one of {0, 1, 2, 3, 4, 6}, or the cell is an FDD cell, then in the PUSCH transmission (the PUSCH transmission for which re-transmission is instructed by the PHICH) that is not adjusted on the basis of the PDCCH/EPDCCH detected along with the DCI format 0/4 (uplink grant), $o^{ACK}_j = o(j)$ in the prescribed subframe n with M as 3 or 4. Here, j is 0 or more and 3 or less, and o(j) is an RM code input bit. o(j) is determined on the basis of the combination of the HARQ-ACK of the first serving cell and the second serving cell, and on the basis of the number of Ms. Here, the uplink reference UL-DL configuration is the uplink UL-DL configuration of a serving cell corresponding to the PUSCH transmission. When the terminal device 2 does not receive a PDSCH in the subframe n−k, or a PDCCH/EPDCCH indicating the release of a downlink SPS, the terminal device 2 does not transmit the HARQ-ACK. Here, k is an element of a set K (downlink association set) (k∈K), and $W^{UL}_{DAI}=0$.

It should be noted that when transmission is performed with the PUCCH format 1b with channel selection, the uplink reference UL-DL configuration in the configuration of the HARQ-ACK feedback bits references either one of the first uplink reference UL-DL configuration or the second uplink reference UL-DL configuration configured for a serving cell. When both the first uplink reference UL-DL configuration and the second uplink reference UL-DL configuration are configured for the serving cell, the second uplink reference UL-DL configuration is referenced.

It should be noted that when transmission is performed with the PUCCH format 1b with channel selection, the downlink reference UL-DL configuration in the configuration of the HARQ-ACK feedback bits references either one of the first uplink reference UL-DL configuration or the second downlink reference UL-DL configuration configured for a serving cell. When both the first downlink reference UL-DL configuration and the second downlink reference UL-DL configuration are configured for the serving cell, the second downlink reference UL-DL configuration is referenced.

The determination of the number of HARQ-ACK bits transmitted in a subframe n in TDD-FDD CA of an FDD primary cell (carrier aggregation in which two or more serving cells are configured, the frame structure type of two serving cells is different, and the primary cell is an FDD cell) will be described below.

In the TDD-FDD CA of an FDD primary cell, basically, the HARQ-ACK bits for the configured serving cells is secured. However, the HARQ-ACK bits are not secured in a subframe for which it is known beforehand that the PDSCH transmission will not occur (for example, uplink subframe). That is, the number of serving cells in which the HARQ-ACK is transmitted in the subframe n in the TDD-FDD CA of an FDD primary cell is the total number of the serving cells in which the subframe n−4 is either a downlink subframe in which the PDSCH can be transmitted, or a special subframe in which the PDSCH can be transmitted. In other words, the number of serving cells in which the HARQ-ACK is transmitted in the subframe n in the TDD-FDD CA of an FDD primary cell does not include the serving cells in which the subframe n−4 is an uplink subframe.

An example of the calculation of the number of serving cells in which HARQ-ACK is fed back will be described.

The uplink subframes, downlink subframes, and special subframes in the serving cell are determined on the basis of the second downlink reference UL-DL configuration.

That is, when more than one serving cell is configured for the terminal device 2, the frame structure types of any two configured serving cells are different, and the primary cell has the frame structure type 1, then in the terminal device 2 in which HARQ-ACK is transmitted in the PUCCH format 1b with channel selection or the PUCCH format 3, the terminal device 2 determines the number o of the HARQ-ACK bits of the subframe n on the basis of the number of configured serving cells in which the subframe n−4 is either a downlink subframe or a special subframe (a special subframe of a TDD serving cell with a normal CP and a special subframe configuration of 1, 2, 3, 4, 6, 7, 8, or 9, or a special subframe of a TDD serving cell with an extended CP and a special subframe configuration of 1, 2, 3, 5, 6, or 7) in accordance with the second downlink reference UL-DL configuration of each serving cell, and also on the basis of the downlink transmission mode configured in each serving cell. The terminal device 2 uses two HARQ-ACK bits in a serving cell in which a transmission mode that corresponds to (supports) a maximum of two transport blocks is configured, and uses one HARQ-ACK bit in the other serving cells.

It should be noted that in the operation described above, when the second downlink reference UL-DL configuration is not configured (applied, used) for a serving cell, the TDD UL-DL configuration of the serving cell is referenced. A case in which the second downlink reference UL-DL configuration is configured (applied, used) for a secondary serving cell in the TDD-FDD CA of the FDD primary cell is, for example, the case when the parameter (eimta-HarqReferenceConfig) for referencing the HARQ-ACK transmission timing of the eIMTA from a higher layer is configured. In an FDD cell in which the TDD UL-DL configuration is not configured (applied, used), n−4 is considered as the downlink subframe.

The downlink reference UL-DL configuration that is configured in the TDD-FDD CA of an FDD primary cell is used only for indicating that a certain subframe is any one of a downlink subframe, an uplink subframe, or a special subframe, and is not used for determination of the transmission timing of the HARQ-ACK. That is, the transmission timing of the HARQ-ACK in the terminal device 2 is fixed regardless of the downlink reference UL-DL configuration that is configured in the TDD-FDD CA of an FDD primary cell. That is, the reception timing of the HARQ-ACK in the base station device 1 is fixed regardless of the downlink reference UL-DL configuration that is configured in the TDD-FDD CA of an FDD primary cell.

An example of the calculation of the number of serving cells that feed back an HARQ-ACK will be described.

The uplink subframes/downlink subframes/special subframes in a TDD serving cell are determined on the basis of a parameter used for referencing the HARQ-ACK transmission timing of the eIMTA, or the TDD UL-DL configuration. The HARQ-ACK bits for an FDD serving cell are surely secured.

When more than one serving cell is configured for the terminal device 2, the frame structure types of any two configured serving cells are different, and the primary cell has the frame structure type 1, then in the terminal device 2 in which an HARQ-ACK is transmitted in the PUCCH format 1b with channel selection or the PUCCH format 3, the terminal device 2 determines the number o of the HARQ-ACK bits of the subframe n on the basis of the number of configured TDD serving cells or configured FDD serving cells in which the subframe n−4 is either a downlink subframe or a special subframe (a special subframe of a TDD serving cell with a normal CP and a special subframe configuration of 1, 2, 3, 4, 6, 7, 8, or 9, or a special subframe of a TDD serving cell with an extended CP and a special subframe configuration of 1, 2, 3, 5, 6, or 7), and also on the basis of the downlink transmission mode configured in each serving cell. The terminal device 2 uses two HARQ-ACK bits in a serving cell in which a transmission mode that corresponds to (supports) a maximum of two transport blocks is configured, and uses one HARQ-ACK bit in the other serving cells. Here, in a TDD serving cell, when a parameter (eimta-HarqReferenceConfig) for referencing the HARQ-ACK transmission timing of the eIMTA from a higher layer is configured for the TDD serving cell, the subframes are determined from the parameter, and in other cases, the subframes are determined from the UL-DL configuration of the serving cell.

As a result, it is possible to reduce the overheads of an HARQ-ACK bit.

It should be noted that from the above description of the HARQ-ACK reporting procedure, in the case of FDD-TDD CA in which the primary cell is a TDD cell, if in an FDD serving c in which self scheduling is configured, the downlink reference UL-DL configuration of the serving cell c belongs to {2, 3, 4}, then it can also be said that the number of downlink subframes or special subframes $B^{DL}_c$ necessary for the feedback of the HARQ-ACK bits in the terminal device 2 is determined by the same operation as when the downlink reference UL-DL configuration of a serving cell is 5 when carrier aggregation is performed for two TDD serving cells with a different TDD UL/DL configuration.

That is, for a serving cell with the frame structure type 1 with the frame structure type 2 applied to a primary cell in the FDD-TDD carrier aggregation, when the monitoring of the PDCCH or the EPDCCH of another serving cell for scheduling of the serving cell is not configured, and also when the downlink reference UL-DL configuration of the serving cell belongs to {2, 3, 4}, the $B^{DL}_c$ is determined in the same manner as when the uplink reference UL-DL configuration of a serving cell is 5 when carrier aggregation is performed for two TDD serving cells with a different TDD UL/DL configuration.

It should be noted that from the above description of the HARQ-ACK reporting procedure, in the case of FDD-TDD CA in which the primary cell is a TDD cell, it can also be said that the number of downlink subframes or special subframes $B^{DL}_c$ necessary for the feedback of the HARQ-ACK bits in the terminal device 2 in the FDD serving cell c is determined by the same operation as when the uplink reference UL-DL configuration of a serving cell is any one of {1, 2, 3, 4, 5, 6} when carrier aggregation is performed for two TDD serving cells with a different TDD UL/DL configuration.

That is, for a serving cell with the frame structure type 1 with the frame structure type 2 applied to a primary cell in the FDD-TDD carrier aggregation, when the PUCCH format 3 is configured for the transmission of an HARQ-ACK, then the $B^{DL}_c$ is determined in the same manner as when the uplink reference UL-DL configuration of a serving cell is any one of {1, 2, 3, 4, 5, 6} when carrier aggregation is performed on two TDD serving cells with a different TDD UL/DL configuration.

It should be noted that from the above description of the HARQ-ACK reporting procedure, in the case of FDD-TDD CA in which the primary cell is a TDD cell, it can also be said that the HARQ-ACK feedback bit $o^{ACK}_j$ is determined in the same manner as when the uplink reference UL-DL configuration of a serving cell is any one of {1, 2, 3, 4, 5, 6} when carrier aggregation is performed on two TDD serving cells with a different TDD UL/DL configuration.

That is, for a serving cell with the frame structure type 1 with the frame structure type 2 applied to a primary cell in the FDD-TDD carrier aggregation, when the downlink reference UL-DL configuration of each of the serving cells belongs to {0, 1, 2, 3, 4, 6}, and the PUCCH format 1b with channel selection is configured for the transmission of an HARQ-ACK, $o^{ACK}_j$ is determined in the same manner as when the uplink reference UL-DL configuration of a serving cell is any one of {1, 2, 3, 4, 6} when carrier aggregation is performed on two TDD serving cells with a different TDD UL/DL configuration.

It should be noted that from the above description of the HARQ-ACK reporting procedure, in the case of FDD-TDD CA in which the primary cell is a TDD cell, it can also be said that the HARQ-ACK for the PDSCH corresponding to the PDCCH or the EPDCCH in the subframe n−k in serving cells with all the downlink reference UL-DL configurations is associated in the same manner as when the downlink reference UL-DL configuration of a serving cell is any one of {1, 2, 3, 4, 5, 6} when carrier aggregation is performed on two TDD serving cells with a different TDD UL/DL configuration. It should be noted that the above operation of associating the HARQ-ACK may be restricted to cases when self scheduling has been configured.

That is, for a serving cell with the frame structure type 1 with the frame structure type 2 applied to a primary cell in the FDD-TDD carrier aggregation, when the downlink reference UL-DL configuration of the serving cell is 0, then the HARQ-ACK for the PDSCH corresponding to the PDCCH or the EPDCCH in the subframe n−k is associated in the same manner as when the downlink reference UL-DL configuration of a serving cell is any one of {1, 2, 3, 4, 5, 6} when carrier aggregation is performed on two TDD serving cells with a different TDD UL/DL configuration.

That is, for a serving cell with the frame structure type 1 with the frame structure type 2 applied to a primary cell in the FDD-TDD carrier aggregation, when the monitoring of the PDCCH or the EPDCCH in another serving cell for scheduling of the serving cell is configured for the terminal device 2, and when the downlink reference UL-DL configuration of the serving cell is 0, then the HARQ-ACK for the PDSCH corresponding to the PDCCH or the EPDCCH in the subframe n−k is associated in the same manner as when the downlink reference UL-DL configuration of a serving cell is any one of {1, 2, 3, 4, 5, 6} when carrier aggregation is performed on two TDD serving cells with a different TDD UL/DL configuration.

Using the method of configuring the HARQ-ACK feedback bits described above, it is possible to configure a plurality of HARQ-ACK feedback bits in an FDD cell as well.

A coefficient $n_{HARQ}$ associated with the HARQ-ACK used in the calculation of the transmit power, power headroom (PHR), and the like of the PUSCH and the PUCCH including the HARQ-ACK in the TDD-FDD CA will be described below.

$n_{HARQ}$ is information associated with a transmission bit of the HARQ-ACK in a subframe used to transmit the HARQ-ACK bit, and is used in, for example, calculation of transmit power control of a PUCCH, and the PHR for a type 2 report.

$n_{HARQ}$ is calculated by using the value of a DL DAI (downlink DAI, DAI in DCI related to downlink grant, and DAI in DCI for scheduling a PDSCH). When a DAI is not included in the DCI of the downlink grant, $n_{HARQ}$ is calculated without using the DL DAI. A case where the DAI is not included in the DCI of the downlink grant is, for example, a primary cell is an FDD cell. When the DAI is included in the DCI of the downlink grant, but the value of the DAI is not used, $n_{HARQ}$ is calculated without using the DL DAI. A case where the DAI is included in the DCI of the downlink grant, but the value of the DAI is not used is, for example, a UL/DL configuration (downlink reference UL/DL configuration) in which the number of elements M of the downlink association set is 1 or less is configured in a serving cell.

It should be noted that even when the UL/DL configuration (downlink reference UL/DL configuration) in which the number of elements M of the downlink association set is 1 or less is configured in the serving cell, the value of the DL DAI may be applied. In such a case, the value of the DL DAI included in the DCI related to the downlink grant is announced as 1.

Under a condition of TDD-FDD CA, the DL DAI is applied to an FDD cell as well.

A case where the DL DAI is applied even to an FDD cell in the TDD-FDD CA is, for example, a situation where the primary cell is a TDD cell and the secondary cell is an FDD cell, and cross carrier scheduling is not configured from the TDD cell to the FDD cell. Cases where cross carrier scheduling is not configured from the TDD cell to the FDD cell includes situations where self scheduling is configured for an FDD cell, and cross carrier scheduling is configured for an FDD cell from an FDD cell. It should be noted that when cross carrier scheduling is configured for an FDD cell from an FDD cell, and when the downlink reference UL/DL configuration 0 is configured in the scheduled FDD cell, the DL DAI does not have to be applied.

When cross carrier scheduling is configured for at least an FDD cell from a TDD cell, and the downlink reference UL/DL configuration 0 is configured in the FDD cell, the DL DAI may not be applied even to an FDD cell in the TDD-FDD CA. When the downlink reference UL/DL configuration 0 is configured in an FDD cell, the number of elements M of the downlink association set is one or less, and therefore, the DL DAI does not have to be applied.

Even in an FDD serving cell to which the DL DAI is applied, $n_{HARQ}$ is calculated by using the DL DAI. When $n_{HARQ}$ is calculated by using the DL DAI, the calculation of $n_{HARQ}$ is performed, for example, by using an equation (2) shown in FIG. 16. However, in a serving cell in which the DL DAI is not applied, $n_{HARQ}$ is calculated without using the DL DAI. When $n_{HARQ}$ is calculated without using the DL DAI, the calculation of $n_{HARQ}$ is performed, for example, by using an equation (1) shown in FIG. 16, or the calculation of $n_{HARQ}$ is performed by using the equation (2) shown in FIG. 16 in which the number of subframes ($U_{DAI, c}$) for receiving the PDSCH or the PDCCH/EPDCCH indicating the SPS release is substituted in the DL DAI ($V^{DL}_{DAI, c}$), or the number of the HARQ-ACK bits transmitted to $n_{HARQ}$ is substituted.

That is, a terminal device 2 configured to communicate with the base station device 1 by using an FDD cell and a TDD cell includes a reception unit configured to perform reception on a PDCCH that is transmitted in a DCI format, and when the primary cell is configured as a TDD cell for the terminal device 2, a DAI indicating a cumulative count of the PDSCH transmission in up to the current subframe in prescribed subframes, or of the PDCCH or EPDCCH indicating the release of downlink semi-persistent scheduling is received with being included in the DCI format, and the transmit power of the PUCCH for transmitting an HARQ-ACK corresponding to the PDSCH transmission or the PDCCH or EPDCCH indicating the release of downlink semi-persistent scheduling is determined on the basis of the value of the DAI.

An example of the value of $n_{HARQ}$ will be described below.

When more than one serving cell is configured for the terminal device 2, or when one serving cell is configured for the terminal device 2, and transmission using the PUCCH format 3 is configured, the value of $n_{HARQ}$ is applied by using an example of the calculation shown below, and in other cases, $n_{HARQ}$ is the number of HARQ-ACK bits transmitted in a subframe.

An example of calculation of the value of $n_{HARQ}$ is described below.

In TDD-FDD CA (TDD-FDD) and a TDD primary cell, when an FDD cell has any one of all the downlink reference UL/DL configurations, the equation (2) shown in FIG. 16 that uses the DL DAI is applied. In the TDD-FDD CA (TDD-FDD) and the TDD primary cell, when a TDD cell has a TDD UL/DL configuration or the downlink reference UL/DL configuration of 1 to 6, the equation (2) shown in FIG. 16 that uses the DL DAI is applied, and when a TDD cell has a TDD UL/DL configuration or the downlink reference UL/DL configuration of 0, the equation (2) shown in FIG. 16 in which the number of reception subframes of the PDSCH or the PDCCH/EPDCCH indicating the SPS release is substituted in the DL DAI is applied.

In TDD, when more than one serving cell is configured for the terminal device 2, and at least two serving cells have a different UL/DL configuration, or when eIMTAConfig-r12 (configuration parameter related to tddModeAConfig-r12, eIMTA configuration) is configured for at least one serving cell, or in the case of TDD-FDD (TDD-FDD CA, TDD-FDD carrier aggregation), and primary cell frame structure 2 (TDD PCell, the primary cell is a TDD cell), the operation described below is performed.

In the PUCCH format 3, or in two configured serving cells, and in the PUCCH format 1b with channel selection (PUCCH format 1b in which channel selection is performed), and when M is 2 or less (the number of elements of a downlink association set is 2 or less), the equation (2) shown in FIG. 16 is used for $n_{HARQ}$. Here, $V^{DL}_{DAI, c}$ is $V^{DL}_{DAI}$ in a serving cell c, $U_{DAI, c}$ is $U_{DAI}$ in the serving cell c, and $n^{ACK}_c$ is the number of HARQ-ACK bits corresponding to the configured DL transmission mode (TM) in the serving cell c. When spatial HARQ-ACK information bundling (spatial HARQ-ACK bundling) is applied, $n^{ACK}_c=1$ ($n^{ACK}_c$ is equal to 1), and $N^{received}_{k, c}$ is the number of PDCCHs/EPDCCHs received in a subframe n−k in the serving cell c, or the number of PDSCHs that do not have a corresponding PDCCH/EPDCCH, and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for the scheduling of a serving cell is configured in the terminal device 2 in TDD-FDD, and is defined by FIG. 9 when monitoring of the PDCCH/EPDCCH in another serving cell for the scheduling of a serving cell is not configured for the terminal device 2 in TDD-FDD. When spatial HARQ-ACK information bundling (spatial HARQ-ACK bundling) is not applied, $N^{received}_{k, c}$ is the number of transport blocks received in the subframe n−k in the serving cell c, or the number of PDCCHs/EPDCCHs indicating the release of an SPS (SPS release PDCCH/EPDCCH), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for the scheduling of a serving cell is configured for the terminal device 2 in TDD-FDD, and is defined by FIG. 9 when monitoring of the PDCCH/EPDCCH in another serving cell for the scheduling of a serving cell is not configured for the terminal device 2 in TDD-FDD. When no transport blocks or PDCCH/EPDCCH indicating the release of an SPS (SPS release PDCCHs/EPDCCHs) are detected in the subframe n−k in the serving cell c, $V^{DL}_{DAI, c}$ is 0 ($V^{DL}_{DAI, c}=0$), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for the scheduling of a serving cell is configured for the terminal device 2 in TDD-FDD, and is defined by FIG. 9 when monitoring of the PDCCH/EPDCCH in another serving cell for the scheduling of a serving cell is not configured for the terminal device 2 in TDD-FDD. In the serving cell c, except in the case when the serving cell c is an FDD cell, when the downlink reference UL/DL configuration for the serving cell c is TDD UL/DL configuration 0, $U_{DAI,\,c}$ is configured (substituted, set) in $V^{DL}_{DAI,\,c}$ ($V^{DL}_{DAI,\,c} = U_{DAI,\,c}$).

An example of calculation of the value of $n_{HARQ}$ is described below.

In the case of TDD-FDD CA (TDD-FDD) and a TDD primary cell, when an FDD cell has any one of all the downlink reference UL/DL configurations, the equation (2) shown in FIG. 16 that uses the DL DAI is applied. In the case of TDD-FDD CA (TDD-FDD) and a TDD primary cell, when a TDD cell has a TDD UL/DL configuration or the downlink reference UL/DL configuration is configured as 1 to 6, the equation (2) shown in FIG. 16 that uses the DL DAI is applied, and when a TDD cell has a TDD UL/DL configuration or the downlink reference UL/DL configuration is configured as 0, the equation (2) shown in FIG. 16 in which the number of reception subframes of the PDSCH or the PDCCH/EPDCCH indicating the SPS release is substituted in the DL DAI is applied.

In TDD, when more than one serving cell is configured in the terminal device 2, and at least two serving cells have a different UL/DL configuration, or when eIMTAConfig-r12 (tddModeAConfig-r12, a configuration parameter related to an eIMTA configuration) is configured for at least one serving cell, or in the case of TDD-FDD (TDD-FDD CA, TDD-FDD carrier aggregation), and the primary cell frame structure 2 (TDD PCell, the primary cell is a TDD cell), the operation described below is performed.

In the PUCCH format 3, or in two configured serving cells, and in the PUCCH format 1b with channel selection (PUCCH format 1b in which channel selection is performed), and when M is 2 or less (the number of elements of a downlink association set is 2 or less), the equation (2) shown in FIG. 16 is used for $n_{HARQ}$. Here, $V^{DL}_{DAI,\,c}$ is $V^{DL}_{DAI}$ in serving cell c, $U_{DAI,\,c}$ is $U_{DAI}$ in the serving cell c, and $n^{ACK}_c$ is the number of HARQ-ACK bits corresponding to the configured DL transmission mode (TM) in the serving cell c. When spatial HARQ-ACK information bundling (spatial HARQ-ACK bundling) is applied, $n^{ACK}_c = 1$ ($n^{ACK}_c$ is equal to 1), and $N^{received}_{k,\,c}$ is the number of PDCCHs/EPDCCHs received in the subframe n–k in the serving cell c, or the number of PDSCHs that do not have a corresponding PDCCH/EPDCCH, and here, k is an element of K (k belongs to K, k∈K), and K is $K_c$ (K=$K_c$). $K_c$ is the downlink association set of the serving cell c, is defined by FIG. 6 in the TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When spatial HARQ-ACK information bundling (spatial HARQ-ACK bundling) is not applied, $N^{received}_{k,\,c}$ is the number of transport blocks received in the subframe n–k in the serving cell c, or the number of PDCCHs/EPDCCHs indicating the release of an SPS (SPS release PDCCHs/EPDCCHs), and here, k is an element of K (k belongs to K, k∈K), and K is $K_c$ (K=$K_c$). $K_c$ is the downlink association set of the serving cell c, is defined by FIG. 6 in the TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for the scheduling of a serving cell is not configured for the terminal device 2 in TDD-FDD. When no transport blocks or PDCCH/EPDCCH indicating the release of an SPS (SPS release PDCCH/EPDCCH) are detected in the subframe n–k in the serving cell c, $V^{DL}_{DAI,\,c}$ is 0 ($V^{DL}_{DAI,\,c} = 0$), and here, k is an element of K (k belongs to K, k∈K), and K is $K_c$ (K=$K_c$). $K_c$ is the downlink association set of the serving cell c, is defined by FIG. 6 in TDD, is defined by FIG. 6 when monitoring of the PDCCH/EPDCCH in another serving cell for the scheduling of a serving cell is configured for the terminal device 2 in TDD-FDD, and is defined by FIG. 9 when monitoring of the PDCCH/EPDCCH in another serving cell for scheduling of a serving cell is not configured in the terminal device 2 in TDD-FDD. In the TDD serving cell c, when the downlink reference UL/DL configuration for the serving cell c is TDD UL/DL configuration 0, $U_{DAI,\,c}$ is configured (substituted, set) in $V^{DL}_{DAI,\,c}$ ($V^{DL}_{DAI,\,c} = U_{DAI,\,c}$).

An example of calculation of the value of $n_{HARQ}$ will be described.

In TDD-FDD CA (TDD-FDD) and a TDD primary cell, when an FDD cell has any one of all the downlink reference UL/DL configurations in the case of self scheduling, and has the downlink reference UL/DL configuration to be 1 to 6 in the case of cross carrier scheduling, the equation (2) shown in FIG. 16 that uses the DL DAI is applied. In TDD-FDD CA (TDD-FDD) and a TDD primary cell, when an FDD cell has the downlink reference UL/DL configuration 0 in the case of loss carrier scheduling, the equation (2) shown in FIG. 16 in which the number of reception subframes of the PDSCH or the PDCCH/EPDCCH indicating the SPS release is substituted in the DL DAI is applied. In the case of TDD-FDD CA (TDD-FDD) and a TDD primary cell, when a TDD cell has a TDD UL/DL configuration or the downlink reference UL/DL configuration of 1 to 6, the equation (2) shown in FIG. 16 that uses the DL DAI is applied, and when a TDD cell has a TDD UL/DL configuration or the downlink reference UL/DL configuration of 0, the equation (2) shown in FIG. 16 in which the number of reception subframes of the PDSCH or the PDCCH/EPDCCH indicating the SPS release is substituted in the DL DAI is applied.

In TDD, when more than one serving cell is configured for the terminal device 2, and at least two serving cells have a different UL/DL configuration, or when eIMTAConfig-r12 (tddModeAConfig-r12, a configuration parameter related to eIMTA configuration) is configured for at least one serving cell, or in the case of TDD-FDD (TDD-FDD CA, TDD-FDD carrier aggregation), and the primary cell frame structure 2 (TDD PCell, the primary cell is a TDD cell), the operation described below is performed.

In the PUCCH format 3, or in two configured serving cells, and in the PUCCH format 1b with channel selection (PUCCH format 1b in which channel selection is performed), and when M is 2 or less (the number of elements of a downlink association set is 2 or less), the equation (2) shown in FIG. 16 is used for $n_{HARQ}$. Here, $V^{DL}_{DAI,\,c}$ is $V^{DL}_{DAI}$ in the serving cell c, $U_{DAI,\,c}$ is $U_{DAI}$ in the serving cell c, and $n^{ACK}_c$ is the number of HARQ-ACK bits corresponding to the configured DL transmission mode (TM) in the serving cell c. When spatial HARQ-ACK information bundling (spatial HARQ-ACK bundling) is applied, $n^{ACK}_c = 1$ ($n^{ACK}_c$ is equal to 1), and $N^{received}_{k,\,c}$ is the number of PDCCHs/EPDCCHs received in the subframe n–k in the serving cell c, or the number of PDSCHs that do not have a corresponding PDCCH/EPDCCH, and here, k is an element of K (k belongs to K, k∈K), and K is $K_c$ (K=$K_c$). $K_c$ is the downlink association set of the serving cell c, is defined by FIG. 6 in the TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for the scheduling of a serving cell is not configured for the terminal device 2 in TDD-FDD. When spatial HARQ-ACK information bundling (spatial HARQ-ACK bundling) is not applied, $N^{received}_{k,c}$ is the number of transport blocks received in the subframe n−k in the serving cell c, or the number of PDCCHs/EPDCCHs indicating the release of an SPS (SPS release PDCCHs/EPDCCHs), and here, k is an element of K (k belongs to K, k∈K), and K is $K_c$ ($K=K_c$). $K_c$ is the downlink association set of the serving cell c, is defined by FIG. 6 in TDD, and is defined by FIG. 6 when monitoring of the PDCCH/EPDCCH in another serving cell for scheduling of a serving cell is configured in the terminal device 2 in TDD-FDD, and is defined by FIG. 9 when monitoring of the PDCCH/EPDCCH in another serving cell for scheduling of a serving cell is not configured for the terminal device 2 in TDD-FDD. When no transport blocks or PDCCH/EPDCCH indicating the release of an SPS (SPS release PDCCH/EPDCCH) are detected in subframe n−k in the serving cell c, $V^{DL}_{DAI,c}$ is 0 ($V^{DL}_{DAI,c}=0$), and here, k is an element of K (k belongs to K, k∈K), and K is $K_c$ ($K=K_c$). $K_c$ is the downlink association set of the serving cell c, is defined by FIG. 6 in TDD, and is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. In the serving cell c, except in the case when the serving cell c is an FDD cell and self scheduling is configured for the terminal device 2 (the monitoring of the PDCCH/EPDCCH in another serving cell for the scheduling of the serving cell c is not configured for the terminal device 2), when the downlink reference UL/DL configuration for the serving cell c is TDD UL/DL configuration 0, $U_{DAI,c}$ is configured (substituted, set) in $V^{DL}_{DAI,c}$ ($V^{DL}_{DAI,c}=U_{DAI,c}$).

An example of calculation of the value of $n_{HARQ}$ will be described below.

In TDD, when more than one serving cell is configured for the terminal device 2, and at least two serving cells have a different UL/DL configuration, or when eIMTAConfig-r12 (tddModeAConfig-r12, a configuration parameter related to eIMTA configuration) is configured for at least one serving cell, or in the case of TDD-FDD (TDD-FDD CA, TDD-FDD carrier aggregation), and the primary cell frame structure 2 (TDD PCell, the primary cell is a TDD cell), the operation described below is performed.

In the PUCCH format 3, or in two configured serving cells, and in the PUCCH format 1b with channel selection (PUCCH format 1b in which channel selection is performed), and when M is 2 or less (the number of elements of a downlink association set is 2 or less), the equation (2) shown in FIG. 16 is used for $n_{HARQ}$. Here, $V^{DL}_{DAI,c}$ is $V^{DL}_{DAI}$ in the serving cell c, $U_{DAI,c}$ is $U_{DAI}$ in the serving cell c, and $n^{ACK}_c$ is the number of HARQ-ACK bits corresponding to the configured DL transmission mode (TM) in the serving cell c. When spatial HARQ-ACK information bundling (spatial HARQ-ACK bundling) is applied, $n^{ACK}_c=1$ ($n^{ACK}_c$ is equal to 1), and $N^{received}_{k,c}$ is the number of PDCCHs/EPDCCHs received in the subframe n−k in the serving cell c, or the number of PDSCHs that do not have a corresponding PDCCH/EPDCCH, and here, k is an element of K (k belongs to K, k∈K), and K is $K_c$ ($K=K_c$). $K_c$ is the downlink association set of the serving cell c, is defined by FIG. 6 in TDD, and is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for the scheduling of a serving cell is not configured for the terminal device 2 in TDD-FDD. When spatial HARQ-ACK information bundling (spatial HARQ-ACK bundling) is not applied, $N^{received}_{k,c}$ is the number of transport blocks received in the subframe n−k in the serving cell c, or the number of PDCCHs/EPDCCHs indicating the release of an SPS (SPS release PDCCHs/EPDCCHs), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When no transport blocks or PDCCH/EPDCCH indicating the release of an SPS (SPS release PDCCH/EPDCCH) are detected in the subframe n−k in the serving cell c, $V^{DL}_{DAI,c}$ is 0 ($V^{DL}_{DAI,c}=0$), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for the scheduling of a serving cell is not configured for the terminal device 2 in TDD-FDD. In a TDD serving cell c, or when cross carrier scheduling is configured in the terminal device 2 in an FDD serving cell c (monitoring of the PDCCH/EPDCCH in another serving cell for the scheduling of the serving cell c is configured for the terminal device 2), when the downlink reference UL/DL configuration for the serving cell c is TDD UL/DL configuration 0, $U_{DAI,c}$ is configured (substituted, set) in $V^{DL}_{DAI,c}$ ($V^{DL}_{DAI,c}=U_{DAI,c}$).

An example of calculation of the value of $n_{HARQ}$ will be described below.

In TDD-FDD CA (TDD-FDD) and a TDD primary cell, when a DL DAI is used (applied) for a serving cell, the equation (2) shown in FIG. 16 that uses the DL DAI is applied, and in other cases, the equation (2) shown in FIG. 16 in which the number of reception subframes of the PDSCH or the PDCCH/EPDCCH indicating the SPS release is substituted in the DL DAI is applied.

In TDD, when more than one serving cell is configured in the terminal device 2, and at least two serving cells have a different UL/DL configuration, or when eIMTAConfig-r12 (eIMTA configuration, a configuration parameter related to tddModeAConfig-r12) is configured for at least one serving cell, or in the case of TDD-FDD (DD-FDD CA, TDD-FDD carrier aggregation), and the primary cell frame structure 2 (TDD PCell, TDD primary cell, the primary cell is a TDD cell), the operation described below is performed.

In the PUCCH format 3, or in two configured serving cells, and in the PUCCH format 1b with channel selection (PUCCH format 1b in which channel selection is performed), and when M is 2 or less (the number of elements of a downlink association set is 2 or less), the equation (2) shown in FIG. 16 is used for $n_{HARQ}$. Here, $V^{DL}_{DAI,c}$ is $V^{DL}_{DAI}$ in the serving cell c, $U_{DAI,c}$ is $U_{DAI}$ in the serving cell c, and $n^{ACK}_c$ is the number of HARQ-ACK bits corresponding to the configured DL transmission mode (TM) in the serving cell c. When spatial HARQ-ACK information bundling (spatial HARQ-ACK bundling) is applied, $n^{ACK}{}_c=1$ ($n^{ACK}{}_c$ is equal to 1), and $N^{received}{}_{k,c}$ is the number of PDCCHs/EPDCCHs received in the subframe n−k in the serving cell c, or the number of PDSCHs that do not have a corresponding PDCCH/EPDCCH, and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When spatial HARQ-ACK information bundling (spatial HARQ-ACK bundling) is not applied, $N^{received}{}_{k,c}$ is the number of transport blocks received in the subframe n−k in the serving cell c, or the number of PDCCHs/EPDCCHs indicating the release of an SPS (SPS release PDCCHs/EPDCCHs), and here, k is an element of K (k belongs to K, k∈K), and K is $K_c$ ($K=K_c$). $K_c$ is the downlink association set of the serving cell c, is defined by FIG. 6 in the TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When no transport blocks or PDCCH/EPDCCH indicating the release of an SPS (SPS release PDCCH/EPDCCH) are detected in the subframe n−k in the serving cell c, $V^{DL}{}_{DAI,c}$ is 0 ($V^{DL}{}_{DAI,c}=0$), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When $V^{DL}{}_{DAI,c}$ is not used (not applied) in the serving cell c, $U_{DAI,c}$ is configured (substituted, set) in $V^{DL}{}_{DAI,c}$ ($V^{DL}{}_{DAI,c}=U_{DAI,c}$).

It should be noted that a case where $V^{DL}{}_{DAI,c}$ is not used (not applied) is the case when the serving cell that receives the $V^{DL}{}_{DAI,c}$ is a TDD cell in which the UL-DL configuration is configured as 0 when one or more TDD cells are configured, and the UL-DL configurations of all TDD cells are the same, or is a TDD cell in which the downlink reference UL-DL configuration is configured as 0 when two or more TDD cells are configured, and at least two TDD cells are configured with different UL-DL configurations, or is an FDD cell in which cross carrier scheduling from a TDD primary cell or a TDD cell is configured, the TDD primary cell or TDD cell having a downlink reference UL-DL configuration as 0 when the primary cell is a TDD cell and at least one secondary cell is an FDD cell. That is, in the configured TDD serving cell, the TDD UL/DL configuration or the downlink reference UL-DL configuration is configured as 0, and in such a case, the DAI included in the DCI format 1/1A/1B/1D/2/2A/2B/2C/2D is not used.

An example of calculation of the value of $n_{HARQ}$ will be described below.

When the DL DAI is not present, or when the DL DAI is present but cannot be used (is not applied), calculation is performed by using the equation (1) shown in FIG. 16, and when the DL DAI is present and is used (applied), calculation is performed by using the equation (2) shown in FIG. 16.

In TDD, when more than one serving cell is configured in the terminal device 2, and at least two serving cells have a different UL/DL configuration, or when eIMTAConfig-r12 (tddModeAConfig-r12, a configuration parameter related to an eIMTA configuration) is configured for at least one serving cell, or in the case of TDD-FDD (TDD-FDD CA, TDD-FDD carrier aggregation), and the primary cell frame structure 2 (TDD PCell, TDD primary cell, the primary cell is a TDD cell), the operation described below is performed.

In the PUCCH format 3, or in two configured serving cells, and in the PUCCH format 1b with channel selection (PUCCH format 1b in which channel selection is performed), and when M is 2 or less (the number of elements of a downlink association set is 2 or less), the equation (2) shown in FIG. 16 is used for $n_{HARQ}$. Here, $V^{DL}{}_{DAI,c}$ is $V^{DL}{}_{DAI}$ in the serving cell c, $U_{DAI,c}$ is $U_{DAI}$ in the serving cell c, and $n^{ACK}{}_c$ is the number of HARQ-ACK bits corresponding to the configured DL transmission mode (TM) in the serving cell c. When spatial HARQ-ACK information bundling (spatial HARQ-ACK bundling) is applied, $n^{ACK}{}_c=1$ ($n^{ACK}{}_c$ is equal to 1), and $N^{received}{}_{k,c}$ is the number of PDCCHs/EPDCCHs received in the subframe n−k in the serving cell c, or the number of PDSCHs that do not have a corresponding PDCCH/EPDCCH, and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When spatial HARQ-ACK information bundling (spatial HARQ-ACK bundling) is not applied, $N^{received}{}_{k,c}$ is the number of transport blocks received in the subframe n−k in the serving cell c, or the number of PDCCHs/EPDCCHs indicating the release of an SPS (SPS release PDCCHs/EPDCCHs), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. When no transport blocks or PDCCH/EPDCCH indicating the release of an SPS (SPS release PDCCH/EPDCCH) are detected in the subframe n−k in the serving cell c, $V^{DL}{}_{DAI,c}$ is 0 ($V^{DL}{}_{DAI,c}=0$), and here, k is an element of K (k belongs to K, k∈K), and K is $K_c$ ($K=K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD. In the serving cell c, except in the case when the serving cell c is an FDD cell, when the downlink reference UL/DL configuration for the serving cell c is TDD UL/DL configuration 0, the equation (1) shown in FIG. 16 is used for $n_{HARQ}$.

An example of calculation of the value of $n_{HARQ}$ will be described below.

In TDD, when more than one serving cell is configured for the terminal device 2, and at least two serving cells have a different UL/DL configuration, or when eIMTAConfig-r12 (tddModeAConfig-r12, a configuration parameter related to eIMTA configuration) is configured for at least one serving cell, or in the case of TDD-FDD (TDD-FDD CA, TDD-FDD carrier aggregation), and the primary cell frame structure 2 (TDD PCell, the primary cell is a TDD cell), the operation described below is performed.

In the case of two configured serving cells, and the PUCCH format 1b with channel selection (PUCCH format 1b in which channel selection is performed), and when M is either 3 or 4 (M=3 or 4), when the terminal device 2 receives the PDSCH or the PDCCH/EPDCCH indicating the release of the downlink SPS in only one serving cell in the subframe n−k, $n_{HARQ}$ is 2 ($n_{HARQ}$=2), and in the other cases, $n_{HARQ}$ is 4 ($n_{HARQ}$=4). Here, k is an element of K (k belongs to K, k∈K), and K is $K_c$ (K=$K_c$). $K_c$ is the downlink association set of the serving cell c, is defined by FIG. 6 in TDD, is defined by FIG. 6 when monitoring of the PDCCH/EPDCCH in another serving cell for scheduling of a serving cell is configured for the terminal device 2 in TDD-FDD, and is defined by FIG. 9 when monitoring of the PDCCH/EPDCCH in another serving cell for scheduling of a serving cell is not configured for the terminal device 2 in TDD-FDD.

It should be noted that $N^{DL}_{cells}$ is the number of configured cells.

It should be noted that mod is an operator for calculating a remainder, and AmodeB calculates the remainder obtained when A is divided by B.

As a result, appropriate control of the uplink transmit power is possible by using the DL DAI in the TDD-FDD CA.

As a result, an uplink signal (PUCCH, PUSCH) including the DL HARQ-ACK can be transmitted efficiently.

As a result, the terminal device 2 can efficiently perform communication by using the DAI.

It should be noted that the terminal device 2 that performs cell aggregation (carrier aggregation) does not perform transmission and reception simultaneously in the primary cell and the secondary cell unless a function (performance, capability) for performing simultaneous transmission and reception is present between the bands supported by the primary cells and the secondary cells, respectively, in the terminal device 2, when different frame structure types (FDD (type 1) and TDD (type 2)) are applied in the primary cells and at least one secondary cell.

Furthermore, the present embodiment may be applied to different bands (E-UTRA Operating Band, E-UTRA Band, Band) as well.

Here, a band in which the duplex mode is TDD is sometimes referred to as a TDD band, and a band in which the duplex mode is FDD is sometimes referred to as an FDD band. Similarly, a cell (carrier) with the frame structure type of FDD (type 1) is sometimes referred to as an FDD cell (FDD carrier), and a cell (carrier) with the fame structure type of TDD (type 2) is sometimes referred to as a TDD cell (TDD carrier).

It should be noted that in the TDD frame structure, all subframes may be configured as downlink subframes. In such a case, the embodiment described above may be applied by replacing the TDD cell in which all subframes are configured as downlink subframes with an FDD cell (downlink component carriers of the FDD).

It should be noted that the TDD frame structure may be applied in the uplink component carriers of the FDD. In such a case, the embodiment described above may be applied by replacing the uplink component carriers of the FDD to which the TDD frame structure is applied by a TDD cell.

FIG. 1 is a schematic block diagram illustrating a configuration of the base station device 1 according to the present invention. As illustrated in FIG. 1, the base station device 1 is configured to include a higher layer processing unit 101, a control unit 103, a reception unit 105, a transmission unit 107, a channel measurement unit 109, and a transmit and receive antenna 111. Furthermore, the reception unit 105 is configured to include a decoding unit 1051, a demodulation unit 1053, a demultiplexing unit 1055, and a radio reception unit 1057. Furthermore, the reception process of the base station device 1 is performed in the higher layer processing unit 101, the control unit 103, the reception unit 105, and the transmit and receive antenna 111. Furthermore, the transmission unit 107 is configured to include a coding unit 1071, a modulation unit 1073, a multiplexing unit 1075, a radio transmission unit 1077, and a downlink reference signal generation unit 1079. Furthermore, the transmission process of the base station device 1 is performed in the higher layer processing unit 101, the control unit 103, the transmission unit 107, and the transmit and receive antenna 111.

The higher layer processing unit 101 performs processing of the medium access control (MAC) layer, the packet data convergence protocol (PDCP) layer, the radio link control (RLC) layer, and the radio resource control (RRC) layer.

The higher layer processing unit 101 generates, or acquires from a higher node, the information to be arranged on each channel in the downlink, and outputs the generated or acquired information to the transmission unit 107. Furthermore, the higher layer processing unit 101 allocates a radio resource, from among the uplink radio resources, in which the terminal device 2 places the physical uplink shared channel (PUSCH) which is uplink data information. Furthermore, the higher layer processing unit 101 determines a radio resource from among the downlink radio resources, in which the terminal device 2 places the physical downlink shared channel (PDSCH) which is downlink data information.

The higher layer processing unit 101 generates the downlink control information indicating the allocation of the radio resource, and transmits the generated information to the terminal device 2 via the transmission unit 107.

When allocating a radio resource in which the PUSCH is placed, the higher layer processing unit 101 allocates a radio resource with good channel quality prioritized on the basis of the channel measurement results of the uplink entered from the channel measurement unit 109. In other words, the higher layer processing unit 101 generates the information on the configuration of various downlink signals and the information on the configuration of various uplink signals for a terminal device or a cell.

Furthermore, the higher layer processing unit 101 may generate the information on the configuration of various downlink signals and the information on the configuration of various uplink signals for each cell. Furthermore, the higher layer processing unit 101 may generate the information on the configuration of various downlink signals and the information on the configuration of various uplink signals for each terminal device 2.

Furthermore, the higher layer processing unit 101 may generate information on the n-th configuration (n is a natural number) from the information on the first configuration for a terminal device 2 or a cell, that is, specifically for a terminal device and/or specifically for a cell, and transmit the generated information to the terminal device 2 via the transmission unit 107. For example, the information on the configuration of the downlink signal and/or the uplink signal may include parameters related to resource allocation.

Furthermore, the information on the configuration of the downlink signal and/or the uplink signal may include parameters used in sequence calculation. It should be noted that the radio resource are sometimes referred to as a time frequency resource, a subcarrier, a resource element (RE), a resource element group (REG), a control channel element (CCE), a resource block (RB), and a resource block group (RBG).

The configuration information and the control information may be defined as information elements. Furthermore, the configuration information and the control information may be defined as an RRC message. Furthermore, the configuration information and the control information may be transmitted to the terminal device 2 as system information. Furthermore, the configuration information and the control information may be transmitted to the terminal device 2 as dedicated signalling.

Furthermore, the higher layer processing unit 101 configures at least one TDD UL/DL configuration (TDD UL-DL configuration(s), TDD config, tdd-Config, uplink-downlink configurations(s)) in a system information block type 1. The TDD UL/DL configuration may be defined as shown in FIG. 3. The configuration of the TDD may also be indicated by configuring an index. In addition, the second TDD UL/DL configuration may be configured as the downlink reference. Furthermore, a plurality of types of system information blocks may be prepared. For example, the information elements related to the TDD UL/DL configuration are included in the system information block type 1.

The TDD UL/DL configuration is information indicating the type of subframe (uplink subframe, downlink subframe, special subframe) in one radio frame (10 subframes). The TDD UL/DL configuration may be configured for a serving cell or the terminal device 2 for which the serving cell is configured with being included in the uplink reference UL-DL configuration (first uplink reference UL-DL configuration, second uplink reference UL-DL configuration), or the downlink reference UL-DL configuration (first downlink reference UL-DL configuration, or second downlink reference UL-DL configuration).

Furthermore, the information elements on radio resource control are included in a system information block type 2. It should be noted that in an information element, a parameter concerning the information element may be included as an information element. For example, what is referred to as a parameter in the physical layer may be defined as an information element in the higher layer.

It should be noted that according to the present invention, an identity, an identifier, and an identification is referred to as an ID (identifier, identification symbol, identification number). The ID configured specifically for a terminal (UEID) includes a cell radio network temporary identifier (C-RNTI), a semi-persistent scheduling C-RNTI (SPS C-RNTI), a temporary C-RNTI, a TPC-PUSCH RNTI, a TPC-PUCCH RNTI, and a random value for a contention resolution. These IDs are used on a per-cell basis. These IDs are configured by the higher layer processing unit 101.

Furthermore, the higher layer processing unit 101 configures various identifiers for the terminal device 2, and announces the identifiers to the terminal device 2 via the transmission unit 107. For example, the higher layer processing unit configures the RNTI and announces the configured RNTI to the terminal device 2. Furthermore, the higher layer processing unit configures the physical layer cell ID, the virtual cell ID, or an ID equivalent to the virtual cell ID and announces the ID. For example, examples of an ID equivalent to the virtual cell ID include IDs that can be configured specifically for a physical channel (such as the PUSCH ID, the PUCCH ID, the scrambling initialization ID, and the reference signal ID (RSID)). A physical layer cell ID and a virtual cell ID may be used for sequence generation of a physical channel and a physical signal.

The higher layer processing unit 101 generates the downlink control information (DCI) to be announced on a physical downlink control channel (PDCCH) or an enhanced physical downlink control channel (EPDCCH), and the control information for control of the reception unit 105 and the transmission unit 107, and outputs the information to the control unit 103.

On the basis of the uplink control information (UCI) announced on a physical uplink control channel (PUCCH) from the terminal device 2, and the buffer status announced by the terminal device 2, as well as the various types of configuration information (such as the RRC messages, system information, parameters, and information elements) of each terminal device 2 configured by the higher layer processing unit 101, the higher layer processing unit 101 generates the control information for control of the reception unit 105 and the transmission unit 107, and outputs the information to the control unit 103. It should be noted that at least one of the ACK/NACK, scheduling request (SR), and channel state information is included in the UCI. It should be noted that at least one of CQI, PMI, and RI is included in the CSI.

The higher layer processing unit 101 configures the transmit power of the uplink signals (PRACH, PUCCH, PUSCH, UL DMRS, P-SRS, and A-SRS) and the parameters related to the transmit power. Furthermore, the higher layer processing unit 101 transmits the transmit power of the downlink signals (CRS, DL DMRS, CSI-RS, PDSCH, PDCCH/EPDCCH, and the like) and the parameters related to the transmit power to the terminal device 2 via the transmission unit 107. In other words, the higher layer processing unit 101 transmits the information on the power control for the uplink and the downlink to the terminal device 2 via the transmission unit 107. In other words, the higher layer processing unit 101 generates information on the transmit power control of the base station device 1 and the terminal device 2. For example, the higher layer processing unit 101 transmits the parameters related to the transmit power of the base station device 1 to the terminal device 2.

Furthermore, the higher layer processing unit 101 transmits the parameters used for configuration of the maximum transmit power $P_{CMAX,\ c}$ and the total maximum output power $P_{CMAX}$ of the terminal device 2 to the terminal device 2. Furthermore, the higher layer processing unit 101 transmits the information on the transmit power control of various physical channels to the terminal device 2.

Furthermore, the higher layer processing unit 101 transmits, to the terminal device 2 via the transmission unit 107, the information indicating the amount of interference from a neighbor base station device, the information indicating the amount of interference on a neighbor base station 1 announced from the neighbor base station, and information indicating the configuration for enabling the PUSCH or the like to satisfy a prescribed channel quality in accordance with the quality of the channel input from the channel measurement unit 109, and setting the transmit power of the terminal device 2 in consideration of the interference on the neighbor base station device 1.

Specifically, the higher layer processing unit 101 transmits the standard power for each of the PUSCH and the PUCCH ($P_{O\_NOMINAL\_PUSCH}$, $P_{O\_NOMINAL\_PUCCH}$), the path loss compensation coefficient (attenuation coefficient) $\alpha$, the power offset for message 3, and the power offset specified for each PUCCH format as the information shared between the terminal devices 2 (information on the shared parameters related to the uplink power control) or as the information configured as common parameters between the terminal devices 2, in the system information. At this time, the power offset of the PUCCH format 3, and the power offset of the delta PUCCH format 1b CS may also be added and announced. Furthermore, the information on the shared parameters may be announced with an RRC message.

Furthermore, the higher layer processing unit 101 announces, with an RRC message, the terminal device-specific PUSCH power $P_{O\_UE\_PUSCH}$, the parameter (delta-MCS-Enabled) indicating whether delta MCS is enabled, the parameter (accumulationEnabled) indicating whether accumulation is enabled, the terminal device-specific PUCCH power $P_{O\_UE\_PUCCH}$, the P-SRS power offset $P_{SRS\_OFFSET}$ (0), and the filter coefficient as the information that can be configured for each terminal device 2 (information on the dedicated parameters related to uplink power control). At this time, the power offset of the transmit diversity in each PUCCH format and the A-SRS power offset $P_{SRS\_OFFSET}(1)$ may also be announced. It should be noted that here, $\alpha$ is a coefficient (attenuation coefficient, or a path loss compensation coefficient) that is used for setting the transmit power along with the path loss value, and is a coefficient expressing the extent of compensation of path loss, in other words, a coefficient for determining the extent of increasing or decreasing the transmit power (that is, the extent to which the transmit power is to be compensated) in accordance with the path loss. Normally, $\alpha$ has a value from 0 to 1, and when the value is 0, power is not compensated in accordance with the path loss, whereas, when the value is 1, the transmit power of the terminal device 2 is compensated so that the effect of path loss is not felt in the base station device 1. This information may be transmitted to the terminal device 2 as the reconfiguration information. It should be noted that the shared parameters and the dedicated parameters may be configured independently for the primary cell, the secondary cell, or a plurality of serving cells.

Furthermore, upon receiving the capability information on the terminal device 2 from the terminal device 2 in the reception unit 105, the higher layer processing unit 101 performs various configurations on the basis of the capability information on the terminal device 2. For example, the higher layer processing unit 101 determines the uplink carrier frequency and the downlink carrier frequency from the bands (EUTRA Operating Bands) supported by the terminal device 2, on the basis of the capability information on the terminal device 2. Furthermore, the higher layer processing unit 101 determines whether to perform MIMO communication with the terminal device 2, on the basis of the capability information on the terminal device 2. Furthermore, the higher layer processing unit 101 determines whether to perform carrier aggregation, on the basis of the capability information on the terminal device 2. Furthermore, the higher layer processing unit 101 determines whether to perform carrier aggregation with component carriers having different frame structure types, on the basis of the capability information on the terminal device 2. That is, the higher layer processing unit 101 determines whether to configure a secondary cell, and determines various parameters to be used for the secondary cell. The information thus determined is announced to the terminal device 2. It should be noted that the information on the carrier frequency may be announced with an RRC message. That is, information on the carrier frequency may be announced with system information. Furthermore, information on the carrier frequency may be announced with being included in the mobility control information. Furthermore, the information on the carrier frequency may be announced from a higher layer as RRC information.

Furthermore, when configuring a secondary cell for the terminal device 2, the higher layer processing unit 101 assigns, to the secondary cell, a cell index other than a specific value (for example, "0" or an information bit equivalent to "0"), and transmits the configuration information to the terminal device 2. When a secondary cell is configured, the terminal device 2 considers the cell index of the primary cell as a specific value.

Furthermore, the higher layer processing unit 101 may configure the transmit power of the downlink signal/uplink signal for each terminal device 2, or the parameters related to the transmit power. Furthermore, the higher layer processing unit 101 may configure the transmit power of the downlink/uplink signal that is common among the terminal devices 2, or the parameters related to the transmit power. The higher layer processing unit 101 may transmit the information on the parameters to the terminal device 2 as the information on the uplink power control (information on the parameters related to the uplink power control) and/or the information on the downlink power control (information on the parameters related to the downlink power control). At least one parameter is included in the information on the parameters related to the uplink power control and the information on the parameters related to the downlink power control, and transmitted to the terminal device 2.

The higher layer processing unit 101 configures various IDs concerning the different types of physical channels/physical signals, and outputs information on the configuration of the IDs to the reception unit 105 and the transmission unit 107 via the control unit 103. For example, the higher layer processing unit 101 configures the value of the RNTI (UEID) for scrambling the CRC included in the downlink control information format.

Furthermore, the higher layer processing unit 101 may configure the values of various identifiers, such as a cell radio network temporary identifier (C-RNTI), a temporary C-RNTI, a paging-RNTI (P-RNTI), a random access RNTI (RA-RNTI), a semi-persistent scheduling C-RNTI (SPS C-RNTI), and a system information RNTI (SI-RNTI).

Furthermore, the higher layer processing unit 101 configures the values of IDs such as a physical cell ID, a virtual cell ID, and a scrambling initialization ID. Such configuration information is output to each processing unit via the control unit 103. Furthermore, such configuration information may be transmitted to the terminal device 2 as an RRC message, system information, terminal device-specific dedicated information, or information elements. Furthermore, some RNTIs may be transmitted by using a MAC control element (CE).

On the basis of the control information from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a receive signal received from the terminal device 2 via the transmit and receive antenna 111, and outputs the decoded information to the higher layer processing unit 101. The radio reception unit 1057 converts (down-converts) an uplink signal received via the transmit and receive antenna 111 into a signal of an intermediate frequency (IF), removes the unnecessary frequency components, controls an amplification level so as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to the guard interval (GI) from the converted digital signal. The radio reception unit 1057 performs fast Fourier transform (FFT) on the signal from which the guard interval has been removed, extracts a signal in the frequency domain, and outputs the resulting signal to the demultiplexing unit 1055.

The demultiplexing unit 1055 demultiplexes the signal input from the radio reception unit 1057 into signals such as the PUCCH, the PUSCH, the UL DMRS, and the SRS. It should be noted that the demultiplexing is performed on the basis of the allocation information of radio resources that is determined beforehand by the base station device 1 and then announced to each terminal device 2. Furthermore, the demultiplexing unit 1055 makes compensation of channels including the PUCCH and the PUSCH from a channel estimated input from the channel measurement unit 109. Furthermore, the demultiplexing unit 1055 outputs the demultiplexed UL DMRS and SRS to the channel measurement unit 109.

The demodulation unit 1053 performs inverse discrete Fourier transform (IDFT) on the PUSCH, acquires the modulation symbols, and performs demodulation of the receive signal on each of the modulation symbols of the PUCCH and the PUSCH, in compliance with the modulation scheme, such as binary phase shift keying (BPSK), quadrature phase shift keying (QPSK), 16 quadrature amplitude modulation (16 QAM), or 64 quadrature amplitude modulation (64 QAM), which is either prescribed in advance or announced in advance by the base station device 1 to each of the terminal devices 2 with the downlink control information.

The decoding unit 1051 decodes the coded bits of the PUCCH and the PUSCH, which have been demodulated, at the coding rate in compliance with a coding scheme prescribed in advance, the coding rate being prescribed in advance or being announced in advance with the uplink grant (the UL grant) to the terminal device 2 by the base station device 1, and outputs, to the higher layer processing unit 101, the decoded data information and the uplink control information.

The channel measurement unit 109 measures the channel estimate, the channel quality, and the like from the uplink demodulation reference signals ULDMRS and SRS input from the demultiplexing unit 1055, and outputs the measured result to the demultiplexing unit 1055 and the higher layer processing unit 101. Furthermore, the channel measurement unit 109 measures the received power and/or the received quality of the first signal through the n-th signal, and outputs the measured result to the demultiplexing unit 1055 and the higher layer processing unit 101.

The transmission unit 107 generates a downlink reference signal on the basis of the control signal input from the control unit 103, codes and modulates the data information and downlink control information input from the higher layer processing unit 101, multiplexes the PDCCH (EPDCCH) in a DCI format, the PDSCH, and the downlink reference signal, and transmits a downlink signal to the terminal device 2 via the transmit and receive antenna 111. The transmission unit transmits the PDCCH in a first DCI format or a second DCI format.

The coding unit 1071 codes the downlink control information and data information input from the higher layer processing unit 101 in compliance with a coding scheme such as turbo coding, convolutional coding, or block coding. The modulation unit 1073 modulates the coded bits in compliance with a modulation scheme, such as QPSK, 16QAM, or 64QAM. The downlink reference signal generation unit 1079 generates, as the downlink reference signal, a sequence that is already known to the terminal device 2 and that is acquired according to a rule prescribed in advance on the basis of the cell identifier (Cell ID, Cell Identity, Cell Identifier, Cell Identification) or the like for identifying the base station device 1. The multiplexing unit 1075 multiplexes each modulated channel and generated downlink reference signal.

The radio transmission unit 1077 performs inverse fast Fourier transform (IFFT) on the modulation symbol resulting from the multiplexing or the like, performs the modulation in compliance with an OFDM scheme to generate an OFDM symbol, adds a guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 111 for transmission.

Figure 2:
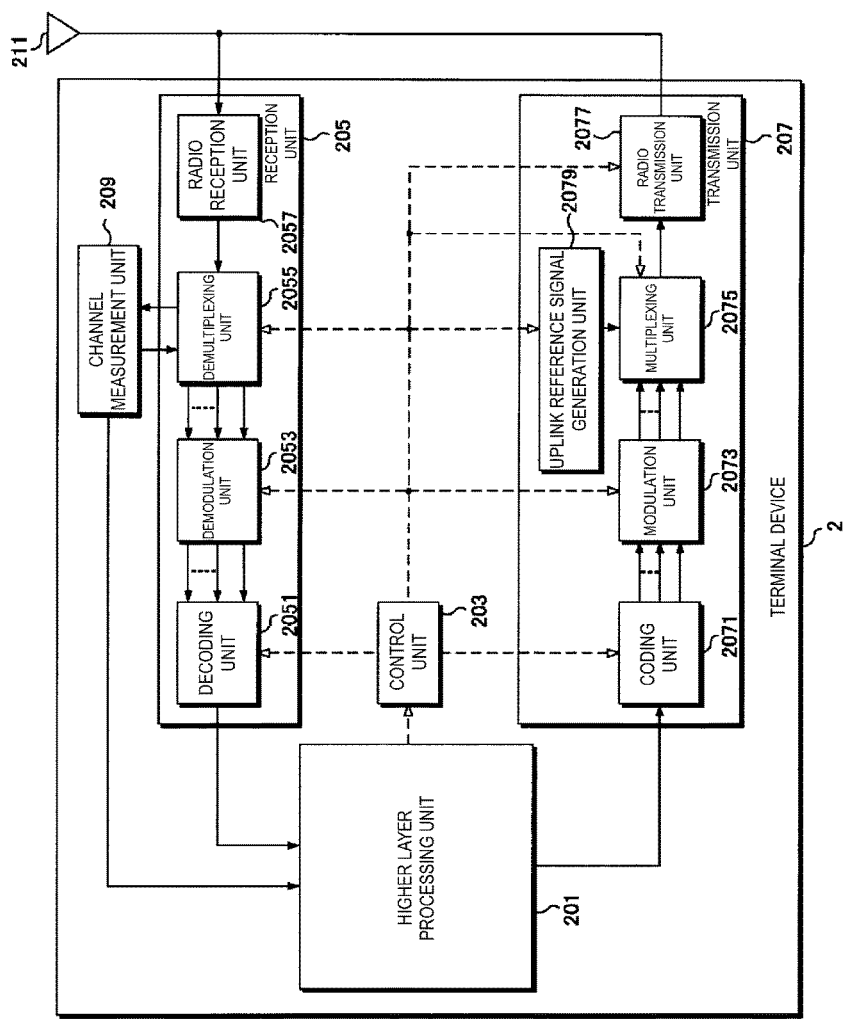
FIG. 2 is a schematic block diagram illustrating a configuration of a terminal device 2 according to the first embodiment of the present invention.

FIG. 2 is a schematic block diagram illustrating a configuration of the terminal device 2 according to the present embodiment. As illustrated in FIG. 2, the terminal device 2 is configured to include a higher layer processing unit 201, a control unit 203, a reception unit 205, a transmission unit 207, a channel measurement unit 209, and a transmit and receive antenna 211. Furthermore, the reception unit 205 is configured to include a decoding unit 2051, a demodulation unit 2053, a demultiplexing unit 2055, and a radio reception unit 2057. The reception process of the terminal device 2 is performed in the higher layer processing unit 201, the control unit 203, the reception unit 205, and the transmit and receive antenna 211. Furthermore, the transmission unit 207 is configured to include a coding unit 2071, a modulation unit 2073, a multiplexing unit 2075, and a radio transmission unit 2077. Furthermore, the transmission process of the terminal device 2 is performed in the higher layer processing unit 201, the control unit 203, the transmission unit 207, and the transmit and receive antenna 211.

The higher layer processing unit 201 outputs the uplink data information generated by a user operation or the like, to the transmission unit. Furthermore, the higher layer processing unit 201 performs processing of the medium access control (MAC) layer, the packet data convergence protocol (PDCP) layer, the radio link control (RLC) layer, and the radio resource control (RRC) layer.

The higher layer processing unit 201 manages the various types of configuration information of the terminal device 2.

Furthermore, the higher layer processing unit 201 generates information to be arranged on each channel in the uplink, and outputs the generated information to the transmission unit 207. The higher layer processing unit 201 generates the control information for control of the reception unit 205 and the transmission unit 207 on the basis of the various types of configuration information of the terminal device managed by the higher layer processing unit 201 to output the resultant information to the control unit 203, the various types of configuration information including the downlink control information (DCI) announced from the base station device 1 on the PDCCH and the radio resource control information announced on the PDSCH. Furthermore, the higher layer processing unit 201 sets various parameters (information elements and RRC messages) of each signal on the basis of the information on the first configuration through the n-th configuration that is announced from the base station device 1. Furthermore, the higher layer processing unit generates the set information, and outputs the generated information to the transmission unit 207 via the control unit 203. Furthermore, to establish a connection with the base station device 1, the higher layer processing unit 201 generates the capability information of the terminal device 2, and outputs the generated information to the transmission unit 207 via the control unit 203 to announce the information to the base station device 1. Furthermore, having established the connection with the base station device 1, the higher layer processing unit 201 may announce the capability information to the base station device 1.

The capability information may include information on RF parameters (RF-parameters). The information on the RF parameters may include information (1st SupportedBandCombination) indicating the band supported by the terminal device 2. The information on the RF parameters may include information (SupportedBandCombinationExt) indicating the bands that support carrier aggregation and/or MIMO. The information on the RF parameters may include information (2nd SupportedBandCombination) indicating the bands that support the function of performing transmission/reception simultaneously a plurality of timing advances among bands that are aggregated simultaneously in the terminal device 2, and also simultaneous transmission and reception among bands. These bands may be listed. The values (entries) indicated by the plurality of listed information may be common (the same items may be indicated).

The information on the RF parameters may also indicate whether half duplex is supported in each of the bands (bandE-UTRA, FreqBandIndicator, E-UTRA Operating Band) supported by the terminal device 2. Full duplex is supported in bands that do not support half duplex.

The information on the RF parameters may also indicate whether the uplink carrier aggregation and/or MIMO is supported in the bands supported by the terminal device 2.

The information on the RF parameters may also indicate whether the downlink carrier aggregation and/or MIMO is supported in the bands supported by the terminal device 2.

The information on the RF parameters may also include information indicating the bands that support the TDD-FDD carrier aggregation. These bands may also be listed.

The information on the RF parameters may also include information indicating whether the function of simultaneous transmission/reception among bands that support the TDD-FDD carrier aggregation.

Furthermore, the information on the RF parameters may also include information indicating whether transmission/reception can be performed simultaneously among bands with different duplex modes.

When there are any unsupported functions among the functions that are included in the capability information, the higher layer processing unit 201 does not have to set information indicating whether such functions are supported, in the capability information. The base station device 1 considers that any function that has not been set in the capability information is not supported by the terminal device 2, and performs various configurations. It should be noted that information indicating whether a function is supported may be information indicating that a function is supported.

When there are any unsupported functions in the capability information, the higher layer processing unit 201 may set a specific value (for example, "0") or information (for example, "not supported", "disable", and "FALSE") indicating that the function is not supported, and announce the capability information including such information to the base station device 1.

When there are any supported functions in the capability information, the higher layer processing unit 201 may set a specific value (for example, "1") or information (for example, "supported", "enable", and "TRUE") indicating that the function is supported, and announce the capability information including such information to the base station device 1.

When there is no function of simultaneous transmission/reception among bands that can be aggregated simultaneously, the higher layer processing unit 201 sets a specific value or information indicating that the function is not supported in the information (simultaneousRx-Tx) indicating whether the function of simultaneous transmission/reception among bands that can be aggregated simultaneously is supported. Alternatively, the information indicating whether the function of simultaneous transmission/reception among bands that can be aggregated simultaneously is supported does not have to be set in the capability information.

The higher layer processing unit 201 acquires, from the reception unit 205, information indicating a sounding subframe (an SRS subframe, SRS transmission subframe), which is a subframe for reserving a radio resource for transmitting an SRS broadcast by the base station device 1, and the bandwidth of the radio resource reserved for the transmission of the SRS in the sounding subframe, and information indicating the subframe for transmitting a periodic SRS announced by the base station device 1 to the terminal device 2, and the frequency band, and the amount of cyclic shift used in the CAZAC sequence of the periodic SRS, and also the information indicating the frequency band for transmitting an aperiodic SRS announced by the base station device 1 to the terminal device 2, and the amount of cyclic shift used in the CAZAC sequence of the aperiodic SRS.

The higher layer processing unit 201 controls the SRS transmission in accordance with the above information. Specifically, the higher layer processing unit 201 controls the transmission unit 207 so that the transmission unit 207 transmits the periodic SRS either once or periodically in accordance with the information on the periodic SRS. Furthermore, when the transmission of aperiodic SRS is requested in an SRS request (SRS indicator) input from the reception unit 205, the higher layer processing unit 201 transmits the aperiodic SRS by predetermined times (for example, once) in accordance with the information on aperiodic SRS.

The higher layer processing unit 201 controls the transmit power of the PRACH, the PUCCH, the PUSCH, the periodic SRS, and the aperiodic SRS on the basis of the information on the transmit power control of various uplink signals transmitted from the base station device 1. Specifically, the higher layer processing unit 201 configures the transmit power of various uplink signals on the basis of the various types of information on the uplink power control acquired from the reception unit 205. For example, the transmit power of an SRS is controlled on the basis of $P_{O\_PUSCH}$, $\alpha$, power offset $P_{SRS\_OFFSET}(0)$ for a periodic SRS (first power offset) (pSRS-Offset)), power offset $P_{SRS\_OFFSET}(1)$ for an aperiodic SRS (second power offset (pSRS-OffsetAp)), and TPC command. It should be noted that the higher layer processing unit 201 switches the $P_{SRS\_OFFSET}$ between the first power offset and the second power offset depending on whether it is the periodic SRS or the aperiodic SRS.

Furthermore, when a third power offset is configured for the periodic SRS and/or the aperiodic SRS, the higher layer processing unit 201 sets the transmit power on the basis of the third power offset. It should be noted that a wider range of value than the first power offset and the second power offset may be configured for the third power offset. The third power offset may be configured for both the periodic SRS and the aperiodic SRS. In other words, the information on the parameters related to the uplink power control is the information elements and RRC messages in which the parameters concerning the control of the transmit power of the various uplink physical channels are included.

Furthermore, in a serving cell and a subframe, when the total of the transmit power of a first uplink reference signal and the transmit power of a physical uplink shared channel exceeds the maximum transmit power configured for the terminal device 2 (for example, $P_{CMAX}$ and $P_{CMAX,c}$), the higher layer processing unit 201 outputs instruction information to the transmission unit 207 via the control unit 203 so that the transmission unit 207 transmits the physical uplink shared channel.

Furthermore, in a serving cell and a subframe, when the total of the transmit power of a first uplink reference signal and the transmit power of a physical uplink control channel exceeds the maximum transmit power configured for the terminal device 2 (for example, $P_{CMAX}$ and $P_{CMAX,c}$), the higher layer processing unit 201 outputs instruction information to the transmission unit 207 via the control unit 203 so that the transmission unit 207 transmits the physical uplink control channel.

Furthermore, in a serving cell and a subframe, when the total of the transmit power of a second uplink reference signal and the transmit power of a physical uplink shared channel exceeds the maximum transmit power configured in the terminal device 2, the higher layer processing unit 201 outputs instruction information to the transmission unit 207 via the control unit 203 so that the transmission unit 207 transmits the physical uplink shared channel.

Furthermore, in a serving cell (for example, serving cell c) and a subframe (for example, subframe i), when the total of the transmit power of a second uplink reference signal and the transmit power of a physical uplink control channel exceeds the maximum transmit power configured in the terminal device 2, the higher layer processing unit 201 outputs instruction information to the transmission unit 207 via the control unit 203 so that the transmission unit 207 transmits the physical uplink control channel.

Furthermore, when the transmission of a plurality of physical channels occurs at the same timing (for example, in the same subframe), the higher layer processing unit 201 can control the transmit power of the various physical channels, and control the transmission of various physical channels depending on the priority of the various physical channels. The higher layer processing unit 201 outputs the control information to the transmission unit 207 via the control unit 203.

Furthermore, when the higher layer processing unit 201 performs carrier aggregation using a plurality of serving cells, or a plurality of component carriers corresponding to each of the plurality of serving cells, the higher layer processing unit 201 can control the transmit power of the various physical channels, and also control the transmission of various physical channels depending on the priority of the physical channels.

Furthermore, the higher layer processing unit 201 can perform transmission control of the various physical channels transmitted from a cell depending on the priority of the cell. The higher layer processing unit 201 outputs the control information to the transmission unit 207 via the control unit 203.

The higher layer processing unit 201 outputs instruction information to the transmission unit 207 via the control unit 203 so that the transmission unit 207 generates an uplink reference signal or the like on the basis of the information on the configuration of the uplink reference signal announced from the base station device 1. In other words, the reference signal control unit 2013 outputs the information on the configuration of the uplink reference signal to an uplink reference signal generation unit 2079 via the control unit 203.

On the basis of the control information from the higher layer processing unit 201, the control unit 203 generates a control signal for control of the reception unit 205 and the transmission unit 207. The control unit 203 outputs the generated control signal to the reception unit 205 and the transmission unit 207 to control the reception unit 205 and the transmission unit 207.

In accordance with the control signal input from the control unit 203, the reception unit 205 demultiplexes, demodulates, and decodes a receive signal received from the base station device 1 via the transmit and receive antenna 111, and outputs the decoded information to the higher layer processing unit 201. The reception unit receives the PDCCH transmitted in either a first DCI format or a second DCI format.

The reception unit 205 performs appropriate reception process depending on whether the reception unit receives the information on the first configuration and/or the information on the second configuration. For example, when the reception unit receives either of the information on the first configuration or the information on the second configuration, the reception unit detects the first control information field from the received downlink control information format, and when the reception unit receives the information on the first configuration and the information on the second configuration, the reception unit detects the second control information field from the received downlink control information format.

The radio reception unit 2057 converts (down-converts) a downlink signal received via each receive antenna into a signal of an intermediate frequency, removes unnecessary frequency components, controls an amplification level so as to suitably maintain a signal level, performs orthogonal demodulation on the basis of an in-phase component and an orthogonal component of the received signal, and converts the orthogonally-demodulated analog signal into a digital signal. The radio reception unit 2057 removes a portion corresponding to a guard interval from the converted digital signal, performs fast Fourier transform on the signal from which the guard interval has been removed, and extracts a signal in the frequency domain.

The demultiplexing unit 2055 demultiplexes the extracted signal into the PDCCH, the PDSCH, and the downlink reference signal (DL-RS). It should be noted that the demultplexing is performed on the basis of the allocation information of the radio resource and the like announced with the downlink control information. Furthermore, the demultiplexing unit 2055 makes compensation of channels such as the PDCCH and the PDSCH from the channel estimate input from the channel measurement unit 209. Furthermore, the demultiplexing unit 2055 outputs the demultiplexed downlink reference signal to the channel measurement unit 209.

The demodulation unit 2053 demodulates the PDCCH transmitted in the DCI format in compliance with a QPSK modulation scheme, and outputs a result of the modulation to the decoding unit 2051. The decoding unit 2051 attempts to decode the PDCCH. When successfully decoding the PDCCH, the decoding unit 2051 outputs the decoded downlink control information (DCI) to the higher layer processing unit 201. The demodulation unit 2053 demodulates the PDSCH in compliance with a demodulation scheme announced with the downlink control information, such as the QPSK, the 16QAM, or the 64QAM, and outputs a result of the demodulation to the decoding unit 2051. The decoding unit 2051 performs decoding at a coding rate announced with the downlink control information, and outputs, to the higher layer processing unit 201, the decoded data information.

The channel measurement unit 209 measures a downlink path loss from the downlink reference signal input from the demultiplexing unit 2055, and outputs the measured path loss to the higher layer processing unit 201. Furthermore, the channel measurement unit 209 calculates a downlink channel estimate from the downlink reference signal, and outputs the calculated downlink channel estimate to the demultiplexing unit 2055. Furthermore, the channel measurement unit 209 performs received power measurement and received quality measurement of the first signal and/or the second signal in accordance with the various types of information on the measurement and various types of information on the measurement report announced by the reference signal control unit 2013 via the control unit 203. The results are output to the higher layer processing unit 201. Furthermore, when being instructed to perform channel evaluation of the first signal and/or the second signal, the channel measurement unit 209 may output the results from the channel evaluation of each of the signals to the higher layer processing unit 201. Here, the first signal and the second signal are reference signals (pilot signals, pilot channels, reference signals), and a third signal and a fourth signal may also be provided in addition to the first signal and the second signal. In other words, the channel measurement unit 209 measures the channel of one or more signals. Furthermore, the channel measurement unit 209 configures a signal on which channel measurement is performed in accordance with the control information announced by the higher layer processing unit 201 via the control unit 203.

Furthermore, in a certain cell (first cell), when an uplink subframe for which uplink transmission is requested occurs, due to which the channel measurement unit 209 cannot measure the CRS and the CSI-RS in the same subframe of a cell (second cell) that is different from the certain cell, the channel measurement unit 209 may exclude the subframe in which the average of the measurement results (received power and received quality, channel quality, etc.) in the second cell could not be measured. In other words, the channel measurement unit 209 may calculate the average value of the measurement results (received power and received quality, channel quality, etc.) by using only the received CRS and the CSI-RS. The calculation results (indicator or information corresponding to the calculation results) may be transmitted to the base station device 1 via the transmission unit 207.

On the basis of the control signal (control information) input from the control unit 203, the transmission unit 207 generates an uplink demodulation reference signal (UL DMRS) and/or a sounding reference signal (SRS), codes and modulates the data information input from the higher layer processing unit 201, multiplexes the PUCCH, the PUSCH, and the generated UL DMRS and/or the SRS, adjusts the transmit power of the PUCCH, the PUSCH, the UL DMRS, and the SRS, and transmits the results to the base station device 1 via the transmit and receive antenna 211.

Furthermore, when information on the measurement results is output from the higher layer processing unit 201, the transmission unit 207 transmits the information to the base station device 1 via the transmit and receive antenna 211.

Furthermore, when channel state information, which is the result of the channel evaluation from the higher layer processing unit 201 is output, the transmission unit 207 feeds back the channel state information to the base station device 1. In other words, the higher layer processing unit 201 generates the channel state information (CSI, CQI, PMI, RI) on the basis of the measurement results announced by the channel measurement unit 209, and feeds back the information to the base station device 1 via the control unit 203.

When a prescribed grant (or a prescribed downlink control information format) is detected in the reception unit 205, the transmission unit 207 transmits an uplink signal corresponding to the prescribed grant in the first uplink subframe located the prescribed number of subframes after the subframe in which the grant has been detected. For example, when grant is detected in a subframe i, an uplink signal can be transmitted in the first uplink subframe located after a subframe i+k.

Furthermore, when the transmission subframe of the uplink signal is the subframe i, the transmission unit 207 sets the transmit power of the uplink signal on the basis of the power control adjustment value acquired by the TPC command received in a subframe i-k. Here, the power control adjustment value f (i) (or g (i)) is configured on the basis of the correction value or absolute value associated with the value set in the TPC command. When accumulation is enabled, the correction values associated with the value set in the TPC command are accumulated, and the cumulative result is applied as the power control adjustment value. When accumulation is disabled, the absolute value associated with the value set in a single TPC command is applied as the power control adjustment value.

When either of the information on the first configuration or the information on the second configuration is received in the reception unit 205, the transmission unit 207 sets the transmit power on the basis of the parameters related to the first uplink power control, and when the information on the first configuration and the information on the second configuration are received in the reception unit 205, the transmission unit 207 sets the transmit power on the basis of the parameters related to the second uplink power control, and transmits the uplink signal.

The coding unit 2071 codes the uplink control information and data information input from the higher layer processing unit 201 in compliance with a coding scheme such as turbo coding, convolutional coding, or block coding. The modulation unit 2073 modulates the coded bits input from the coding unit 2071 in compliance with a modulation scheme, such as BPSK, QPSK, 16QAM, or 64QAM.

The uplink reference signal generation unit 2079 generates an uplink reference signal on the basis of the information on the configuration of the uplink reference signal. In other words, the uplink reference signal generation unit 2079 generates a CAZAC sequence that is already known to the base station device 1, and that is acquired according to a rule prescribed in advance on the basis of a cell identifier for identifying the base station device 1, and a bandwidth for arranging the uplink demodulation reference signal, the first uplink reference signal, and the second uplink reference signal. Furthermore, the uplink reference signal generation unit 2079 applies a cyclic shift to the CAZAC sequence of the generated uplink demodulation reference signal, the first uplink reference signal, and the second uplink reference signal on the basis of the control signal input from the control unit 203.

The uplink reference signal generation unit 2079 may initialize the reference sequence of the uplink demodulation reference signal and/or the sounding signal, and the uplink reference signal, on the basis of a prescribed parameter. The prescribed parameter may be the same parameter for each reference signal. Furthermore, the prescribed parameter may be a parameter that is configured independently for each reference signal. In other words, when the prescribed parameter is not a parameter that is configured independently, the uplink reference signal generation unit 2079 can initialize the reference sequence of each reference signal with the same parameter.

On the basis of the control signal input from the control unit 203, the multiplexing unit 2075 rearranges the modulation symbols of the PUSCH in parallel and then performs discrete Fourier transform (DFT) on the rearranged modulation symbols, and multiplexes the generated UL DMRS and SRS with signals of the PUCCH and the PUSCH.

The radio transmission unit 2077 performs inverse fast Fourier transform on the multiplexed signal, performs the modulation in compliance with an SC-FDMA scheme, adds a guard interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency (radio frequency), removes unnecessary frequency components, performs power amplification, and outputs a final result to the transmit and receive antenna 211 for transmission.

In the above-described embodiment, the transmission and reception of the PUCCH in a primary cell with carrier aggregation configured (with the secondary cell configured) has been described. However, the present invention is not limited to the embodiment. When carrier aggregation is configured, an HARQ-ACK corresponding to the PDSCH in a secondary cell can also be transmitted and received in the secondary cell. At this time, when carrier aggregation is configured and uplink carrier aggregation is not configured, that is, when a secondary cell without the configuration of uplink component carriers is configured, the HARQ-ACK corresponding to the PDSCH in the secondary cell is transmitted and received in a primary cell. Here, the transmission and reception procedure of the HARQ-ACK described in each embodiment above can be used. Furthermore, even when the serving cell in which the PUCCH is transmitted and received is a serving cell that is not a primary cell (for example, some (one) secondary cells from a secondary cell group), the transmission and reception procedure of the HARQ-ACK described in each embodiment above can be used. In such a case, the same effect can be exhibited by replacing a primary cell with some secondary cells, for example, in each embodiment described above.

It should be noted that in the above-described embodiment, the reception process may include a detection process. Furthermore, the reception process may include a demodulation process. Furthermore, the reception process may include a decode (decoding) process.

In the terminal device 2, the priority of the physical channel/physical signal for transmission depending on the type of the physical channel may be configured or defined in advance.

It should be noted that in the above-described embodiment, the terminal device 2 may report the measurement results of the received power based on the CSI-RS or a discovery reference signal (DRS), to the base station device 1. The terminal device 2 may perform this reporting periodically. Furthermore, the terminal device 2 may perform this reporting when a certain condition is satisfied.

It should be noted that in the above-described embodiment, when measuring the received power based on the CSI-RS or the DRS, the terminal device 2 may perform transmit power control of the uplink signal on the basis of the received power. In other words, the terminal device 2 may determine the downlink path loss on the basis of the received power.

It should be noted that in the above-described embodiment, when the total transmit power of the various uplink signals including the transmit power of the first uplink reference signal and/or the second uplink reference signal exceeds the maximum transmit power configured for the terminal device 2, the terminal device 2 does not have to transmit the first uplink reference signal and/or the second uplink reference signal.

Furthermore, when the TDD UL/DL configuration for the uplink transmission reference (first TDD UL/DL configuration) and the TDD UL/DL configuration for the downlink transmission reference (second TDD UL/DL configuration) are configured, and in addition, the information on the uplink transmit power control is configured, then when the same type of subframe is configured in the first TDD UL/DL configuration and the second TDD UL/DL configuration, the uplink power control of the subframe is set on the basis of the parameter related to the first uplink power control, and when different types of subframes are configured in the first TDD UL/DL configuration and the second TDD UL/DL configuration, the uplink power of the subframes is set on the basis of the parameter related to the second uplink power control.

It should be noted that a flexible subframe refers to a subframe that is an uplink subframe and a downlink subframe. Furthermore, the flexible subframe refers to a subframe that is a downlink subframe and a special subframe. Furthermore, the flexible subframe refers to a subframe that is an uplink subframe and a special subframe. In other words, the flexible subframe refers to a subframe that is a first subframe and a second subframe. For example, furthermore, under a condition 1, a subframe configured as a flexible subframe is processed as the first subframe (for example, an uplink subframe), and under a condition 2, the subframe is processed as the second subframe (for example, a downlink subframe).

It should be noted that the flexible subframe may be set on the basis of a first configuration and a second configuration. For example, when a subframe i is configured as an uplink subframe in the first configuration, and as a downlink subframe in the second configuration, the subframe i becomes a flexible subframe. The flexible subframe may be configured on the basis of information indicating the subframe pattern of a flexible subframe.

Furthermore, a plurality of subframe sets may be configured on the basis of one TDD UL/DL configuration and a flexible subframe pattern (a downlink candidate subframe pattern or an uplink candidate subframe pattern, and an additional subframe), rather than two TDD UL/DL configurations. In the subframe index indicated in a flexible subframe pattern, when the terminal device 2 is not able to transmit an uplink signal in a subframe even when the subframe is indicated as an uplink subframe in the TDD UL/DL configuration, the terminal device 2 can receive a downlink signal, and if the transmission of an uplink signal is instructed beforehand in a subframe even when the subframe is indicated as a downlink subframe in the TDD UL/DL configuration, the terminal device 2 can transmit an uplink signal. A specific subframe may be indicated as an uplink/downlink candidate subframe.

When the terminal device 2 satisfies a certain condition, one subframe set is recognized as a subframe set for the uplink, and the other subframe set may be recognized as a subframe set for the downlink. Here, the subframe set for the uplink is a subframe set configured for the transmission of a PUSCH and a PHICH, and the downlink subframe set is a subframe set configured for the transmission of a PDSCH and an HARQ. Information indicating the association between the subframes for the PUSCH and the PHICH and information indicating the association between the subframes for the PDSCH and the HARQ may be configured beforehand for the terminal device 2.

It should be noted that in the above-described embodiment, a plurality of subframe sets may be configured for one serving cell (primary cell, secondary cell, carrier frequency, transmission frequency, component carrier). In some cells, a plurality of subframe sets may be configured, and in other cells, a plurality of subframe sets may not be configured.

It should be noted that in the above-described embodiment, when two or more subframe sets are configured independently for one serving cell, the maximum transmit power ($P_{CMAX}$, $P_{CMAX, c}$) configured for each terminal device 2 may be configured for each subframe set. In other words, a plurality of independent maximum transmit powers may be configured for the terminal device 2. In other words, a plurality of maximum transmit powers ($P_{CMAX}$, $P_{CMAX, c}$) may be set for one serving cell. Furthermore, a plurality of maximum permissible output powers ($P_{EMAX, c}$) may be configured for one serving cell.

Furthermore, when the resource allocation of various uplink signals is the same, the base station device 1 can detect various uplink signals on the basis of the difference in the signal sequence of each uplink signal. In other words, the base station device 1 can identify each uplink signal on the basis of the difference in the signal sequence of the received uplink signal. Furthermore, the base station device 1 can determine whether a transmission is addressed to the base station device 1 on the basis of the difference in the signal sequence of the received uplink signal.

In addition, when received power measurement based on the CSI-RS or the DRS is indicated from the base station device 1, the terminal device 2 may calculate the downlink path loss on the basis of the measurement results and use the results in uplink transmit power control.

Here, received power measurement is sometimes referred to as reference signal received power (RSRP) measurement and receive signal power measurement. Furthermore, received quality measurement is sometimes referred to as reference signal received quality (RSRQ) measurement and receive signal quality measurement.

Furthermore, a frequency shift may be performed for the resource allocation (mapping to resource elements, mapping to physical resources) of the CSI-RS or the DRS. The frequency shift of the CSI-RS or the DRS may be determined on the basis of a physical cell ID. Furthermore, the frequency shift of the CSI-RS or the DRS may be determined on the basis of a virtual cell ID.

For example, when information is not announced from the base station device 1, the terminal device 2 performs received power measurement of the first downlink reference signal. Information indicating whether to perform the received power measurement of the second downlink reference signal is announced from the base station device 1 to the terminal device 2. When the instruction information indicates that the received power measurement can be performed for the second downlink reference signal, the terminal device 2 performs the received power measurement of the second downlink reference signal. At this time, the terminal device 2 may perform received power measurement for the first downlink reference signal in parallel. When the instruction information indicates that the received power measurement cannot be performed for the second downlink reference signal, the terminal device 2 performs the received power measurement only for the first downlink reference signal. In addition, the instruction information may include information indicating whether to perform received quality measurement for the second downlink reference signal. Furthermore, regardless of the instruction information, the received power measurement may be performed for the third downlink reference signal.

When two subframe sets are configured for one serving cell, and the second subframe set is considered to be the subframe pattern of the flexible subframe, the information indicating the pattern of the subframe in which the DCI format including the TPC command field for the flexible frame can be received may be transmitted from the base station device 1 to the terminal device 2.

A pattern of the subframe in which the TPC command that can be applied to the uplink subframe belonging to the first subframe set is transmitted, and a pattern of the subframe in which the TPC command that can be applied to the uplink subframe belonging to the second subframe set is transmitted may be configured. The association between an uplink subframe and a downlink subframe in which the DCI format including the TPC command for the uplink subframe is transmitted may be managed in the form of a table.

Furthermore, the RSRP measurement results may be configured independently in the subframe sets. The measurement of an RSRP based on a CRS received in a downlink subframe of a fixed subframe and an RSRP based on CRS received in a flexible subframe may be performed independently.

It should be noted that in the above-described embodiment, a description has been given by using a resource element and a resource block as the mapping unit of various uplink signals and downlink signals, and by using symbols, subframes, and radio frames as the transmission unit in the time direction, but the present invention is not limited to the embodiment. The same effect can be obtained even by replacing the above unit with a region and time unit configured by any frequency and time. It should be noted that in the above-described embodiment, a description has been given of a case where demodulation is performed by using a precoded RS, and a port equivalent to the MIMO layer is used as the port corresponding to the precoded RS, but the present invention is not limited to the embodiment. In addition, the same effect can be achieved by applying the present invention to a port corresponding to mutually different reference signals. For example, rather than a precoded RS, an unprecoded (nonprecoded) RS can be used, and as for the port, a port that is equivalent to the output end after precoding, or a port that is equivalent to a physical antenna (or a combination of physical antennas) can be used.

It should be noted that in the above-described embodiment, when only the DCI format 3/3A is received in a certain downlink subframe, the correction value (or the absolute value) corresponding to the value set in the TPC command field included in the DCI format 3/3A is applied to the power control adjustment value for the transmit power of a PUSCH that is transmitted in a specific subframe set, regardless of the subframe set to which the downlink subframe belongs. When only the DCI format 3/3A is received in a certain downlink subframe, the accumulation of the TPC command included in the DCI format 3/3A may be applied to the power control adjustment value used in the transmit power for a PUSCH that is transmitted in a specific subframe set. It should be noted that a specific subframe set may be a set of fixed subframes, a set of flexible subframes, or a set of any subframes.

It should be noted that in the above-described embodiment, the parameter related to the uplink power control is a parameter used for transmit power control of an uplink physical channel/physical signal (such as PUSCH, PUCCH, PRACH, SRS, and DMRS), and information on switching or (re)configuration of the various parameters used in the configuration of the transmit power of various uplink physical channels is included in the parameter used for transmit power control. Furthermore, the parameter related to the downlink transmit power control is a parameter used for transmit power control of a downlink physical channel/physical signal (such as CRS, UERS (DL DMRS), CSI-RS, PDSCH, PDCCH/EPDCCH, PBCH, PSS/SSS, PMCH, and PRS), and information on switching or (re)configuration of the various parameters used in the configuration of the transmit power of various downlink physical channels is included in the parameter used for transmit power control.

It should be noted that in the above-described embodiment, the base station device 1 may be configured to have a plurality of virtual cell IDs for one terminal device 2. For example, a network including the base station device 1 and at least one base station device 1 may be such that an independent virtual cell ID can be configured for each physical channel/physical signal. Furthermore, a plurality of virtual cell IDs may be configured for one physical channel/physical signal. That is, a virtual cell ID may be set in each configuration of a physical channel/physical signal. Furthermore, a virtual cell ID may be shared among a plurality of physical channels/physical signals.

It should be noted that in the description of the above-described embodiment, for example, "setting power" includes "setting a value of power"; and "setting power" includes "setting a value to a parameter related to power"; "calculating power" includes "calculating a value of power"; "measuring power" includes "measuring a value of power"; and "reporting power" includes "reporting a value of power". Thus, the term "power" also includes the meaning of "value of power" as needed.

It should be noted that in the description of the above-described embodiment, "not transmitted" includes "the transmission process is not performed". Furthermore, "not transmitted" includes "a signal for transmission is not generated". Furthermore, "not transmitted" includes "a signal (information) is generated", and "a signal (or information) is not transmitted". Furthermore, "not received" includes "the reception process is not performed". Furthermore, "not received" includes "the detection process is not performed". Furthermore, "not received" includes "the decoding/demodulation process is not performed".

It should be noted that in the description of the above-described embodiment, for example, "calculating path loss" includes "calculating a value of path loss". Thus, the term "path loss" also includes the meaning of "value of path loss" as needed.

It should be noted that in description of the above-described embodiment, "configuring various parameters" includes "configuring a value of various parameters". Thus, the term "various parameters" also includes the meaning of "value of various parameters" as needed.

A program running on both the base station device 1 and the terminal device 2 according to the present invention is a program that controls a CPU and the like (a program for causing a computer to operate) in such a manner as to realize the functions according to the above-described embodiment of the present invention. The information handled by these devices is temporarily held in a RAM at the time of processing, then stored in various storage devices such as a ROM and an HDD and read out by the CPU as necessary, and modified and written. A semiconductor medium (a ROM, a non-volatile memory card, or the like, for example), an optical recording medium (a DVD, an MO, an MD, a CD, a BD, or the like, for example), a magnetic recording medium (magnetic tape, a flexible disk, or the like, for example), and the like can be given as examples of recording media for storing the programs. In addition to realizing the functions of the above-described embodiments by executing programs that have been loaded, there are also cases where the functions of the present invention are realized by the programs running cooperatively with an operating system, other application programs, or the like on the basis of instructions included in those programs.

When delivering these programs to market, the programs can be stored in a portable recording medium, or transferred to a server computer connected via a network such as the Internet. In this case, the storage device serving as the server computer is of course also included in the present invention. Furthermore, some or all portions of each of the base station device 1 and the terminal device 2 according to the above-described embodiment may be realized as an LSI that is a typical integrated circuit. The functional blocks of each of the base station device 1 and the terminal device 2 may be individually realized as chips, or may be partially or completely integrated into a chip. The circuit integration technique is not limited to LSI, and the integrated circuits for the functional blocks may be realized as dedicated circuits or a multi-purpose processor. Furthermore, if with advances in semiconductor technology, a circuit integration technology with which an LSI is replaced appears, it is also possible to use an integrated circuit based on the technology.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

It should be noted that the present invention is not limited to the above-described embodiment. It is needless to say that the application of the terminal device according to the present invention is not limited to a mobile station, and the terminal device may be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses. Furthermore, the present invention is favorably used in a radio base station device, a radio terminal device, a radio communication system, and a radio communication method.

REFERENCE SIGNS LIST

1 Base station device
2 Terminal device
101 Higher layer processing unit
103 Control unit
105 Reception unit
107 Transmission unit
109 Channel measurement unit
111 Transmit and receive antenna
1051 Decoding unit
1053 Demodulation unit
1055 Demultiplexing unit
1057 Radio reception unit
1071 Coding unit
1073 Modulation unit
1075 Multiplexing unit
1077 Radio transmission unit
1079 Downlink reference signal generation unit
201 Higher layer processing unit
203 Control unit
205 Reception unit
207 Transmission unit
209 Channel measurement unit
211 Transmit and receive antenna
2051 Decoding unit
2053 Demodulation unit
2055 Demultiplexing unit
2057 Radio reception unit
2071 Coding unit
2073 Modulation unit
2075 Multiplexing unit
2077 Radio transmission unit
2079 Uplink reference signal generation unit

The invention claimed is:

1. A user equipment comprising:
a receiver that receives a physical downlink shared channel (PDSCH) or a control channel indicating semi-persistent scheduling (SPS) release on a serving cell;
a processor that generates hybrid automatic repeat request-acknowledgement (HARQ-ACK) feedback bits for the PDSCH or the control channel; and
a transmitter that transmits the HARQ-ACK feedback bits, wherein
the processor determines the HARQ-ACK feedback bits based on a time division duplex (TDD) HARD-ACK reporting procedure for different UL/DL configurations, in a case that (a) the user equipment is configured with more than one serving cell, (b) a frame structure type of each serving cell of the more than one serving cell is a frame structure type 2, and (c) at least two configured serving cells of the more than one serving cell have respective UL/DL configurations which are different from each other,
the processor determines the HARQ-ACK feedback bits based on UL-reference UL/DL configuration belonging to {1, 2, 3, 4, 6} and the TDD HARQ-ACK reporting procedure, in a case that (a) the user equipment is configured with more than one serving cell, (b) frame structure types of any two configured serving cells are different, (c) a primary cell is a frame structure type 2, (d) the serving cell is a frame structure type 1, (e) downlink(DL)-reference uplink(UL)/DL configuration of the two configured serving cells belongs to {0,1,2, 3,4,6}, and (f) a physical uplink control channel (PUCCH) format 1b with channel selection is configured for a transmission of the HARQ-ACK feedback bits for the serving cell and the primary cell.

2. A user equipment according to claim 1, wherein
the processor determines a number of downlink subframes or special subframes for which the transmitter needs to transmit the HARQ-ACK feedback bits based on UL-reference UL/DL configuration belonging to {1, 2, 3, 4, 5, 6} and the TDD HARD-ACK reporting procedure, in a case that (a) the user equipment is configured with more than one serving cell, and (b) frame structure types of any two configured serving cells are different, (c) a primary cell is a frame structure type 2, (d) the serving cell is a frame structure type 1, and (e) a PUCCH format 3 is configured for transmission of the HARQ-ACK feedback bits.

3. A user equipment according to claim 1, wherein
the processor determines the HARQ-ACK feedback bits based on the value of a downlink assignment index (DAI) in DCI (downlink control information) format 1/1A/1B/1D/2/2A/2B/2C/2D in a PDCCH/EPDCCH enhanced PDCCH (EPDCCH) for scheduling the PDSCH, in a case that (a) the user equipment is configured with more than one serving cell, and (b) frame structure types of any two configured serving cells are different, (c) a primary cell is a frame structure type 2, (d) the serving cell is a frame structure type 1, and (e) a DL reference UL/DL configuration of the serving cell is 0.

* * * * *

UNITED STATES PATENT AND TRADEMARK OFFICE
CERTIFICATE OF CORRECTION

PATENT NO. : 10,171,220 B2
APPLICATION NO. : 15/517275
DATED : January 1, 2019
INVENTOR(S) : Naoki Kusashima et al.

It is certified that error appears in the above-identified patent and that said Letters Patent is hereby corrected as shown below:

In the Claims

In Line 12 of Column 108, Claim 1 should be corrected as follows:
-- based on a time division duplex (TDD) HARQ-ACK --

In Line 50 of Column 108, Claim 3 should be corrected as follows:
-- based on a value of a downlink assignment index --

In Lines 52 and 53 of Column 108, Claim 3 should be corrected as follows:
-- 1/1A/1B/1D/2/2A/2B/2C/2D in a PDCCH / an
enhanced PDCCH (EPDCCH) for scheduling the --

Signed and Sealed this
Second Day of July, 2019

Andrei Iancu
*Director of the United States Patent and Trademark Office*